United States Patent [19]

Bogacz

[11] 3,930,146

[45] Dec. 30, 1975

[54] INPUT/OUTPUT CONTROLLER MAINTENANCE ARRANGEMENT FOR A COMMUNICATION SWITCHING SYSTEM

[75] Inventor: Frank J. Bogacz, Chicago, Ill.

[73] Assignee: GTE Automatic Electric Laboratories Incorporated, Northlake, Ill.

[22] Filed: Jan. 18, 1974

[21] Appl. No.: 434,760

[52] U.S. Cl... 235/153 AK; 179/15 AE; 179/18 ES; 179/175.2 R; 235/153 AC

[51] Int. Cl.$^{2}$.................... G05B 23/02; G06F 11/04

[58] Field of Search..... 179/15 AE, 18 ES, 175.2 R, 179/175.2 C; 235/153 A, 153 AC, 153 AK; 340/172.5

[56] References Cited

UNITED STATES PATENTS 3,818,455 6/1974 Brenski et al.................. 340/172.5

*Primary Examiner*—R. Stephen Dildine, Jr.

[57] ABSTRACT

An input/output controller maintenance arrangement for a communication switching system having a central processor with a main memory therefor and having a peripheral adapter unit for transferring information to and from an input/out peripheral device with a device buffer for transferring information between the peripheral adapter and the main memory, includes a plurality of input/output device error detecting units for sensing malfunctions occurring in the input/output peripheral device, a plurality of device buffer error detecting units for sensing malfunctions occurring in the device buffer, a plurality of bi-stable devices for generating error signals in response to the error detecting units sensing malfunctions, an error bi-stable device responsive to the other bi-stable devices generating their error signals for requesting the services of the central processor for maintenance purposes, and control apparatus responsive to the error bi-stable device for monitoring the buffer bi-stable devices to determine whether the malfunction occurred in the device buffer and for monitoring subsequently the adapter bi-stable devices if the malfunction did not occur in the device buffer to determine the source of the malfunction. The input/output peripheral device is a magnetic tape unit in the disclosed form of the invention, and in the case of a malfunction, such as a breaking of the tape, the source of the error is detected quickly and accurately in accordance with the arrangement of the present invention.

8 Claims, 12 Drawing Figures

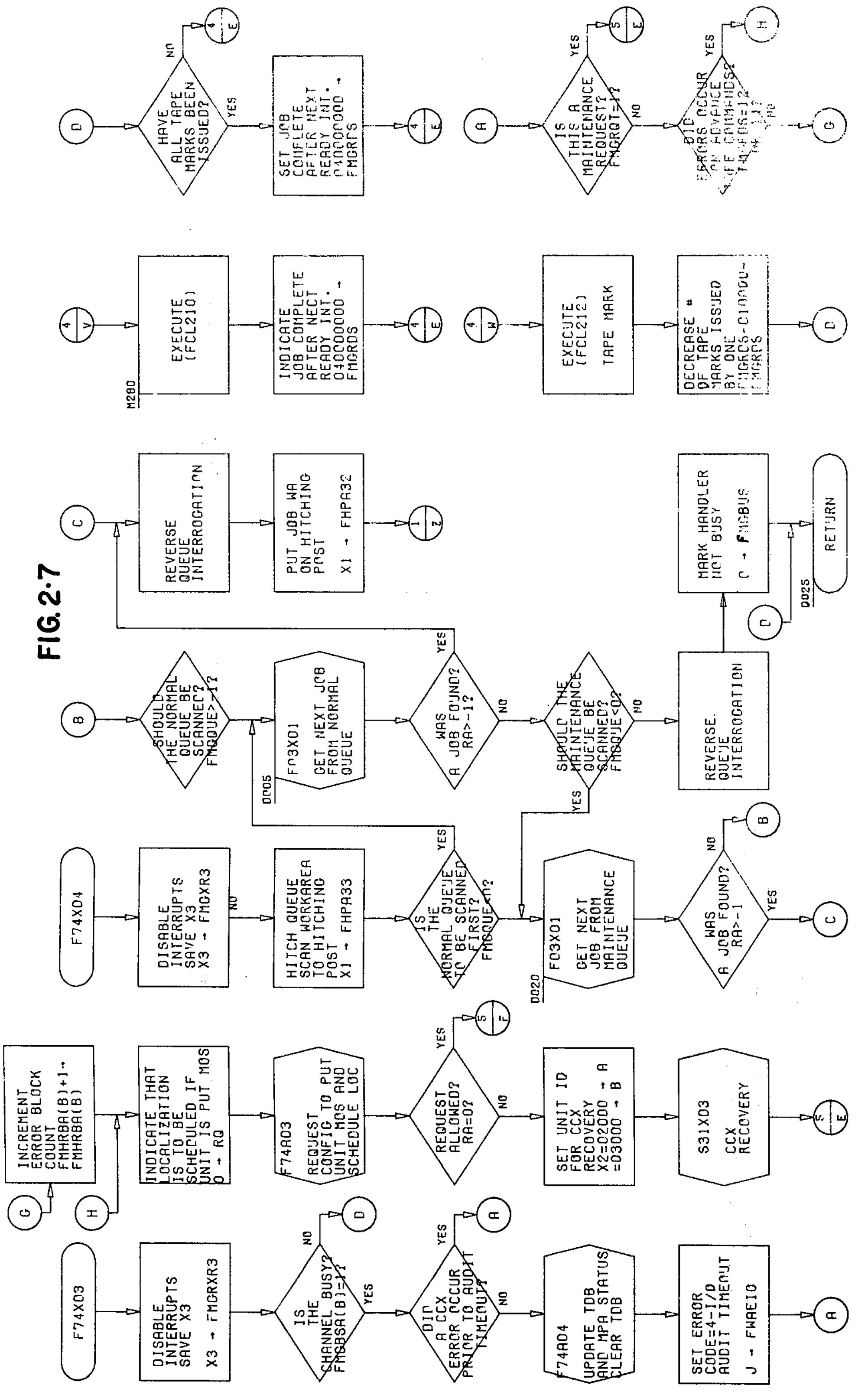
FIG. 2·7

INPUT/OUTPUT CONTROLLER MAINTENANCE ARRANGEMENT FOR A COMMUNICATION SWITCHING SYSTEM

BACKGROUND OF THE INVENTION

1. Field of the Invention

This invention relates to an input/output controller maintenance arrangement for a communication switching system, and it more particularly relates to a maintenance arrangement for quickly and accurately responding to malfunctions occurring in input/output devices, such as magnetic tape units, and their controllers, such as device buffers and peripheral adapters.

2. Summary of the Prior Art

Communication switching systems, such as electronic telephone systems, have employed error detecting units for sensing malfunctions occurring in the various different circuits. The error detecting units are scanned by a common control unit to determine when a malfunction has occurred. Such systems have included stored-program central processors for diagnosing the malfunction conditions so that repairs or replacements can be made. However, while such an arrangement may be satisfactory for some applications, the scanning of large numbers of error detecting units can require unduly and unnecessarily long intervals of time for some applications. For example, in an input/output peripheral device, such as a magnetic tape unit, has been used for storing ticketing information, and the accurate storing of such information is extremely important since it is used for billing subscribers to the system. Therefore, any malfunctions, such as the breaking of the tape, must be detected and acknowledged quickly and efficiently as possible. Therefore, it would be highly desirable to have a maintenance arrangement which would quickly detect the presence of malfunctions occurring in an input/output peripheral device and also its controller, such as a peripheral adapter and a device buffer associated therewith.

SUMMARY OF THE INVENTION

Therefore, the principal object of the present invention is to provide a new and improved maintenance arrangement for detecting and acknowledging malfunctions occurring in input/output peripheral devices and their controllers. Another object of the present invention is to provide such a maintenance arrangement, which detects and acknowledges malfunctions occurring in an input/output peripheral device and its controller, and isolates the source of the malfunction in a fast and efficient manner.

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973, now U.S. Pat. No. 3,835,260 issued Sept. 10, 1974 hereinafter referred to as the SYSTEM application. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent.

The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972 now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972 now U.S. Pat. No. 3,830,983 issued Aug. 20, 1974 by J. W. Eddy and S. E. Puccini for a COMMUNICATION SYSTEM CONTROL TRANSFER ARRANGEMENT, Ser. No. 303,157 filed Nov. 2, 1972 now U.S. Pat. No. 3,809,822 issued May 7, 1974 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 now U.S. Pat. No. 3,814,859 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 now U.S. Pat. No. 3,831,151 issued Aug. 20, 1974 by L. V. Jones and P. A. Zelinski for a SENSE LINE PROCESSOR WITH PRIORITY INTERRUPT ARRANGEMENT FOR DATA PROCESSING SYSTEMS.

Programs for communication between the data processing unit and the register-sender, in addition to the SYSTEM application, are disclosed in U.S. patent application Ser. No. 358,753 filed May 9, 1973 now U.S. Pat. No. 3,819,865 issued June 24, 1974. by F. A. Weber et al.

The scanner for the local automatic message accounting subsystem is disclosed in patent application Ser. No. 434,743, filed Jan. 18, 1974 by B. F. Gearing, M. R. Winandy, G. Grzybowski and D. F. Gaon; and in two articles in the GTE Automatic Electric Technical Journal, Vol. 13, No. 4 (October, 1972) at pages 177–184 and pages 185–196.

The magnetic tape unit of the local automatic message accounting subsystem is disclosed in patent application Ser. No. 434,742, filed Jan. 18, 1974 by B. F. Gearing et al.

DESCRIPTION OF THE DRAWINGS

FIGS. 2-1 through 2-11 are flow charts of a software program module F-74 serving as the magnetic tape handler for the arrangement of FIG. 1.

DESCRIPTION OF THE PREFERRED EMBODIMENT

Figure 1:
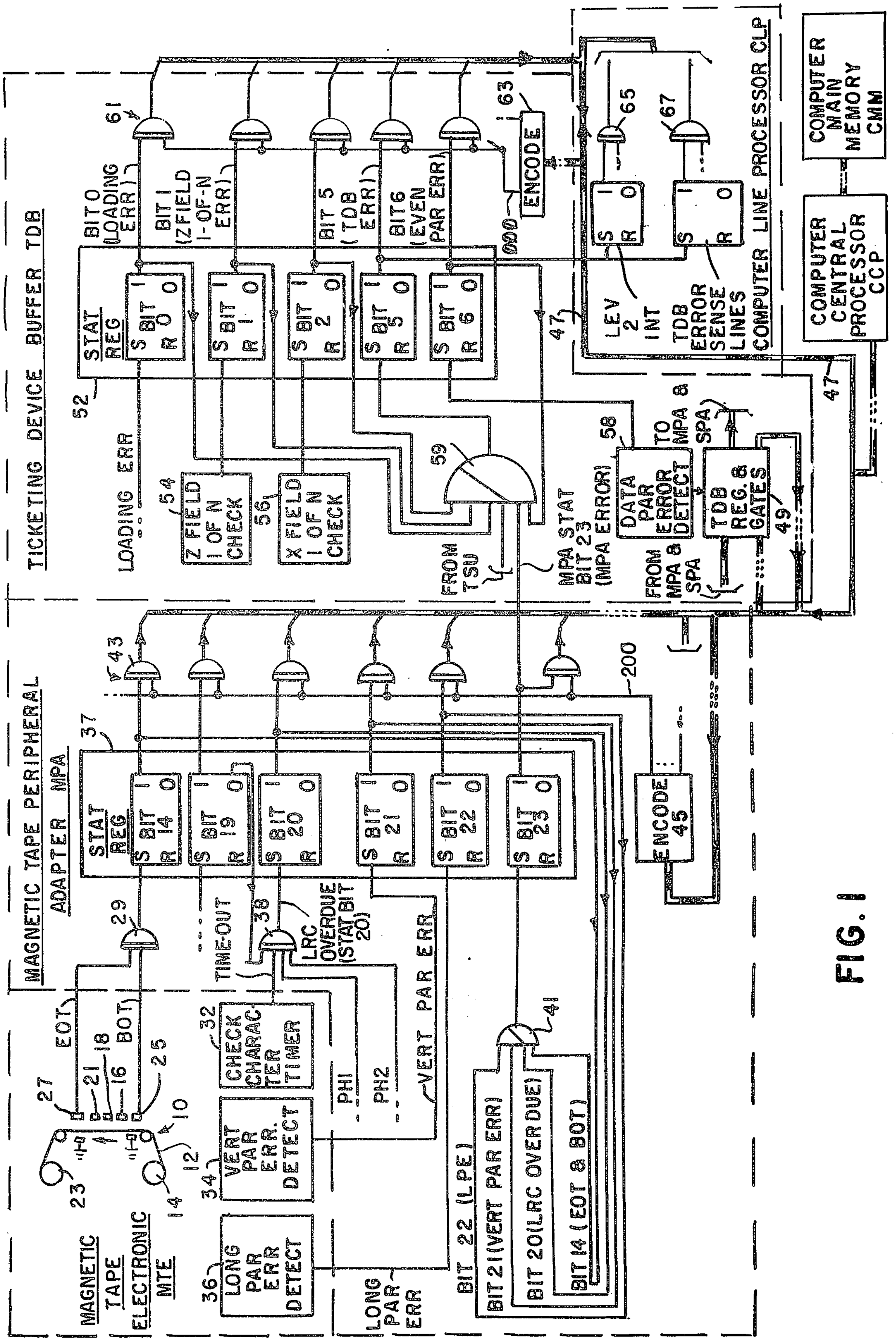
FIG. 1 is a symbolic functional block diagram of a magnetic tape unit with its related controller showing its interconnection with the central computer processor and its main memory, the arrangement incorporating the principles of the present invention.
Figures 1, 2:
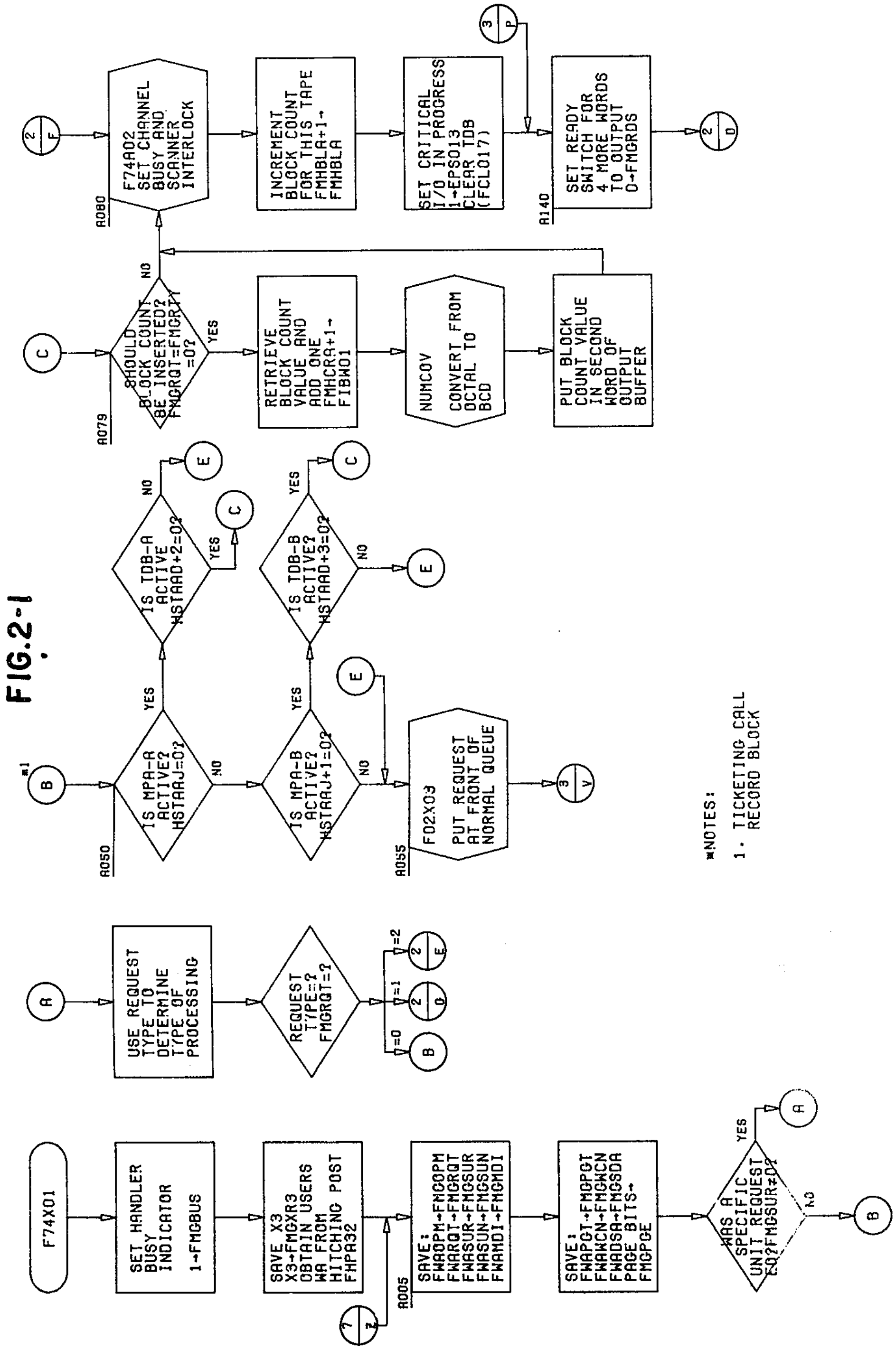
Figure 2:
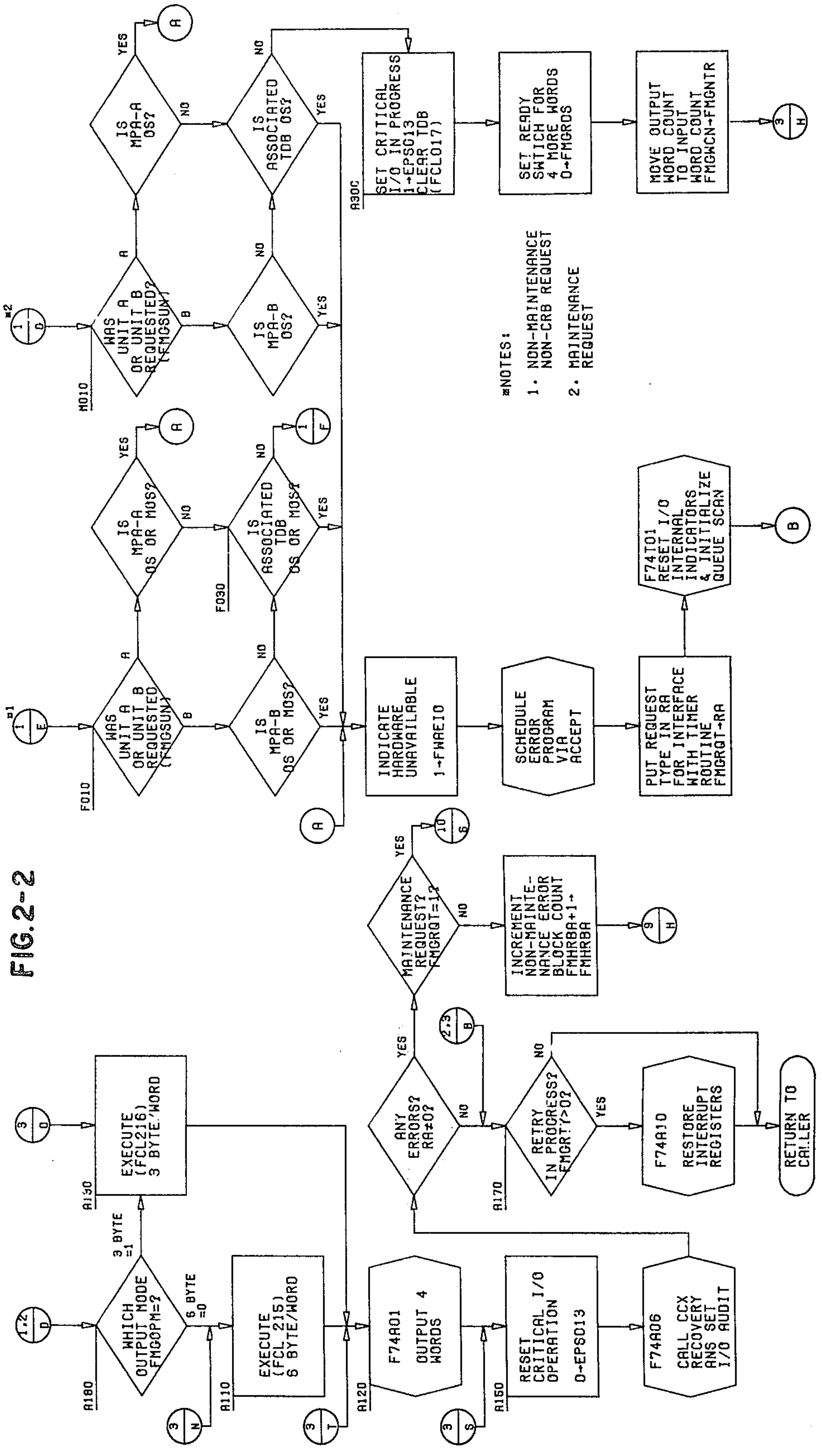
Figures 2, 3:
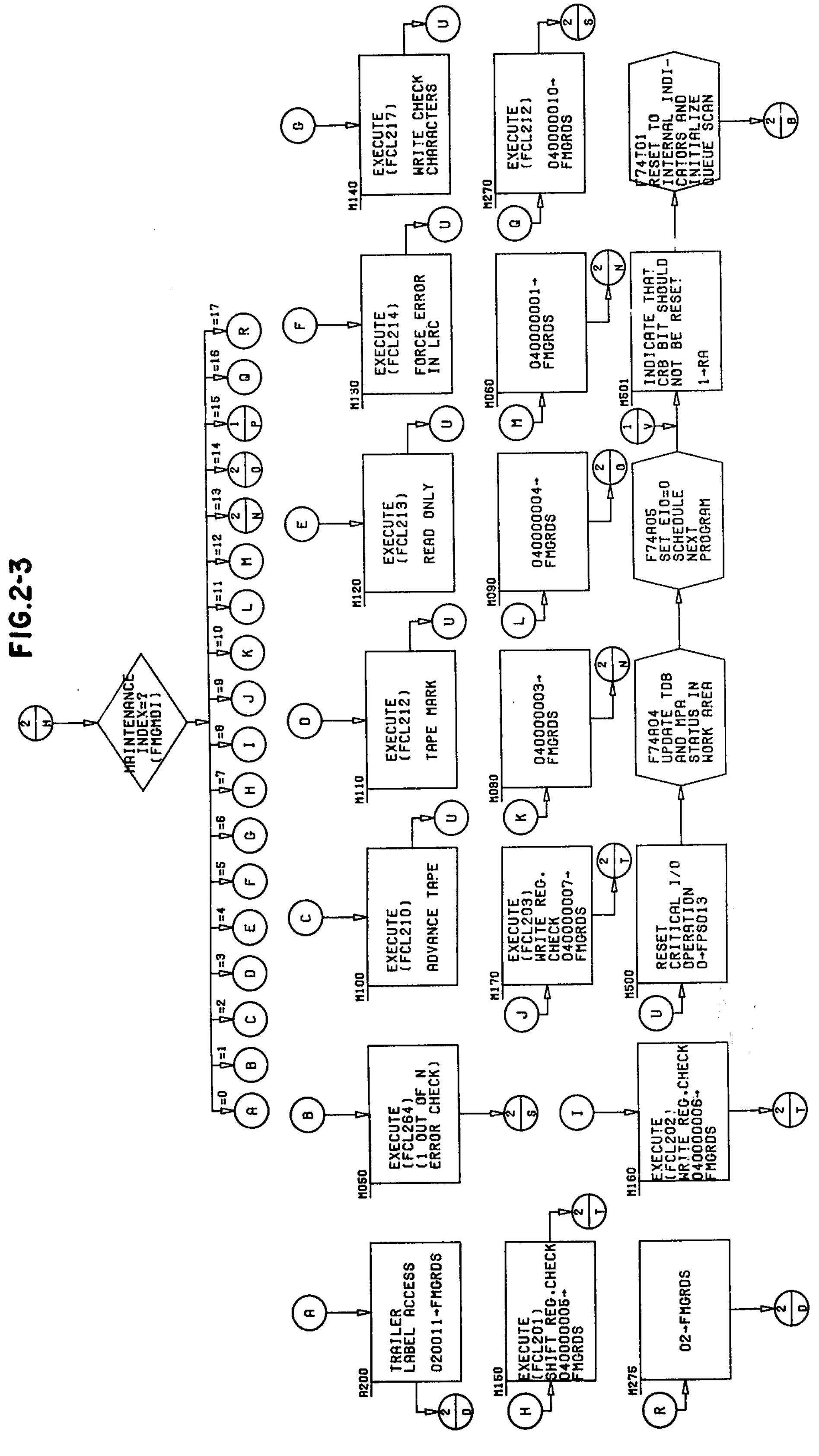
Figures 2, 3, 4:
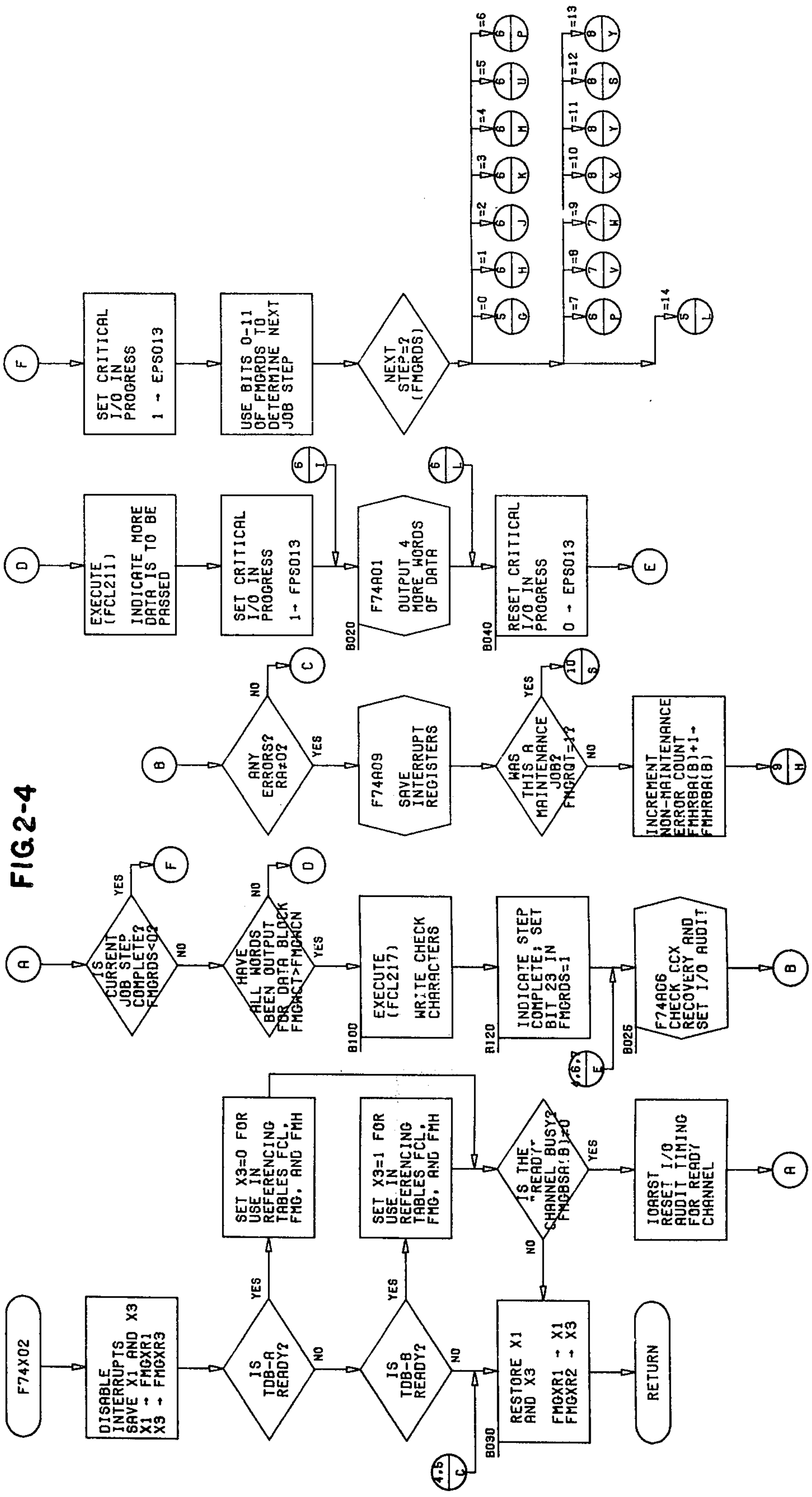
Figures 2, 3, 4, 5:
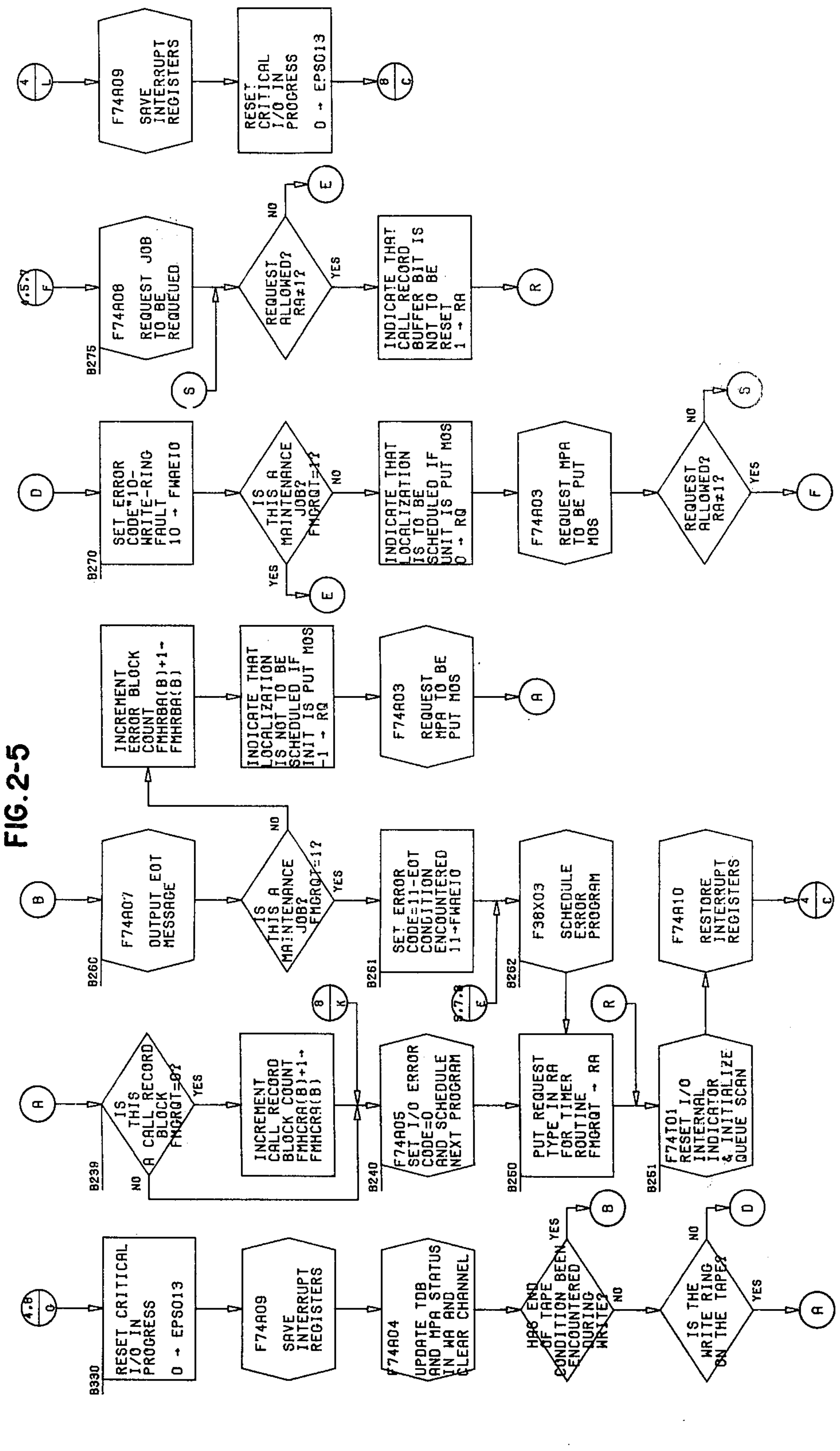
Figures 2, 3, 4, 5, 6:
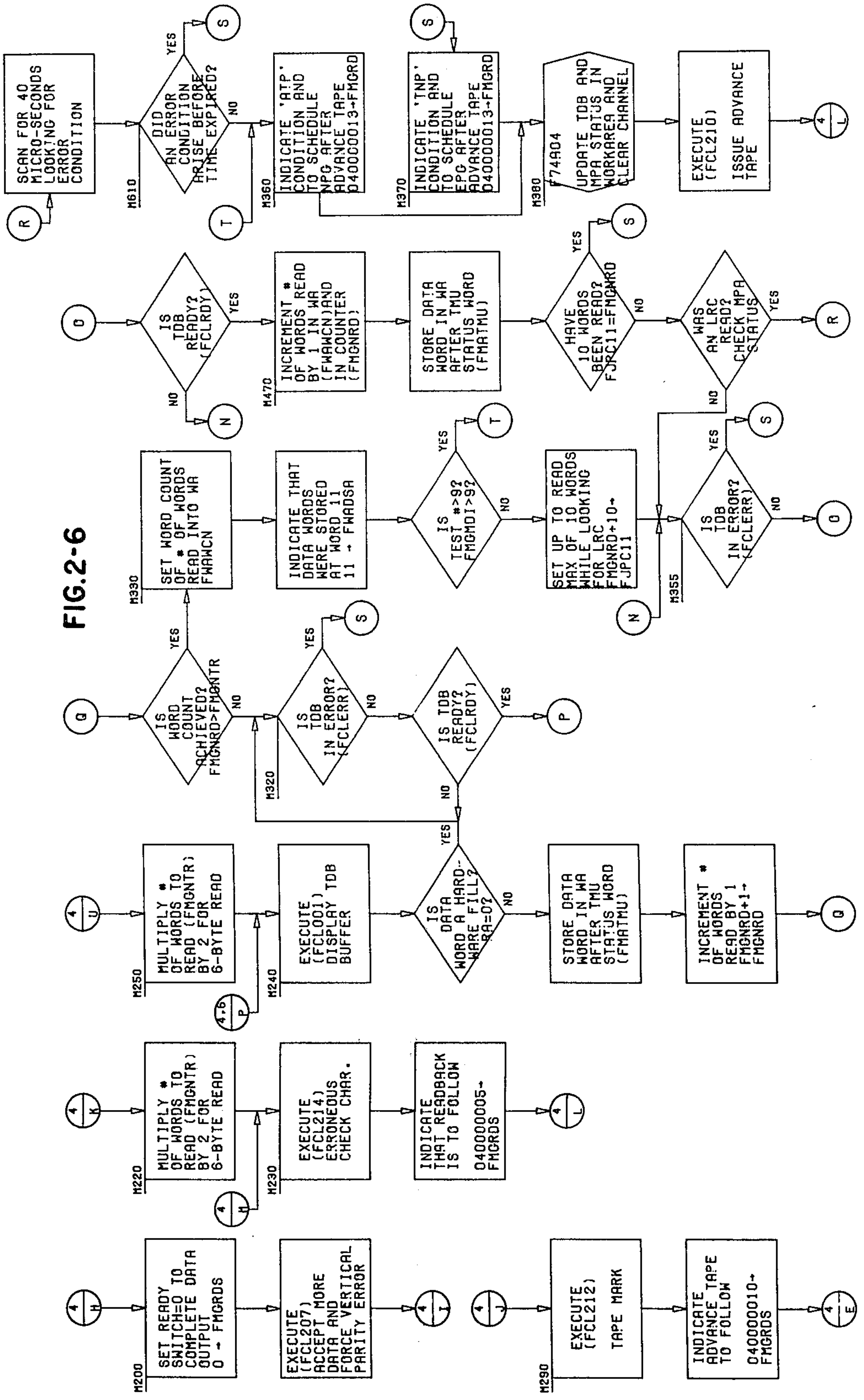
Figures 2, 3, 4, 5, 6, 7, 8:
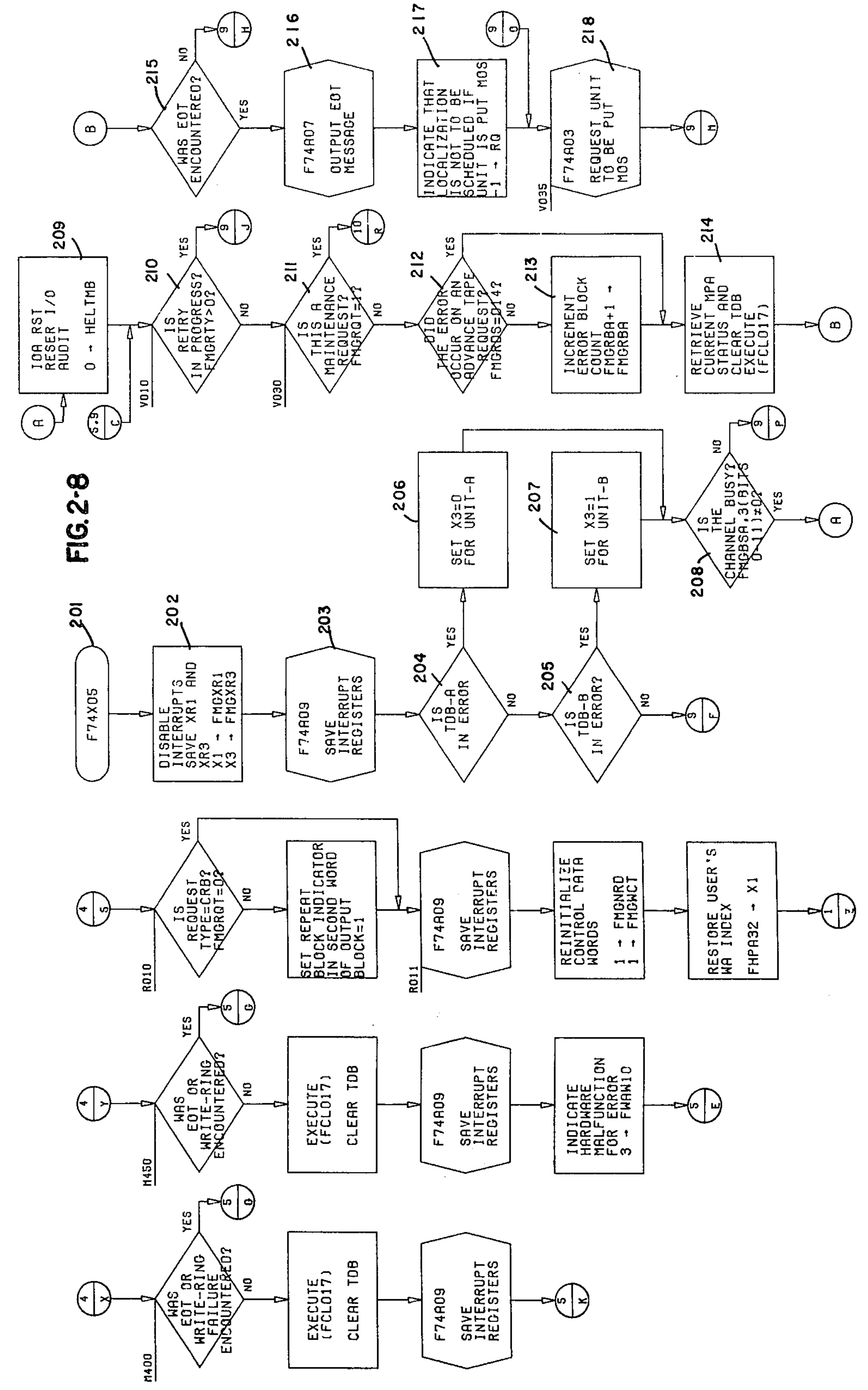
Figures 2, 3, 4, 5, 6, 7, 8, 9:
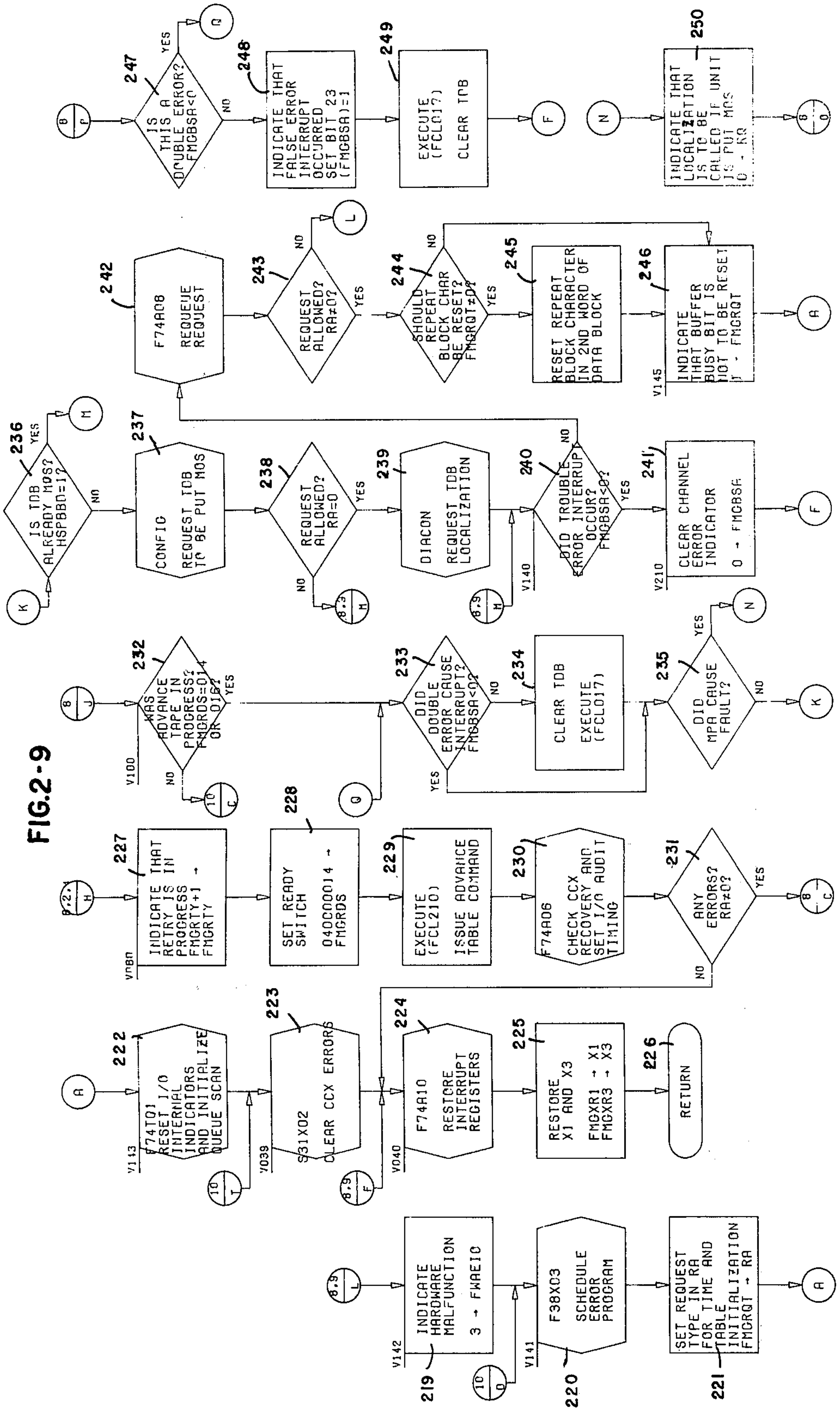
Figures 2, 3, 4, 5, 6, 7, 8, 9, 10:
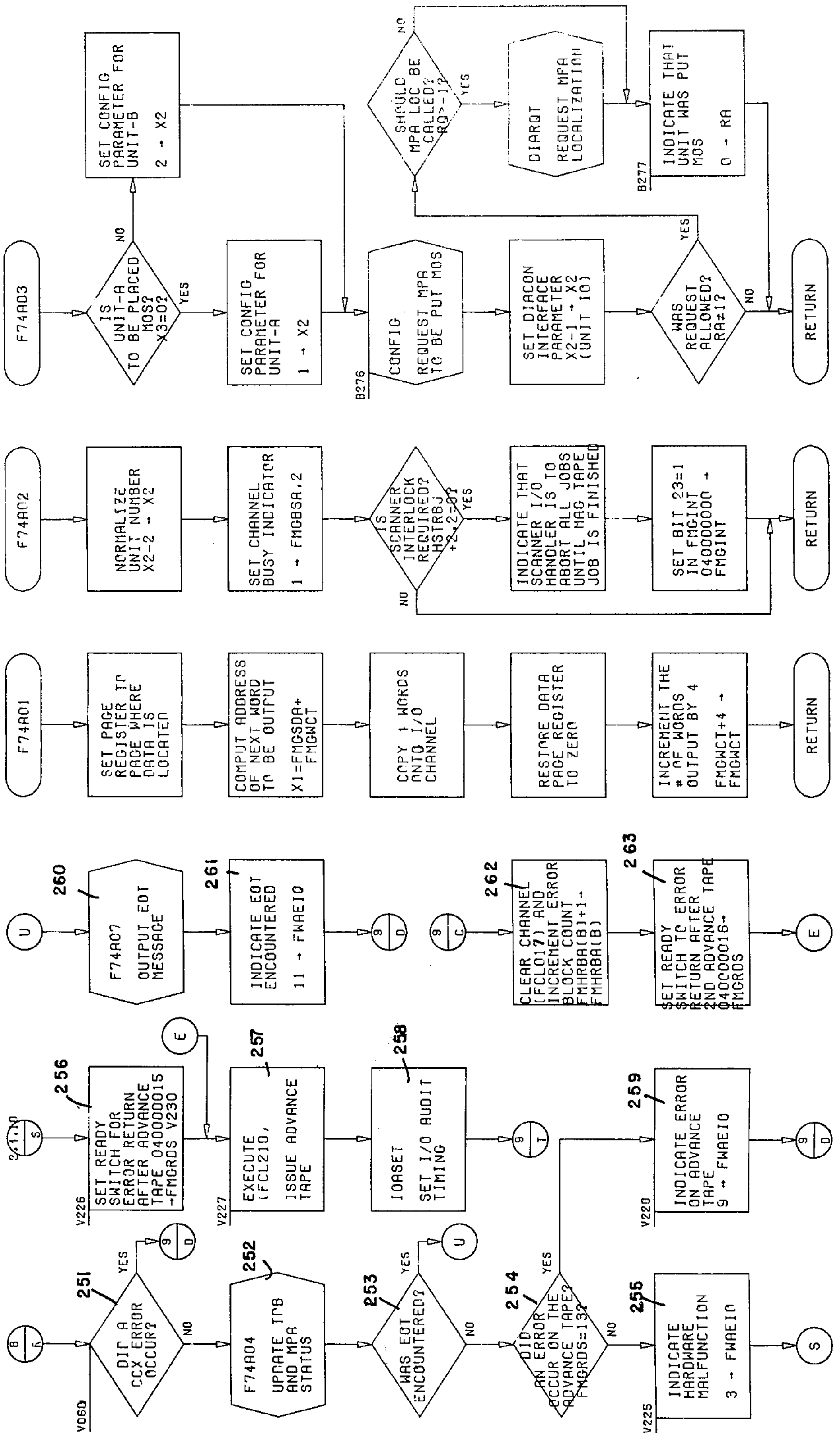
Figures 2, 3, 4, 5, 6, 7, 8, 9, 10, 11:
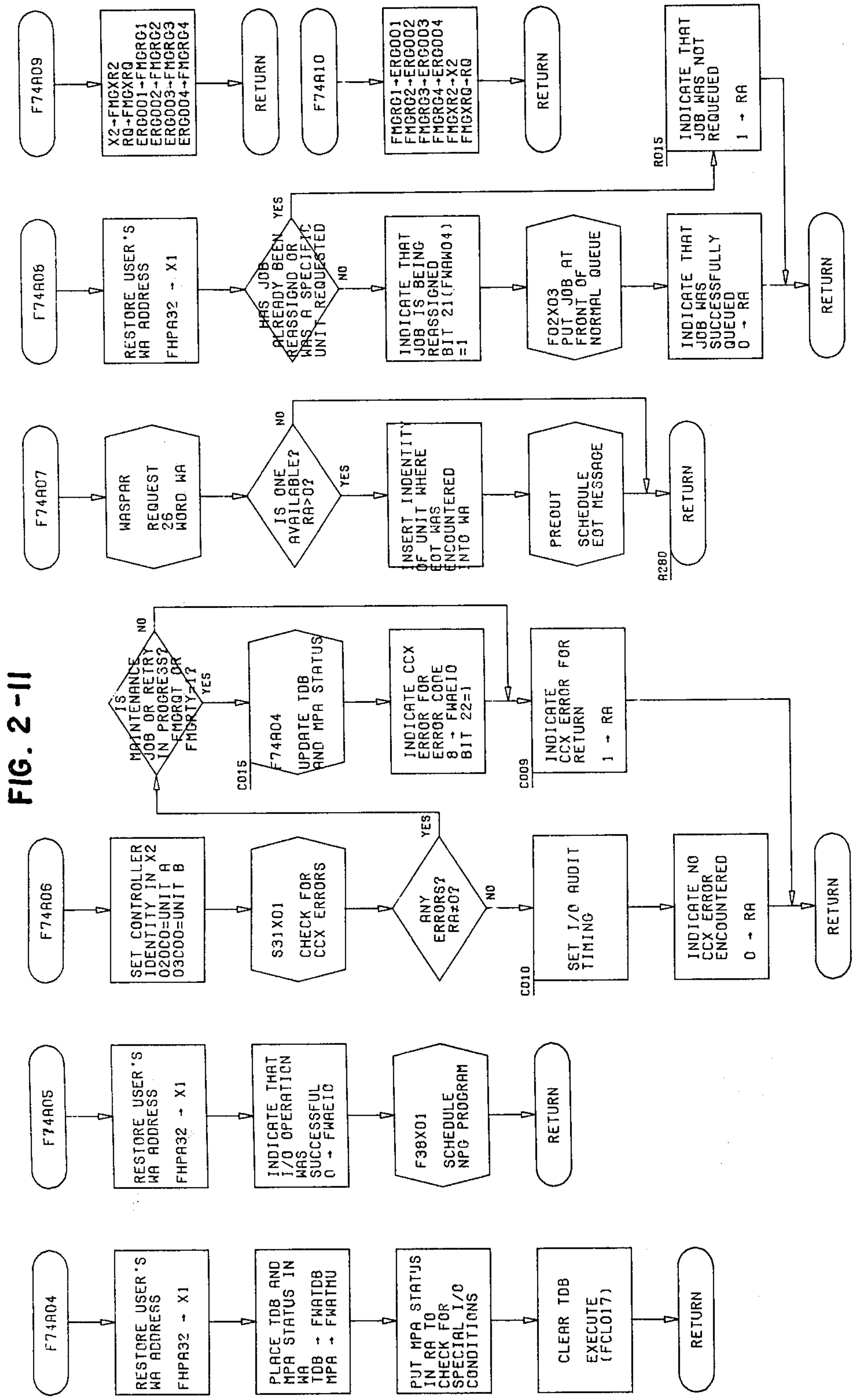

Referring now to FIG. 1 of the drawings, there is shown a portion of a communication switching system which incorporates the principles of the present invention. The details of the system, which in the preferred form of the present invention is an electronic telephone switching system, are found in the foregoing-mentioned patents, patent applications and articles. The system of the present invention includes a computer central processor CCP for controlling the operation of the system and for facilitating the maintenance thereof, a computer main memory which is a core memory in the preferred form of the present invention, a computer line processor CLP for controlling the gating of interrupt signals to the computer central processor CCP for interrupting its operation and servicing the requests, which may either be call processing requests for the telephone system or maintenance requests, and a magnetic tape unit including a magnetic tape transport 10, a magnetic tape electronic unit MTE for controlling the unit 10, a magnetic tape peripheral adapter MPA for transferring information to and from the tape transport 10, and a ticketing device buffer TDB for transferring information between the magnetic tape peripheral adapter MPA and the computer central processor CCP and its memory CMM via the computer line processor CLP. The magnetic tape peripheral adapter MPA and the ticketing device buffer TDB comprise the controller for the tape transport 10. The tape transport 10 includes a magnetic tape 12 for moving in the direction of the arrow from a supply reel 14 past an erase head 16, a write head 18 and a read head 21 to a take-up reel 23. The input/output peripheral device in this case is the magnetic tape transport 10 and its magnetic tape electronic unit MTE.

In order to sense malfunctions occurring in the input/output peripheral device, a plurality of error detecting units are employed to sense the occurrence of malfunctions. In this regard, a photoelectric sensing unit 25 generates a signal BOT indicating the beginning of the tape when there is an absence of a tape at the beginning of the transport 10. Similarly, another photo-optic sensing unit 27 is disposed at the tape 12 between the read head 21 and the take-up reel 23 to sense the absence of the tape 12 thereat, and it generates a signal EOT indicating the end of the tape. An AND gate 29 of the magnetic tape peripheral adapter MPA is enabled in response to both of the signals EOT and BOT being generated to indicate that the tape 12 is broken. A check character timer circuit generates a time-out signal indicating that the longitudinal redundancy check character LRC is overdue. The check character timer

32 is disclosed in greater detail in the foregoing-mentioned patent application Ser. No. 434,742. Similarly, the check characters, both the LRC and the CRC check characters, and the arrangement of the data on the tape 12 are disclosed in greater detail in the foregoing-mentioned patent application Ser. No. 434,742 and articles. Similarly, a vertical parity error detector 34 is provided for sensing the proper code from these CRC check characters and in response to an improper vertical parity generates a signal VERT PAR ERR. A longitudinal parity error detector 36 detects the proper or improper parity of the longitudinal check character LRC and if improper longitudinal parity exists, it generates the signal LONG PAR ERR. For a better understanding of the check characters and the type of parity being monitored, reference may be made to the above-mentioned patent application Ser. No. 434,742 and articles.

A status register 37 of the magnetic tape peripheral adapter MPA includes a series of latches, only pertinent ones of which are shown in FIG. 1. The status register latches are set by the various different error detecting units as hereinafter described in greater detail. A latch BIT 14 of the status register 37 is set by the output of the gate 29 when it is enabled for determining that the tape 12 has become broken or otherwise damaged so that the photo-optic sensing devices 25 and 27 no longer detect the presence of the tape 12.

A latch BIT 19 of the status register 37 is set when the LRC check character has been read by gate circuits (not shown), the circuitry for enabling the latch BIT 19 being disclosed in the foregoing-mentioned patent application Ser. No. 434,742. A latch BIT 20 of the status register 37 is set in response to an AND gate 38, which in turn is enabled by the time-out signal from the check character timer 32 indicating that the LRC character is overdue, the gate 38 being also enabled by the reset output of the latch BIT 19 indicating that the LRC check character has not been received and by the clock signals PH1 and PH2. The time-out signal is generated in response to a count of 21 from the check character timer 32 as more fully described in the above-mentioned patent application Ser. No. 434,742. A BIT 21 latch of the status register 37 is set by a signal VERT PAR ERR from the vertical parity error detector 34, and similarly a BIT 22 latch of the status register 37 is set by a signal LONG PAR ERR of the longitudinal parity error detector 36.

A latch BIT 23 of the status register 37 is a common latch and is set by an OR gate 41 in response to any one of the four latches BIT 14, BIT 20, BIT 21 and BIT 22 indicating that a malfunction has been detected. A set of AND gates 43 when enabled by an instruction signal 200 from an encoder 45 connect the outputs of the status register 37 to a bus 47 to the computer central processor CCP so that it can determine the status of those latches, the encoder 45 being responsive to an instruction received from the computer central processor CCP which in turn formulates and receives those instructions from a program F-74 stored in the computer main memory CMM as hereinafter described in greater detail. The encoder 45 as described in greater in the foregoing-mentioned patent application Ser. No. 434,742 supplies signals for controlling the operation of the magnetic tape peripheral adapter MPA in response to instruction information received from the computer central processor CCP.

Considering now the ticketing device buffer TDB, the device buffer TDB includes a data register and gates therefor generally indicated at 49 for temporarily storing data received from the magnetic tape peripheral adapter MPA and from the computer central processor CCP. The register 49 also serves as a temporary storage area for a scanner peripheral adapter (not shown), which is associated with a scanner (not shown) for monitoring busy connections through the system for generating ticketing information for the computer central processor CCP as more fully described in the foregoing-mentioned patent application Ser. No. 434,742. Thus, the data from the three sources are gated at different times to the register 49. Also, the gates are employed to transfer the data information from the register 49 to the three units—the magnetic tape peripheral adapter MPA, the scanner peripheral adapter SPA and the computer central processor CCP. As more fully and completely described in the above-mentioned patent applications, under normal operation, the scanner peripheral adapter supplies information to the register 49, which in turn transfers the information to the computer central processor. After processing the information, ticketing information is then transferred from the computer central processor CCP to the register 49, which in turn transfers the information to the magnetic tape peripheral adapter MPA for temporary storage in its right register (now shown) as more fully described in the above-mentioned patent application Ser. No. 434,742. The information is transferred from the magnetic tape peripheral adapter right register to the right heads 16 of the magnetic tape electronic unit MTE for transferring the information to tape 12. The magnetic tape electronic unit MTE is also adapted to read information from a tape, for example, during the loading of programs into the computer main memory CMM, and in this regard, the read heads 21 sends the information from tape and transfer it to a read register (now shown) of the magnetic tape peripheral adapter MPA, whereby the information can then be transferred from the read register to the ticketing device buffer register and gate 49.

A status register 52 comprises a series of bi-stable devices in the form of latches, only some of which are shown in FIG. 1.

A latch BIT 0 of the status register 52 is set by a signal LOADING ERR which is generated by circuits (not shown) as more fully described in the foregoing-mentioned patent application Ser. No. 434,742. The setting of the latch BIT 0 indicates that the register and gates 49 is loaded with a word of information and a new data word of information is attempted to be loaded into the register before removing the old data word. A latch BIT 1 is set by the output of a Z field 1-of-N check circuit 54, which is a 1-of-N check circuit for detecting errors in the Z instruction field received from the central processor CCP and decoded by a decoder (not shown) in the ticketing device buffer TDB, the decoded Z field being supplied to the encoder 45 as more fully described in the foregoing-mentioned patent application Ser. No. 434,742. For the purpose of the present invention, it is only necessary to state that the instructions received from the computer central processor CCP are received in the form of an X field, a Y field and a Z field, the X and Z fields being decoded in the ticketing device buffer TDB and the Y field being decoded in the magnetic tape peripheral adapter MPA. A latch BIT 1, a latch BIT 2 of the status register 52 is set by an output of an X field 1-of-N check circuit 56, which senses errors occurring in the decoded output of the X field. It should be understood that there is a Y field 1-of-N check circuit (not shown) in the magnetic tape peripheral adapter MPA for setting a latch (not shown) of the status register 37, the error detecting units and the status register latches shown in FIG. 1 are represented to illustrate the principles of the present invention.

A latch BIT 6 of the status register 52 is set by the output of a data parity error detector circuit 58, which senses parity errors occurring in the register 49. A latch BIT 5 of the status register 52 is enabled by the output of an OR gate 59 which is in turn enabled by the output of an OR gate 59 which is in turn enabled by any one of the other four latches BIT 0, BIT 1, BIT 2 and BIT 6. The gate 59 is also enabled by a signal from the ticketing scanner unit in a similar manner. In this regard, the ticketing scanner unit contains a scanner peripheral adapter which also includes a status register and sensing units which are not described herein since it is only deemed necessary to describe in detail only the status register and error detecting devices of one of the peripheral adapters associated with the ticketing device buffer to illustrate the principles of the present invention.

A set of AND gates 61 gate the outputs of the status register 52 to the cable 47 for presentation to the computer central processor CCP. An encoder 63, when it generates its signals, enables the gates 61 in response to an instruction received from the computer central processor CCP via the cable 47.

A pair of latches LEZ2 INT and TDB ERROR SENSE LINE of the computer line processors CCP are enabled whenever the latch BIT 5 of the ticketing device buffer status register 52 is enabled for generating signals via AND gates 65 and 67 to the cable 47 for presentation to the computer central processor CCP to serve as an interrupt indicating that an error has occurred. In response to that interrupt signal, the computer central processor CCP responsive to the program module F-74 stored in the computer main memory CMM then isolates the source of the malfunction. In this regard, the computer central processor CCP initially sends an instruction to the encoder 63 to generate the signal for enabling gate 61 to gate the outputs of the status register 52 to the cable 47 for presentation to the computer central processor CCP. As a result, the computer central processor CCP in using the program module F-74 stored in the main memory CMM determines which one of the four error latches is set to thereby discover the source of the malfunction if it occurred in the ticketing device buffer TDB. If none of the latches, other than the main latch BIT 5, of the status register 52 is set, the computer central processor CCP sends an instruction to the encoder 45 to generate the signal 200 for enabling the gate 43, which in turn gate the outputs of the status register 37 to the cable 47 for presentation to the computer central processor CCP. Therefore, the computer central processor CCP can then quickly discover which one of the error latches in the status register 37 is set. As a result, if one of the error latches of the status register 37 is set, the computer central processor CCP thereby quickly ascertains the source of the malfunction. If none of the error latches of the status register 37 is set, then the computer central processor CCP performs diagnostic procedures under software control on both the ticketing device buffer TDB and the magnetic tape peripheral adapter MPA.

Software Procedure

Referring now to FIGS. 2-1 through 2-11 of the drawings, the software procedure in the form of program module F-74 will now be described. Only FIGS. 2-8 through 2-10 are of particular interest and thus need be described. A source listing based on module F-74 containing explanatory comments for each set of code is included herein as Appendix A. It should be understood that while the program instructions embodied in that listing and the flow chart organization are employed in the preferred form of the present invention, hardware circuits or manually controlled switches may also be employed to control the arrangement of the present invention as will become apparent to those skilled in the art.

As shown in box 201 of the drawings, the module subprogram F74X05 receives control after a ticketing device buffer error interrupt has occurred. The interrupt cause and analysis program (not shown) senses the TDB buffer error interrupt and gives control to F74X05 — the magnetic tape error handler module. As shown in box 202, at this time the system interrupts are disabled. At box 203, computer registers which were not saved by interrupt cause and analysis program are saved by F74X05, which has the first task to determine which TDB buffer is in error (the A unit or the B unit) as shown in boxes 204–207. Index register 3 is set to 0 for unit A or a 1 for unit B. As shown in box 208, an integrity check is made to insure that the unit which signaled the error interrupt was given an assignment to perform. If no assignment was given, a false interrupt was generated, the magnetic tape drive is instructed to stop, all registers in the MPA adapter are reset, all computer processor registers are restored and control is returned to the interrupt cause and analysis program as shown in boxes 247–249, 224–226. The audit timer for timing the return of the TDB interrupt is reset because the TDB error interrupt validly occurred within the prescribed time limit as indicated by box 209.

Referring now to box 210 of the drawings, a check is made to determine whether this error is the result of an attempted retrial of an initial error. If this is the case a fault exists in the subsystem and reconfiguration and diagnostic program must be scheduled. As shown in boxes 211, 251 through 258 and 223 through 226, a check is made to determine if the request write action was a diagnostic request. If it was, then TDB buffer and MPA adapter status directives are obtained and an error code of 3 is returned to the diagnostic program. If the error was on an advance tape an error code of 9 is given to the diagnostic program along with TDB and MPA status.

As shown in boxes 213 and 214, if the request was a non-diagnostic access a check is made to determine whether an advance tape directive was given to the MPA. If not, then the error block count (FMGRBA) is incremented by 1. The MPA and TDB status is obtained and the magnetic tape drive is stopped and all registers and flaps in the TDB and MPA are reset. As shown in box 227, the job is to be retried and therefore the retry indicator (FMGRTY) is set. As shown in box 228, the ready interrupt switch (FMGRDS) is set to 040000014 in base 8 code. As shown in boxes 229–231, an advance tape command is given to the MPA adapter, the computer registers are restored; the interrupt time out audit is set to insure the response of the MPA adapter; system interrupts are enabled and control is returned to the interrupt cause and analysis program as shown in boxes 224–226.

As shown in box 232, if an error was detected upon the retrial of an initial error a fault is determined to exist in the magnetic tape subsystem. The error block count (FMHRBA) is incremented by 1. As shown in boxes 233–234, the magnetic tape drive is stopped and all registers and flip-flops in the TDB buffer and MPA adapter are reset. After the advance tape (success or failure) the TDB buffer and MPA adapter are reset. As shown in box 235, the TDB buffer and MPA adapter status bits are checked to determine whether a fault exists in the TDB or MPA units.

As shown in boxes 218 and 250, if the adapter MPA was at fault, MPA localization diagnostics are scheduled to run on the faulty unit via the DIACON mechanism Q-register set to 0. As shown in boxes 237–240, a request is made to the configuration control program (CONFIG) to set the faulty MPA adapter in a maintenance out of service (MOS) condition. A check is made to determine whether the MOS request was allowed. As shown in boxes 242–243, if the request was allowed the aforementioned diagnostics (localization) are scheduled on the faulty unit. If the request to CONFIG was not allowed no localization is allowed. As shown in boxes 219–221, an interval is timed for the next program access to the adapter MPA. This is done so that all internal MPA timers are allowed to reset. After the interval a check is made to determine whether any further tasks remain.

As shown in boxes 235–236, if the status bits determine the TDB buffer to be at fault, a check is made to determine whether the TDB buffer is already maintenance out of service. As shown in box 237, if the TDB buffer is not out of service, a request is made to the configuration control program to place the TDB maintenance out of service. As shown in boxes 238–239, if the request is allowed TDB localization is scheduled via diagnostic control to run on the faulty unit. As shown in box 240, if the configuration request was not allowed or if the TDB buffer was already in a maintenance out of service condition, localization is not scheduled upon the TDB buffer. The interval timer is set for allowing MPA timers to recover and when it expires the queues are interrogated for further tasks. Computer registers are restored and control is returned to the interrupt cause and analysis program.

The solution here is the examination of the status bits provided by the ticketing device buffer and the magnetic tape peripheral adapter MPA to determine which unit is at fault and based upon that determination remove the proper unit (TDB or MPA) from service and schedule diagnostic programs to isolate the fault.

```
                                                 F74      BOGAC2 MAG TAPE HANDLER
   PAGE  004        6/13/75     TIME :  9:58 AM
                                 0028            LNKTAB  F74X,F74X01,F74X02,F74X03,F74X04,F74X05              00030
                                 ++1      F74X   TOPP
        00000     00000000       ++1             NDS     0
                                 ++1             PPCT
                                 ++1             DSICHK  F74X01,F74X02,F74X03
** R    00001   0 11 00001       ++2             BUN     (F74X01)                                                **
                                 ++1             TOPP
        00002     00000000       ++1             NDS     0
                                 ++1             PPCT
                                 ++1             DSICHK  F74X02,F74X03,F74X04
** R    00003   0 11 00003       ++2             BUN     (F74X02)                                                **
                                 ++1             TOPP
        00004     00000000       ++1             NDS     0
                                 ++1             PPCT
                                 ++1             DSICHK  F74X03,F74X04,F74X05
```

-continued

```
** R   00005  0 11 00005   ++2              BUN     (F74X03)                                          **
       00006   00000000    ++1              TOFP
                           ++1              NDS     0
                           ++1              PROT
                           ++1              DSICHK  F74X04,F74X05,¬
** R   00007  0 11 00007   ++2              BUN     (F74X04) .                                        **
                           ++1              TOFP
       00010   00000000    ++1              NDS     0
                           ++1              FRCT
                           ++1              DSICHK  F74X05,¬,¬
** R   00011  0 11 00011   ++2              BUN     (F74X05)                                          **
```

```
                                   F74     BOGAC2 MAG TAPE HANDLER
PAGE  005      6/13/75    TIME :  9:58 AM

   00012  0 54 00012   0030  F74X01  LDA     =1                SET HANDLER BUSY
   00013  0 55 00013   0031          STA     FMGBUS
   00014  3 26 00014   0032          STX     FMGXR3,3          SAVE XR3
   00015  5 22 00015   0033          CAX     *FMPA32,1         GET WA ADDRESS
   00016  1 64 00016   0034  A005    LDQ     FWALRN,1          GET LRN  START HERE AFTER Q SCAN
   00017   03600201    0035          CRR     RQ,RA
   00020  0 50 00020   C036          ANA     FWAOPM.M
   00021  0 123 0007   0037          LRA     FWAOPM.L
   00022  0 55 00022   0038          STA     FMGOPM            SAVE OUTPUT MODE
   00023   03600201    0039          CRR     RQ,RA
   00024  0 50 00024   C040          ANA     FWAROT.M
   00025  0 123 0005   0041          LRA     FWAROT.L
   00026  0 55 00026   0042          STA     FMGROT            SAVE REQUEST TYPE
   00027   03600201    0043          CRR     RQ,RA
   00030  0 50 00030   C044          ANA     FWASUR.M
   00031  0 123 0004   0045          LRA     FWASUR.L
   00032  0 55 00032   C046          STA     FMGSUR            SAVE SPECIFIC UNIT REQUESTED ANSWER
   00033   03600201    0047          CRR     RQ,RA
   00034  0 50 00034   0048          ANA     FWASUN.M
   00035  0 123 0003   0049          LRA     FWASUN.L
   00036  0 55 00036   0050          STA     FMGSUN            SAVE SPECIFIC UNIT IDENTITY
   00037   03600201    CC51          CRR     RQ,RA
   00040  0 50 00040   0052          ANA     FWAMDI.M          MASK OUT MAINT DIRECTIVE
   00041  0 123 0014   0053          LRA     FWAMDI.L
   00042  0 55 00042   0054          STA     FMGMDI            SAVE MAINTENANCE DIRECTIVE
   00043  0 65 00043   C055          STQ     FMGPGT            SAVE PROGRAM TYPE
   00044  1 54 00044   0056          LDA     FWAWCN,1
   00045  0 50 00045   0057          ANA     FWAWCN.M
   00046  0 55 00046   0058          STA     FMGWCN            SAVE USER'S WORD COUNT
                       0059  *
   00047  1 64 00047   0060          LDQ     FWADSA,1          GET 17 BIT START ADDRESS
   00050   03600201    0061          CRR     RQ,RA
   00051  0 50 00045   0062          ANA     FWASDA.M          GET 15 BIT ADDRESS ON GIVEN PAGE
   00052  0 55 00052   0063          STA     FMGSDA            SAVE ADDRESS
   00053   03600201    0064          CRR     RQ,RA
   00054  0 50 00054   C065          ANA     =0300000          GET PAGE BITS
   00055  0 123 0017   0066          LRA     15
   00056  0 55 00056   0067          STA     FMGPGE            SAVE PAGE BITS
```

```
                                   F74     BOGAC2 MAG TAPE HANDLER
PAGE  006      6/13/75    TIME :  9:58 AM

   00057  0 54 00032   0069          LDA     FMGSUR            IF SPECIFIC UNIT WAS NOT REQUESTED, PROCESS
   00060  0 13 00067   C070          BZA     A050             REQUEST AS A NORMAL CRB
   00061  0 54 00026   0071          LDA     FMGROT             GET REQUEST TYPE
   00062   C3600120    0C72          CRR     RA,X3
   00063  3 11 00064   0073          BUN     A010,3
                       C074  *                                BRANCH LIST
   00064  0 11 00067   0075  A010    BUN     A050               =0  NORMAL CRB
   00065  0 11 00217   0076          BUN     M010               =1  MAINTENANCE
   00066  0 11 00171   0077          BUN     F010               =2  OTHER DATA BLOCKS (APPLICATIONS)
```

```
                                   F74     BOGAC2 MAG TAPE HANDLER
PAGE  007      6/13/75    TIME :  9:58 AM

                       0079  *    CONTROL IS PASSED TO THIS SECTION WHEN IT IS DETERMINED THAT A CALL
                       C080  *    RECORD BLOCK IS TO BE CUTPUT OR WHEN NO SPECIFIC UNIT WAS REQUESTED

   00067  2 22 00001   0082  A050    CAX     1,2               GET MPA-A STATUS
   00070  0 62 00205   0083          BSP     F74S01            MPA STATUS GETTER
   00071  0 13 00101   0C84          BZA     A060              MPA-A IS ACTIVE  CHECK TOB-A
                       0C85  *
   00072  2 22 00002   CC86          CAX     2,2                PA UNIT B
   00073  0 62 00205   0087          BSP     F74S01
   00074  0 13 00101   0C88          BZA     A060              MPA-B IS ACTIVE CHECK TDB-B
   00075  2 22 00032   0C89  A055    CAX     F0027,2
                       C090          PGLINK  F02,F02X03        PUT REQUEST AT FRONT OF NORMAL QUEUE
   00076  3 22 00004   ++1           CAX     4,3
** R 00077  4 62 00077 ++1   M       BSP     *(F02)                                                      **
   00100  0 11 00343   0091          BUN     M501              BRANCH TO TERMINATE PROCESSING
                       CC92  *
   00101  2 20 00001   0093  A060    ADX     1,2               CONVERT MPA INDEX TO TDB INDEX
   00102  0 62 00212   0094          BSP     F74S02             GET TDB STATUS
   00103  0 13 00105   C095          BZA     A079              TDB READY
   00104  0 11 00075   C096          BUN     A055              BRANCH TO REQUEUE REQUEST
                       0C97  *
   00105  0 54 00061   0098  A079    LDA     FMGROT            CHECK IF BLOCK COUNT IS TO BE INSERTED
   00106  0 51 00106   C099          ORA     FMGPTY            FORMAT BLOCK COUNT ONLY IF REQUEST IS FOR A
   00107  0 73 00107   0100          SANG    =0                CRB AND RETRY IS NOT IN PROGRESS
   00110  0 11 00141   0101          BUN     A080              YES, DON'T FORMAT BLOCK COUNT VALUE
                       C102  *                                FORMAT BLOCK COUNT VALUE
   00111  2 54 00111   0103          LDA     FMHCRA-2,2        GET CALL RECORD COUNT
   00112  0 C1 00001   0104          ADI     1                         INCREMENT FOR NEXT CRB

                       0106  *    THE FOLLOWING CODE CONVERTS A BINARY NUMBER INTO BCD DIGITS

   00113   03610020    0108          CCR     ,X3
   00114  3 26 00114   0109          STX     FMGERS,3          CLEAR SCRATCH STORAGE
   00115  0 13 00126   0110  A082    BZA     A081              BRANCH IF # HAS BEEN COMPLETELY CONVERTED
   00116   03610102    0111          CCR     RA,RQ
   00117  0 43 00117   0112          DIV     =10
   00120   03620102    0113          EXR     RA,RQ
   00121  3 122 0000   0114          LLA     0,3               SHIFT NEW DIGIT INTO PROPER POSITION
   00122  0 46 00114   0115          ADM     FMGERS            UPDATE SCRATCH STORAGE
   00123  3 20 00004   0116          ADX     4,3               ADJUST INDEX FOR NEXT DIGIT
   00124   03600201    0117          CRR     RQ,RA
   00125  0 11 00115   C118          BUN     A082

   00126  0 64 00122   0120  A081    LDQ     FMGERS            RETRIEVE CONVERTED VALUE
   00127  5 22 00056   0121          CAX     *FMGPGE,1         GET PAGE IDENTITY
   00130  0 54 00052   0122          LDA     FMGSDA            GET START DATA ADDRESS OF BLOCK
   00131  1 47 00131   C123          XEC     GPGLPG,1          SET PAGE REGISTER
   00132   03600104    0124          CRR     RA,X1             MOVE START DATA ADDRESS OF BLOCK
   00133  1 54 00001   0125          LDA     1,1               GET SECOND WORD OF BLOCK
   00134  0 030 7400   0126          ANL     07400              THROW AWAY OLD BLOCK COUNT VALUE
   00135  0 031 000C   C127          ANR     0
   00136   03600301    0128          CRR     RA++RQ,RA         MERGE BLOCK COUNT VALUE
   00137  1 55 00001   0129          STA     1,1               SAVE IT
   00140  0 661 0000   C130          LPD     0                 RESTORE PAGE ID

   00141  0 62 01354   0132  A080    BSP     F74A02            BRANCH TO SET PROPER CHANNEL BUSY AND
                       0133  *                                SCANNER INTERLOCK BIT

   00142  2 54 00142   0135          LDA     FMHBLA,2          GET BLOCK VALUE
   00143  0 C1 00001   C136          ADI     1                 ADD 1
   00144  0 73 00144   0137          SANG    =999999           IS IT GREATER THAN 999999?
   00145  0 54 00012   0138          LDA     =1                YES, RESET COUNT = 1
   00146  2 55 00142   0139          STA     FMHBLA,2

   00147  0 44 00147   0141  A190    AOM     EPS013            SET CRITICAL I/O IN PROGRESS
                       0142  *
   00150  2 47 00150   0143          XEC     FCL017,2           CLEAR APPROPRIATE UNIT
   00151  0 26 00151   0144  A140    STX     FMGRDS,0           SET READY SWITCH FOR 4 MORE WORDS
                       0145  *
   00152  0 54 00022   0146  A180    LDA     FMGOPM             GET OUTPUT MODE
   00153  0 13 00156   0147          BZA     A110               6 BYTE
   00154  2 47 00154   0148  A130    XEC     FCL216,2           3 BYTE SELECT UNIT
```

```
                                          F74     BOGAC2 MAG TAPE HANDLER
PAGE  008        6/13/75     TIME :  9:58 AM

   00155  0 11 00157    0149           BUN      A120
   00156  2 47 00156    0150   A110    XEC      FCL215,2          6 BYTE SELECT UNIT
   00157  0 62 01336    0151   A120    BSP      F74A01            CALL OUTPUTTER
                        0152   *
   00160  0 26 00147    0153   A150    STX      EPS013,0          RESET CRITICAL I/O OPERATION
                        0154   *
   00161   03601004     0155           CRP      X2,X1             PUT UNIT ID IN X1
   00162  0 64 00162    0156           LDO      =040000000       INDICATE TO SET I/O AUDIT
   00163  0 62 01451    0157           BSP      F74A06           CALL CCX RECOVERY AND SET I/O AUDIT
                        0158   A170    PGPTRN   R,F74X,FMGXB3,,E  RETURN TO CALLER
   00164  7 22 00014    ++1            CAX      *FMGXB3,3
                        ++1            ENIMAC
   00165  0 45 00165    ++2            SCM      ESL003
   00166  0 77 00165    ++2            SMNN     ESL003
   00167   03700002     ++2            ENI
** R   00170  7 10 00170    ++1            RTN      *(F74X),3                                              **

                                          F74     BOGAC2 MAG TAPE HANDLER
PAGE  009        6/13/75     TIME :  9:58 AM

                        0160   *     CONTROL IS TRANSFERRED TO THIS ROUTINE FOR ALL NON-MAINTENANCE NON-
                        0161   *     CRB DATA BLOCKS THAT DO NOT REQUEST DATA TO BE WRITTEN ON A SPECIFIC
                        0162   *     UNIT

   00171  0 54 00036    0164   F010    LDA      FMGSUN               GET UNIT #(PA #)
   00172  2 22 00001    0165           CAX      1,2               UNIT A
   00173  0 13 00175    0166           BZA      F020
   00174  2 20 00001    0167           ADX      1,2               PA UNIT B
   00175  0 62 00205    0168   F020    BSP      F74S01
   00176  0 045 0006     0169           SRNZ     06                US PA OS OR MOS
   00177  0 11 00201    0170           BUN      F030              NO OK
   00200  0 11 00346    0171           BUN      E010              ERROR HARD UNAVAIL
   00201  2 20 00001    0172   F030    ADX      1,2               CHANGE PA # TO TDB #
   00202  0 62 00212    0173           BSP      F74S02            GET TDB STATUS
   00203  0 13 00141    0174           BZA      A080              REQUESTED UNIT READY
   00204  0 11 00346    0175           BUN      E010              HARD UNAVAIL

                                          F74     BOGAC2 MAG TAPE HANDLER
PAGE  010        6/13/75     TIME :  9:58 AM

                        0177   F74S01  NPENDS   0
                        ++1            TOPP
   00205   00000000     ++1            NDS      0
                        ++1            PROT
                        0178           SYSTAT   PA,TDB
                        ++1            SYSTAA   TDB
                        ++2            CLPR     HSTAAJ,2
   00206  2 54 00206    ++3    A       LDA      HSTAAJ,2
   00207  0 50 00207    ++3    F       ANA      HSTAAJ.M
   00210  0 123 0006     ++3    G       LPA      HSTAAJ.L--
   00211  4 11 00205    0179           BUN      *F74S01
                        0180   *
                        0181   *
                        0182   *
                        0183   F74S02  NPENDS   0
                        ++1            TOPP
   00212   00000000     ++1            NDS      0
                        ++1            PROT
                        0184           SYSTAT   CONTPL
                        ++1            CLPR     HSTAAD,2
   00213  2 54 00213    ++2    A       LDA      HSTAAD,2
   00214  0 50 00214    ++2    F       ANA      HSTAAD.M
   00215  0 123 0022     ++2    G       LPA      HSTAAD.L--
   00216  4 11 00212    0185           BUN      *F74S02

                                          F74     BOGAC2 MAG TAPE HANDLER
PAGE  011        6/13/75     TIME :  9:58 AM

                        0187   *                 MAINTENACE SECTION
                        0188   *
                        0189   *
   00217  0 54 00171    0190   M010    LDA      FMGSUN            GET UNIT IDENTITY
   00220  2 22 00001    0191           CAX      1,2
   00221  0 13 00223    0192           BZA      M020               UNIT A.
   00222  2 20 00001    0193           ADX      1,2                PA UNIT B
   00223  0 62 00205    0194   M020    BSP      F74S01             GET PA STATUS
   00224  0 C41 0004     0195           SRNT     04                 IS IT OS
   00225  0 11 00346    0196           BUN      E010               YES
   00226  2 20 00001    0197           ADX      1,2                CHANGE PA# TO TDB #
   00227  0 62 00212    0198           BSP      F74S02
   00230  0 C41 0002     0199           SRNT     02                 IS TDB OS
   00231  0 11 00346    0200           BUN      E010               YES
   00232  0 62 01354    0201           BSP      F74A02            SET TDB BUSY AND CHECK SCANNER INTERLOCK
   00233  0 44 00160    0202   A300    ACM      EPS013            INDICATE THAT CRITICAL I/O IS IN PROGRESS
   00234  2 47 00150    0203           XEC      FCL017,2              CLEAR APPROPRIATE UNIT
   00235  7 22 00042    0204   M030    CAX      *FMGMDI,3          GET MAINTENANCE DIRECTIVE
   00236  0 54 00046    0205           LDA      FMGWCN
   00237  0 55 00237    0206           STA      FMGNTR
   00240  0 26 00151    0207           STX      FMGRDS,0           SET INT SWITCH FOR MORE DATA
   00241  3 11 00242    0208           BUN      M040,3
   00242  0 11 00264    0209   M040    BUN      A200              =0 TRAILER LABEL AND 2 TAPE MARKS
   00243  0 11 00267    0210           BUN      M050              =1 264-STATUS-210-017
   00244  0 11 00302    0211           BUN      M100              =2 210-STATUS-017
   00245  0 11 00304    0212           BUN      M110              =3 212-STATUS-017
   00246  0 11 00306    0213           BUN      M120              =4 213-STATUS-017
   00247  0 11 00310    0214           BUN      M130              =5 214-STATUS-017
   00250  0 11 00312    0215           BUN      M140              =6 217-STATUS-017
   00251  0 11 00314    0216           BUN      M150              =7 201-DATA-RB-STATUS-210-017
   00252  0 11 00320    0217           BUN      M160              =8 202-DATA-RB-STATUS-210-017
   00253  0 11 00324    0218           BUN      M170              =9 203-DATA-RB-STATUS-210-017
   00254  0 11 00274    0219           BUN      M080              =10 215-DATA-214-RB-STATUS-210-017
   00255  0 11 00277    0220           BUN      M090              =11 216-DATA-214-RB-STATUS-210-017
   00256  0 11 00271    0221           BUN      M060              =12 215-DATA-207-DATA-217-STATUS
   00257  0 11 00156    0222           BUN      A110              =13 215--DATA-211--217 STATUS
   00260  0 11 00154    0223           BUN      A130              =14 216--DATA-211--217-STATUS
   00261  0 11 00151    0224           BUN      A140              =15 LEV DATA BLOCKS
   00262  0 11 00330    0225           BUN      M270              =16 TAPE MARK ONLY
   00263  0 11 00334    0226           BUN      M275              =17 LEV HDR LABEL AND TAPE MARK

                                          F74     BOGAC2 MAG TAPE HANDLER
PAGE  012        6/13/75     TIME :  9:58 AM

   00264  0 54 00264    0228   A200    LDA      =020000+9          INDICATE 2 TAPE MARKS ARE TO BE WRITTEN
                        0229   *                                 AFTER TRAILER LABEL
   00265  0 55 00240    0230           STA      FMGRDS                       SET TRAILER LABEL IN READY SWITCH
   00266  0 11 00152    0231           BUN      A180
   00267  2 47 00267    0232   M050    XEC      FCL264,2
   00270  0 11 00160    0233           BUN      A150
   00271  0 54 00271    0234   M060    LDA      =040000001          SET READY SWITCH =1
   00272  0 55 00265    0235           STA      FMGRDS
   00273  0 11 00156    0236           BUN      A110
   00274  0 54 00274    0237   M080    LDA      =040000003          SET READY SWITCH  =3
   00275  0 55 00272    0238           STA      FMGRDS
   00276  0 11 00156    0239           BUN      A110                215
   00277  0 54 00277    0240   M090    LDA      =040000004          SET READY SWICH =4
   00300  0 55 00275    0241           STA      FMGRDS
   00301  0 11 00154    0242           BUN      A130                216
   00302  2 47 00302    0243   M100    XEC      FCL210,2
   00303  0 11 00337    0244           BUN      M500                GO GET STATUS AND QUIT
   00304  2 47 00304    0245   M110    XEC      FCL212,2
   00305  0 11 00337    0246           BUN      M500                GET STATUS AND QUIT
   00306  2 47 00306    0247   M120    XEC      FCL213,2
   00307  0 11 00337    0248           BUN      M500                GET STATUS QUIT
   00310  2 47 00310    0249   M130    XEC      FCL214,2
   00311  0 11 00337    0250           BUN      M500                GET STATUS QUIT
   00312  2 47 00312    0251   M140    XEC      FCL217,2
   00313  0 11 00337    0252           BUN      M500                GET STATUS QUIT
   00314  0 54 00314    0253   M150    LDA      =040000005          SET READY SWITCH =5
   00315  0 55 00300    0254           STA      FMGRDS
   00316  2 47 00316    0255           XEC      FCL201,2
   00317  0 11 00157    0256           BUN      A120                OUTPUT 4 WORDS
   00320  0 54 00320    0257   M160    LDA      =040000006          SET READY SWICH =6
   00321  0 55 00315    0258           STA      FMGRDS
   00322  2 47 00322    0259           XEC      FCL202,2
   00323  0 11 00157    0260           BUN      A120                OUTPUT 4 WORDS
   00324  0 54 00324    0261   M170    LDA      =040000007          SET READY SWITCH =7
   00325  0 55 00321    0262           STA      FMGRDS
   00326  2 47 00326    0263           XEC      FCL203,2
   00327  0 11 00157    0264           BUN      A120                OUTPUT 4 WORDS
   00330  2 47 00304    0265   M270    XEC      FCL212,2           ISSUE TAPE MARK
   00331  0 54 00331    0266           LDA      =040000000+8       INDICATE TO ISSUE ADVANCE TAPE AFTER STEP IS
   00332  0 55 00325    0267           STA      FMGRDS               EXECUTED SUCCESSFULLY
   00333  0 11 00160    0268           BUN      A150               RETURN TO CALLER
   00334  0 54 00334    0269   M275    LDA      =2                    INDICATE THAT TAPE MARK IS TO BE ISSUED
   00335  0 55 00332    0270           STA      FMGRDS                  AFTER OUTPUT IS COMPLETE
   00336  0 11 00152    0271           BUN      A180
```

```
                                      F74    BOGAC2 MAG TAPE HANDLER
PAGE  013      6/13/75     TIME :  9:58 AM

   00337   03601020    0273  M500    CRP     X2,X3              PUT UNIT IDENT IN X3                        00275
   00340  0 26 00233   0274          STX     EPS013,0          RESET CRITICAL I/O OPERATION                 00276
   00341  0 62 01413   0275          BSP     F74A04            UPDATE TDB AND HPA STATUS IN HA; ISSUE SEL017 00277
   00342  0 62 01441   0276          BSP     F74A05              SET EIO=0; SCHEDULE NEXT PROGRAM           00278
   00343  0 54 00145   0277  M501    LDA     =1                INDICATE THAT CRB INDICATOR SHOULD NOT BE    00279
                       0278  *                               RESET FOR THIS REQUEST                         00280
   00344  0 62 00363   0279          BSP     F74T01            GO TO TIMER                                  00281
   00345  0 11 00164   0280          BUN     A170              RETURN TO CALLER                             00282

                                      F74    BOGAC2 MAG TAPE HANDLER
PAGE  014      6/13/75     TIME :  9:58 AM

                       0282  E010    FLDSET  L,FWAEIO,1,1      HARDWARE UNAVAILABLE  EIO=1                  00284
   00346  1 54 00346   ++1           LDA     FWAEIO,1
   00347  0 50 00347   ++1   M6      ANA     FWAEIO.O
   00350  0 032 0010   ++1   M9      ORI     1*FWAEIO.P/010000
   00351  1 55 00346   ++1           STA     FWAEIO,1
                       0283          PGSKED  A,FWAEPP,1        SCHEDULE ERROR PROGRAM                       00285
   00352  1 54 00352   ++1           LDA     FWAEPP,1
   00353  1 55 00353   ++1           STA     FWANPG,1
   00354  0 50 00354   ++1           ANA     FWAPRI.M
   00355  0 123 0022   ++1           LRA     FWAPRI.L
                       ++1   M1      PGLINK  E01,E01X01
   00356  3 22 00000   ++2           CAX     0,3
** R 00357  4 62 00357   ++2   M       BSP     *(E01)                                                        **
   00360  0 54 00105   0284          LDA     FMGROT            PUT REQUEST TYPE IN RA                       00286
   00361  0 62 00363   0285          BSP     F74T01             GO TIME AND Q SCAN                          00287
   00362  0 11 00164   0286          BUN     A170               RETURN TO CALLER                            00288

                                      F74    BOGAC2 MAG TAPE HANDLER
PAGE  015      6/13/75     TIME :  9:58 AM

                       0288  *    THIS ROUTINE IS CALLED PRIOR TO RELEASING CONTROL OF THE HANDLER WHEN    00290
                       0289  *    A JOB HAS BEEN FINISHED. AT THIS TIME ALL HANDLER INTERNAL CONTROL       00291
                       0290  *    WORDS WILL BE INITIALIZED AND THE TIMER ROUTINE CALLED TO GIVE THE       00292
                       0291  *    HANDLER A REST BEFORE ANOTHER JOB IS PROCESSED. THIS ROUTINE WILL ALSO   00293
                       0292  *    RESET THE TICKETING BUFFER CONTROL BIT IF REQUIRED.                      00294
                       0293  *                                                                             00295
                       0294  *              INPUTS:                                                        00296
                       0295  *                     RA = 0 RESET CRB INDICATOR                              00297
                       0296  *                        = 1 DON'T RESET CRB INDICATOR                        00298

                       0298  F74T01  HPRNDS  0                                                      00300
                       ++1           TORP
   00363   00000000    ++1           NDS     0
                       ++1           PRCT
   00364  0 73 00107   0299          SANG    =0                SHOULD TO CRB BUFFER BUSY BIT BE RESET?      00301
   00365  0 11 00373   0300          BUN     A360              NO                                           00302
   00366  5 22 00235   0301          CAX     *FMGMDI,1         GET INDICATOR FOR CLEARING PROPER BUFFER     00303
   00367  0 54 00367   0302          LDA     TBCSTB            BUSY BIT                                     00304
   00370  1 50 00370   0303          ANA     FDZ,1                                                          00305
   00371  1 50 00371   0304          ANA     FDZ+11,1          RESET BUFFER FLUSH BIT                       00306
   00372  0 55 00367   0305          STA     TBCSTB                                                         00307
   00373  0 26 00373   0306  A360    STX     FMGINT,0          RESET SCANNER INTERLOCK                      00308
   00374  0 26 00374   0307          STX     FMGBSA,0          RESET CHANNEL 'A' BUSY INDICATOR             00309
   00375  0 26 00375   0308          STX     FMGBSB,0          RESET CHANNEL 'B' BUSY INDICATOR             00310
   00376  0 26 00106   0309          STX     FMGRTY,0          RESET RETRY INDICATOR                        00311
   00377  1 22 00001   0310          CAX     1,1                                                            00312
   00400  1 26 00400   0311          STX     FMGNPD,1          SET NUMBER OF WORDS TO READ =1               00313
   00401  1 26 00401   0312          STX     FMGWCT,1          SET NUMBER OF WORDS ALREADY OUTPUT = 1       00314
   00402  1 26 00015   0313          STX     FHPA32,1            RESET USER HITCHING POST                   00315
   00403  5 22 00403   0314          CAX     *FHPA33,1          GET SPECIAL WORK AREA ADDRESS               00316
   00404  1 26 00403   0315          STX     FHPA33,1           RESET SPECIAL HITCH POST                    00317
                       0316          TIMERA  =12,T,F74,F74X04         START 116 MS TIMER                    00318
                       ++1           GTIMER  =12,T,F74,F74X04,-
   00405  0 54 00405   ++2           LDA     =12
   00406  1 55 00044   ++2           STA     FWAINT,1
                       ++2           SETNEP  F74,F74X04,0,FWANPG
                       ++3           SETALL  F74,F74X04,0,FWANPG
   00407  0 54 00407   ++4   M5      LDA     =4*FWAELN.P+0*FWAPRI.P
** R 00410  0 01 00410   ++4   M9      ADI     (F74)                                                         **
   00411  1 55 00353   ++4           STA     FWANPG,1
                       ++2           FLDSET  L,FWATLR,1,3
   00412  1 54 00412   ++3           LDA     FWATLR,1
   00413  0 50 00347   ++3   M6      ANA     FWATLR.O
   00414  0 032 0030   ++3   M9      ORI     3*FWATLR.P/010000
   00415  1 55 00412   ++3           STA     FWATLR,1
                       ++1           PGLINK  E02,E02X01
   00416  3 22 00000   ++2           CAX     0,3
** R 00417  4 62 00417   ++2   M       BSP     *(E02)                                                        **
   00420  4 11 00363   0317          BUN     *F74T01            RETURN                                      00319

                                      F74    BOGAC2 MAG TAPE HANDLER
PAGE  016      6/13/75     TIME :  9:58 AM

                       0319  *    F74X02                                                                    00321
                       0320  *                                                                              00322
                       0321  *    READY INTERRUPT PROCESSOR                                                 00323
                       0322  *                                                                              00324
                       0323  F74X02  DSIMAC                                                                 00325
   00421   03700001    ++1           DSI
   00422  0 44 00166   ++1           AOM     ESL003
   00423  3 26 00164   0324          STX     FMGXR3,3          SAVE X3 FOR RETURN                           00326
   00424  3 23 00001   0325          CSX     1,3                                                            00327
   00425  0 043 0111   0326          SRNE    SL412              IS THIS TDB-A READY?                        00328
   00426  3 22 00000   0327          CAX     0,3                YES                                         00329
   00427  0 043 0121   0328          SRNE    SL422              IS THIS TDB-B READY?                        00330
   00430  3 22 00001   0329          CAX     1,3                YES                                         00331
   00431  3 31 00455   0330          BNX     B030,3             ERROR, NEITHER TDB READY                    00332
   00432  3 54 00374   0331          LDA     FMGBSA,3                                                       00333
   00433  0 030 0000   0332          ANI     0                  CLEAR DOUBLE ERROR INDICATOR                00334
   00434  0 13 00455   0333          BZA     B030               TRANSFER IF TDB NOT BUSY                    00335
   00435   03602004    0334          CRR     X3,X1                                                          00336
                       0335          IOARST  TMU               RESET I/O AUDIT                              00337
                       ++1           NUMBER  TMU
   00436  1 20 00024   ++1   ?       ADX     20,1
   00437   03600001    ++1           CRR     ,RA
   00440  1 55 00440   ++1           STA     MELTMR,1
   00441  0 77 00335   0336          SMNN    FMGRDS             IS THIS READY IN MIDDLE OF BLOCK?           00338
   00442  0 11 00467   0337          BUN     B200               NO, WE ARE AT END OF BLOCK                  00339
                       0338  *                               THIS IS NOT END OF BLOCK                       00340
   00443  0 54 00401   0339          LDA     FMGWCT             LOAD WORD COUNTER OUTPUT SO FAR             00341
   00444  0 73 00236   0340          SANG    FMGWCN             HAVE WE FINISHED ALL DATA WORDS?            00342
   00445  0 11 00462   0341          BUN     B100               YES, GO FINISH UP JOB                       00343
   00446  0 44 00340   0342          AOM     EPS013             NO, SET CRITICAL I/O OPERATION IN PROGRESS  00344
   00447  3 47 00447   0343          XEC     FCL211,3           ACCEPT MORE DATA  ON UNIT                   00345
   00450  0 62 01336   0344  B020    BSP     F74A01             LOAD NEXT 4 DATA WORDS INTO TDB             00346
   00451  0 26 00446   0345  B040    STX     EPS013,0           RESET CRITICAL I/O OPERATION IN PROGRESS    00347
   00452   03602004    0346  B025    CRR     X3,X1              SAVE UNIT ID IN XR1                         00348
   00453  0 64 00162   0347          LDO     =040000000        INDICATE TO SET I/O AUDIT                    00349
   00454  0 62 01451   0348          BSP     F74A06            CALL CCX RECOVERY AND SET I/O AUDIT          00350
                       0349  B030    PGRTRN  R,F74X,FMGXR3,,E    RETURN TO CALLER                           00351
   00455  7 22 00423   ++1           CAX     *FMGXR3,3
                       ++1           ENIMAC
   00456  0 45 00422   ++2           SOM     ESL003
   00457  0 77 00456   ++2           SMNN    ESL003
   00460   03700002    ++2           ENI
   00461  7 10 00170   ++1           RTN     *(F74X),3
                       0350  *                                                                              00352
                       0351  *   ALL OF DATA BLOCK HAS BEEN WRITTEN, WRITE CHECK CHARACTERS                 00353
   00462  3 47 00312   0352  B100    XEC     FCL217,3               WRITE THE CHECK CHARACTERS              00354
                       0353  *                                                                              00355
                       0354  *   SET SWITCH TO SAY OUTPUT COMPLETED UPON NEXT READY                         00356
                       0355  *                                                                              00357
   00463  0 54 00401   0356  B120    LDA     FMGRDS                                                         00358
   00464  0 51 00453   0357          ORA     =040000000        NORMAL COMPLETION SET                        00359
   00465  0 55 00463   0358          STA     FMGRDS                                                         00360
   00466  0 11 00452   0359          BUN     B025                                                           00361

   00467  0 54 00465   0361  B200    LDA     FMGRDS                STRIP OUT READY SWITCH POINTER           00363
   00470  0 50 00470   0362          ANA     =07777                                                         00364
   00471   03600104    0363          CRR     RA,X1                                                          00365
   00472  0 44 00451   0364          AOM     EPS013                     SET CRITICAL I/O IN PROGRESS        00366
   00473  1 11 00474   0365          BUN     B320,1                     BRANCH TO NEXT STEP                 00367
                       0366  *                                                                              00368
   00474  0 11 00513   0367  B320    BUN     B330           =0 JOB COMPLETE, CLEAN-UP                       00369
   00475  0 11 00572   0368          BUN     M200           =1 207-DATA                                     00370
   00476  0 11 00617   0369          BUN     M290           =2 212-SET UP FOR 210                           00371
   00477  0 11 00575   0370          BUN     M220           =3 214-SET UP FOR RB-6 BYTE MODE                00372
   00500  0 11 00600   0371          BUN     M230           =4 214-SET UP FOR RB-3 BYTE MODE                00373
   00501  0 11 00632   0372          BUN     M240           =5 RB                                           00374
   00502  0 11 00627   0373          BUN     M250           =6 RB-6 BYTE MODE                               00375
   00503  0 11 00632   0374          BUN     M240           =7 RB-3 BYTE MODE                               00376
   00504  0 11 00613   0375          BUN     M280           =8 210                                          00377
   00505  0 11 00604   0376          BUN     M260           =9 212                                          00378
   00506  0 11 00734   0377          BUN     M450    =10 NORMAL RETURN AFTER MAINTENANCE RB                 00379
```

```
PAGE 017        6/13/75     TIME :  9:58 AM  F74    BOGAC2 MAG TAPE HANDLER

 00507  0 11 00734   0378            BUN     M450           =11 ERROR RETURN AFTER MAINTENANCE RB
 00510  0 11 01027   0379            BUN     R010           =12 JOB RETRY-NOW MAINTENANCE REQUEST
 00511  0 11 00734   0380            BUN     M450           =13 ERROR RETURN AFTER UNEXPECTED ERROR INT
 00512  0 11 00623   0381            BUN     M300                  =14 READY INTERRUPT AFTER ADVANCE TAPE FOR
                     0382   *                             NON-MAINTENANCE RETRY
```

```
PAGE 018        6/13/75     TIME :  9:58 AM  F74    BOGAC2 MAG TAPF HANDLER

                     0384   *
                     0385   *   IF THIS IS NORMAL BLOCK, WE ARE FINISHED
                     0386   *
 00513  0 26 00472   0387   B330     STX     EPS013,0           RESET CRITICAL I/O
 00514  0 62 01413   0388            BSP     F74A04         UPDATE TIE AND MPA STATUS IN WA; ISSUE SEL017
 00515  3 26 00515   0389            STX     FJPC09,3        SAVE X3
 00516  0 041 0020   0390            SRNT    020            HAS EOT BEEN ENCOUNTERED?
 00517  0 11 00531   0391            BUN     B260           YES
 00520  0 045 0004   0392            SRNZ    04             IS THE WRITE RING ON THE TAPE?
 00521  0 11 00551   0393            BUN     B270           NO

                     0395   ***************************************************************
                     0396   *
                     0397   *                   WRITE OPERATION IS SUCCESSFUL, CLEAN-UP
                     0398   *
                     0399   ***************************************************************
 00522  0 54 00360   0400   B239     LDA     FMGRQT         GET REQUEST TYPE
 00523  0 72 00364   0401            SANE    =0               SKIP IF THIS IS NOT A CALL RECORD BLOCK
 00524  3 44 00524   0402            AOM     FMHCPA,3         INCREMENT CALL RECORD BLOCK COUNT
 00525  0 62 01441   0403   B240     BSP     F74A05           SET EIO=0; SCHEDULE NEXT PROGRAM
 00526  0 54 00522   0404   B250     LDA     FMGRQT
 00527  0 62 00363   0405   B251     BSP     F74T01         GO TO TIMER
 00530  0 11 00455   0406            BUN     B030

                     0408   ***************************************************************
                     0409   *
                     0410   *                          EOT FAULT
                     0411   *
                     0412   ***************************************************************
 00531  0 62 01516   0413   B260     BSP     F74A07          OUTPUT MAG TAPE EOT MESSAGE
 00532  7 22 00515   0414            CAX     *FJPC09,3       RESTORE UNIT IDENTITY TO X3
 00533  0 54 00526   0415            LDA     FMGRQT          GET REQUEST TYPE
 00534  0 043 0001   0416            SRNE    1               MAINTENANCE REQUEST?
 00535  0 11 00541   0417            BUN     B261            YES, SET ERROR CODE AND RETUN TO MAINTENANCE
 00536  0 64 00536   0418            LDQ     =-1                NO, INDICATE THAT MPA LOC IS NOT TO BE CALLED
 00537  0 62 01367   0419            BSP     F74A03          NON-MAINTENANCE, REQUEST CONFIG TO PLACE UNIT
                     0420   *                             MOS AND SCHEDULE MPA LOC IF REQUIRED
 00540  0 11 00522   0421            BUN     B239               BRANCH TO CLEAN-UP

 00541  5 22 00402   0423   B261     CAX     *FHPA32,1       GET USER WA
                     0424            FLDSET  L,FWAEIO,1,11   SET ERROR CODE = 11 (EOT FAULT)
 00542  1 54 00351   ++1             LDA     FWAEIO,1
 00543  0 50 00413   ++1    M6       ANA     FWAEIO.O
 00544  0 032 0130   ++1    M9       ORL     11*FWAEIO.P/010000
 00545  1 55 00542   ++1             STA     FWAEIO,1
                     0425   B262     PGLINK  F38,F38X03      SCHEDULE ERROR PROGRAM
 00546  3 22 00004   ++1             CAX     4,3
** R  00547  4 62 00547   ++1    M        BSP     *(F38)
 00550  0 11 00526   0426            BUN     B250                  BRANCH TO CLEAN-UP
                                                                                                   **
                     0428   ***************************************************************
                     0429   *
                     0430   *                      WRITE RING FAULT
                     0431   *
                     0432   ***************************************************************
                     0433   B270     FLDSET  L,FWAEIO,1,10   SET ERROR CODE = 10 (WRITE RING FAULT)
 00551  1 54 00545   ++1             LDA     FWAEIO,1
 00552  0 50 00543   ++1    M6       ANA     FWAEIO.O
 00553  0 032 0120   ++1    M9       ORL     10*FWAEIO.P/010000
 00554  1 55 00551   ++1             STA     FWAEIO,1
 00555  0 54 00533   0434            LDA     FMGRQT             GET REQUEST TYPE
 00556  0 043 0001   0435            SRNE    1                  MAINTENANCE REQUEST?
 00557  0 11 00546   0436            BUN     B262               YES
 00560  3 44 00560   0437            AOM     FMHRBA,3              INCREMENT ERROR BLOCK
 00561   03600002    0438            CRP     ,RO           INDICATE THAT MPA LOC IS TO BE CALLED
 00562  0 62 01367   0439            BSP     F74A03             NON-MAINTENANCE; REQUEST UNIT TO BE PUT MOS
                     0440   *                          AND SCHEDULE MPA LOC IF REQUIRED
 00563  5 22 00541   0441   B275     CAX     *FHPA32,1          RESTORE WA INDEX
 00564  0 72 00523   0442            SANE    =0                 WAS REQUEST SUCCESSFUL?
 00565  0 62 01544   0443            BSP     F74A08             BRANCH TO REQUEUE REQUEST
```

```
PAGE 019        6/13/75     TIME :  9:58 AM  F74    BOGAC2 MAG TAPE HANDLER

 00566  0 72 00343   0444            SANE    =1             WAS REQUEST ALLOWED TO BE REQUEUED?
 00567  0 11 00546   0445            BUN     B262           NO, SCHEDULE ERROR PROGRAM AND QUIT
 00570  0 54 00566   0446            LDA     =1                INDICATE THAT CRB BUFFER BUSY BIT IS NOT TO
                     0447   *                                BE RESET FOR THIS REQUEST
 00571  0 11 00527   0448            BUN     B251              BRANCH TO CLEAN UP
```

```
PAGE 020        6/13/75     TIME :  9:58 AM  F74    BOGAC2 MAG TAPE HANDLER

 00572  0 26 00467   0450   M200     STX     FMGRDS,0          RESET TO NORMAL
 00573  3 47 00573   0451            XEC     FCL207,3
 00574  0 11 00450   0452            BUN     B020              NEXT 4 WORDS
                     0453   *
                     0454   *
 00575  0 54 00237   0455   M220     LDA     FMGNTR
 00576  0 122 0001   0456            ILA     1
 00577  0 55 00575   0457            STA     FMGNTR
 00600  3 47 00310   0458   M230     XEC     FCL214,3          WRITE ERRONEOUS CHECK CHARS & READBACK
 00601  0 54 00314   0459            LDA     =040000005        SET READBACK NEXT
 00602  0 55 00572   0460   M225     STA     FMGRDS            4 WORD GIVEN
 00603  0 11 00451   0461            BUN     B040
                     0462   *
 00604  3 47 00330   0463   M260     XEC     FCL212,3          GIVE TAPE MARK COMMAND
 00605  0 54 00602   0464            LDA     FMGRDS
 00606  0 02 10000   0465            SBI     010000           DECREASE TAPE MARK COUNT BY ONE
 00607  0 044 0017   0466            SLNZ    017              WAS THIS THE LAST ONE TO BE OUTPUT
 00610  0 031 0000   0467            ANP     0                YES,INDICATE JOB COMPLETE AFTER NEXT READY
 00611  0 55 00605   0468            STA     FMGRDS           UPDATE READY SWITCH STATUS
 00612  0 11 00452   0469            BUN     B025              BACK TO MAINLINE

 00613  3 47 00302   0471   M280     XEC     FCL210,3         GIVE ADVANCE TAPE COMMAND
 00614  0 54 00464   0472            LDA     =040000000       INDICATE JOB COMPLETE AFTER NEXT READY
 00615  0 55 00611   0473            STA     FMGRDS
 00616  0 11 00452   0474            BUN     B025             BRANCH BACK TO MAINLINE

 00617  3 47 00604   0476   M290     XEC     FCL212,3            GIVE TAPE MARK COMMAND
 00620  0 54 00331   0477            LDA     =040000000+8        SET-UP FOR ADVANCE TAPE AFTER STEP IS COMPLET
 00621  0 55 00615   0478            STA     FMGRDS
 00622  0 11 00452   0479            BUN     B025                BRANCH BACK TO MAINLINE

 00623  0 26 00513   0481   M300     STX     EPS013,0         RESET CRITICAL I/O IN PROGRESS
 00624  5 22 00563   0482            CAX     *FHPA32,1        GET USER WA
 00625  1 54 00625   0483            LDA     FWATMU,1         RETRIEVE MPA STATUS
 00626  0 11 01253   0484            BUN     V122             BRANCH TO PROCESS CHANGEOVER
```

```
                               F74      BOGAC2 MAG TAPE HANDLER
PAGE  021      6/13/75     TIME :  9:58 AM

 00627  0 54 00577   C487  M250    LDA     FMGNTR          DOUBLE THE NUMBER OF WORDS THAT MUST BE      00489
 00630  0 122 0001   0488          LLA     1               READ FOR 6-BYTE MODE                          00490
 00631  0 55 00627   C489          STA     FMGNTR                                                        00491
 00632  3 47 00632   0490  M240    XEC     FCL001,3        CPATURE CURRENT TCB BUFFER DATA               00492
 00633  0 75 00126   C491          STC     FMGERS           SAVE STATUS                                  00493
 00634   03602004    C492          CRR     X3,X1           MOVE UNIT ID TO X1                            00494
 00635   03600002    0493          CRR     ,PO             SET I/O AUDIT INDICATOR                       00495
 00636  0 62 01451   C494          BSP     F74A06          CHECK FOR CCX ERROR                           00496
 00637  0 13 00647   C495          BZA     M320            BRANCH IF NOTHING WAS THERE                   00497

 00640  5 22 00400   C497          CAX     *FMGNRD,1     GET # OF WORDS WREAD +1                         00499
 00641  5 20 00624   C498          ADX     *FHPA32,1        ADD WA ADDR                                  00500
 00642  1 55 00625   0499          STA     FWATMU,1         PUT DATA WORD IN WA AT RIGHT SPOT            00501
 00643  0 44 00640   C500          AOM     FMGNRD           ADD 1 TO CCUNTER                             00502
 00644  0 54 00643   C501          LDA     FMGNRD           GET CCUNTER                                  00503
 00645  0 73 00631   C502          SANG    FMGNTR           IS WORD COUNT ACHIEVEC                       00504
 00646  0 11 00654   C503          BUN     M330             YES FINISHED                                 00505
 00647   70700647    C504  M320    SSNT    *FCLERR,3       UNIT ERROR                                    00506
 00650  0 11 00727   C505          BUN     M370            YES                                           00507
 00651   70700651    C506          SSNT    *FCLRDY,3       UNIT READY                                    00508
 00652  0 11 00632   C507          BUN     M240            YES                                           00509
 00653  0 11 00647   0508          BUN     M320            NO, BRANCH TO SCAN AGAIN                      00510

 00654  5 22 00641   C510  M330    CAX     *FHPA32,1        GET WA ACDR                                  00512
 00655  1 54 00406   C511          LDA     FWAWCN,1                                                      00513
 00656  0 50 00656   C512          ANA     FWAWCN.O         GET WORD COUNT  AND OUT FIELD                00514
 00657  0 51 00644   C513          ORA     FMGNRD           SET WORD COUNT IN FIELD                      00515
 00660  0 02 00001   0514          SBI     01                                                            00516
 00661  1 55 00655   C515          STA     FWAWCN,1         SET THE WORD IN THE WA                       00517
                     C516          FLDSET  L,FWADSA,1,11       SET STAR T ADDRESS                        00518
 00662  1 54 00047   ++1           LDA     FWADSA,1
 00663  0 50 00663   ++1   M6      ANA     FWADSA.O
 00664  0 51 00664   ++1   M10     ORA     =11*FWADSA.P
 00665  1 55 00662   ++1           STA     FWADSA,1
 00666  0 54 00366   0517          LDA     FMGMDI                                                        00519
 00667  0 02 00012   C518          SBI     10          GET MAINT DIR SUB BIAS FOR REG CHECK              00520
 00670  0 14 00725   C519          BNA     M360            BRANCH IF CHECK CHARACTERS SHOULD NOT BE READ 00521

 00671  0 54 00117   C521          LDA     =10             ALLOW 10 WORDS OF FILL BEFORE ABORTTING       00523
 00672  0 40 00657   C522          ADE     FMGNRD            TEST BECUASE OF MISSING LRC                 00524
 00673  0 55 00673   C523          STA     FJPC11          SAVE WORD COUNT                               00525
 00674   70700647    C524  M355    SSNT    *FCLERR,3       UNIT ERROR                                    00526
 00675  0 11 00727   C525          BUN     M370            YES                                           00527
 00676   70700651    0526          SSNT    *FCLRDY,3       UNIT READY                                    00528
 00677  0 11 00701   C527          BUN     M470            YES                                           00529
 00700  0 11 00674   C528          BUN     M355            NO, BRANCH TO SCAN AGAIN                      00530
 00701  5 22 00654   C529  M470    CAX     *FHPA32,1       PICK-UP WA                                    00531
 00702  1 44 00661   0530          AOM     FWAWCN,1        INCREMENT NUMBER OF WORDS READ                00532
 00703  5 20 00672   C531          ADX     *FMGNRD,1       ADJUST POINTER FOR NEXT WORD                  00533
 00704  3 47 00704   C532          XEC     FCLPTH,3        ENABLE PATH TO READ BUFFER                    00534
 00705  1 75 00642   C533          STC     FWATMU,1        SAVE WORD                                     00535
 00706  0 44 00703   C534          AOM     FMGNRD                                                        00536
 007C7  0 54 0C673   C535          LDA     FJPC11                                                        00537
 00710  0 72 00706   0536          SANE    FMGNRD          HAVE 10 WORDS BEEN READ?                      00538
 00711  0 11 00727   C537          BUN     M370            YES, ABORT FURTHER PROCESSING                 00539

 00712  3 47 00712   C539          XEC     FCL200,3        GET MAG TAPE STATUS FOR UNIT                  00541
 00713  0 75 00633   C540          STC     FMGERS           SAVE STATUS                                  00542
 00714   03602004    C541          CRR     X3,X1           MOVE UNIT ID TO X1                            00543
 00715   03600002    0542          CRR     ,PO             SET I/O AUDIT INDICATOR                       00544
 00716  0 62 01451   C543          BSP     F74A06          CHECK FOR CCX ERROR                           00545
 00717  0 044 0200   0544          SLNZ    0200            WAS AN LRC READ?                              00546
 00720  0 11 00674   C545          BUN     M355            NO, THIS WAS FILL. GO BACK TO SCAN            00547
 00721  1 23 00012   C546          CSX     10,1            YES, SET UP TO TIME FOR 40 MICRO-SECONDS      00548
 00722   7070C674    C547  M610    SSNT    *FCLERR,3       UNIT ERROR                                    00549
 00723  0 11 00727   C548          BUN     M370            YES                                           00550
 00724  1 25 00722   0549          IBN     M610,1          NO, CHECK AGAIN                               00551

 00725  0 54 00725   0551  M360    LDA     =040000012      INDICATE 'ATP' CONDITION, NORMAL RETURN       00553
 00726  0 11 00730   C552          BUN     M380              AFTER ADVANCE TAPE                          00554
 00727  0 54 00727   0553  M370    LDA     =040000013      INDICATE 'TNP' CONDITION8 ERROR RETURN        00555
 00730  0 55 00621   C554  M380    STA     FMGRDS            AFTER ADVANCE TAPE                          00556


                               F74      BOGAC2 MAG TAPE HANDLER
PAGE  022      6/13/75     TIME :  9:58 AM

 00731  0 62 01413   0555          BSP     F74A04          UPDATE TDR AND MPA STATUS IN WA; ISSUE SEL017 00557
 00732  3 47 0C613   C556          XEC     FCL210,3                 ADVANCE TAPE                         00558
 00733  0 11 00451   C557          BUN     B040             RETURN TO ICAP                               00559
                     C558  *                                                                         00560
                     C559  *                                                                         00561
 00734  3 47 00712   C560  M450    XEC     FCL200,3        GET MPA STATUS                                00562
 00735  0 75 00713   C561          STC     FMGERS           SAVE STATUS                                  00563
 00736   03602004    C562          CRR     X3,X1           MCVE UNIT ID TO X1                            00564
 00737   03600002    C563          CRR     ,PO             SET I/O AUDIT INDICATOR                       00565
 00740  0 62 01451   C564          BSP     F74A06          CHECK FOR CCX ERROR                           00566
 00741  0 041 0020   0565          SPNT    020                   EOT FAILURE?                            00567
 00742  0 11 00513   C566          BUN     B330                    YES                                   00568
 00743  0 045 0004   C567          SPNZ    4                     WRITE RING FAILURE?                     00569
 00744  0 11 00513   C568          BUN     B330                    YES                                   00570
 00745  3 47 00234   0569          XEC     FCL017,3        CLEAR THE UNIT                                00571
 00746   C1700100    C570          CPD     0,0100          RESET CCX                                     00572
 00747  0 54 00730   C571          LDA     FMGPDS          GET READY SWITCH STATUS                       00573
 00750  0 043 0012   C572          SRNE    10              IS RETURN TO BE MADE TO NORMAL MPG?           00574
 00751  0 11 0052E   C573          BUN     B240            YES                                           00575
 00752  5 22 00701   C574          CAX     *FHPA32,1        GET WA ADDR                                  00576
 00753  1 54 00554   0575          LDA     FWAEIO,1         GET PREVIOUS EIO STATUS                      00577
 00754  0 04C 2000   0576          SLNT    02000            DID A CCX ERROR OCCUR?                       00578
 00755  0 11 00546   0577          BUN     B262             YES, SCHEDULE ERROR PROGRAM                  00579
 00756  0 50 00552   C578          ANA     FWAEIO.O         CLEAR EIO                                    00580
 00757  0 51 00054   C579          ORA     =3*FWAEIO.P      SET TO 3 - HARDWARE MALFUNCTION              00581
 00760  1 55 00753   C580          STA     FWAEIO,1                                                      00582
 00761  0 11 00546   0581          BUN     B262                   BACK TO MAINLINE CLEAN-UP              00583


                               F74      BOGAC2 MAG TAPE HANDLER
PAGE  023      6/13/75     TIME :  9:58 AM

                     C583  *   F74X03                                                                00585
                     C584  *                                                                         00586
                     0585  *   THIS ENTRY LINE PROVIDES INTERFACE BETWEEN I/O AUDIT PROGRAM          00587
                     C586  *         AND  I/O HANDLER                                                00588
                     C587  *                                                                         00589
                     C588  F74X03  DSIMAC                                                            00590
 00762   03700001    ++1           DSI
 00763  0 44 00457   ++1           AOM     ESL003
 00764  3 26 00455   0589          STX     FMGXR3,3        SAVE INDEX REGISTER 3                         00591
 00765  1 54 00432   C590          LDA     FMGBSA,1         IS UNIT STILL BUSY?                          00592
 00766  0 030 0000   C591          ANL     0               CLEAR DOUBLE ERROR INDICATOR                  00593
 00767  0 13 01077   C592          BZA     D025            IF NOT, RETURN TO CALLER                      00594
 00770   03600430    C593          CRR     X1,X2++X3       MOVE UNIT ID TO X2 AND X3                     00595
 00771  5 22 00752   0594          CAX     *FHPA32,1       RESTORE WA INDEX                              00596
 00772  3 26 0C772   C595          STX     FJPC10,3 SAVE UNIT IDENTITY                                   00597
 00773  1 54 00760   C596          LDA     FWAEIO,1                 CHECK FOR A CCX ERROR                00598
 00774  0 040 2000   C597          SLNT    02000                                                         00599
 00775  0 11 01003   C598          BUN     M480                     BRANCH, CCX ERROR OCCURRED           00600
 00776  0 62 01413   C599          BSP     F74A04          UPDATE TDR AND MPA STATUS                     00601
                     0600          FLDSET  L,FWAEIO,1,4      SET EIO = 4 (AUDIT TIMEOUT)                 00602
 00777  1 54 00773   ++1           LDA     FWAEIO,1
 01000  0 50 00756   ++1   M6      ANA     FWAEIO.O
 01001  0 032 0040   ++1   M9      ORL     4*FWAEIO.P/010000
 01002  1 55 00777   ++1           STA     FWAEIO,1
 01003  0 54 00555   C601  M480    LDA     FMGRQT              GET REQUEST TYPE                          00603
 01004  0 043 0001   0602          SRNE    1               MAINTENANCE REQUEST?                          00604
 01005  0 11 00546   C603          BUN     B262            BRANCH TO SCHEDULE ERROR PROGRAM              00605
 01006  0 54 00747   C604          LDA     FMGRDS          GET READY SWITCH                              00606
 01007  0 C43 0014   0605          SRNE    014           WAS JOB RETRY(1ST ADVANCE TAPE) IN PROGRESS?    00607
 01010  0 11 01014   C606          BUN     M485                YES, SKIP ERROR BLOCK COUNT INCREMENT     00608
 01011  0 043 0016   0607          SRNE    016             DID FAILURE OCCUR AFTER 2ND ADVANCE TAPE?     00609
 01012  0 11 01014   0608          BUN     M485                YES, SKIP ERROR BLOCK CCUNT INCREMENT     00610
 01013  3 44 0056C   C609          AOM     FMHRBA,3             INCREMENT ERROR BLOCK                    00611
 01014   03600002    0610  M485    CRR     ,RO             INDICATE THAT MPA LOC IS TO BE SCHEDULED      00612
 01015  0 62 01367   C611          BSP     F74A03          REQUEST MPA TO BE PUT MOS AND SCHEDULE MPA    00613
                     C612  *                         LOC IF REQUIRED                                 00614
 01016  0 13 00563   C613          BZA     B275            BRANCH IF REQUEST WAS HONORED                 00615
 01017  0 54 00772   0614          LDA     FJPC10          NO, SET UP UNIT IDENTITY IN X2 FOR CCX RCVRY  00616
 01020  0 01 00002   C615          ADI     2                         X2 = 02000 -UNIT A                  00617
 01021  0 122 0011   0616          LLA     9                            = 03000 -UNIT B                  00618
 01022   03600110    C617          CRR     RA,X2                                                         00619
                     C618          PGLINK  S31,S31X03                                                    00620
 01023  3 22 00004   ++1           CAX     4,3
** R  01024  4 62 01024   ++1   M       BSP     *(S31)                                                **
 01025  5 22 00771   0619          CAX     *FHPA32,1       RESTORE WA ADDRESS                            00621
 01026  0 11 00546   C620          BUN     B262            BRANCH AND SCHEDULE USER ERROR PROGRAM        00622
```

```
PAGE  024        6/13/75    TIME :  9:58 AM  F74    BOGAC2 MAG TAPE HANDLER

  01027  0 54 01003   C622  R010    LDA     FMGPQT              GET REQUEST TYPE                        00624
  01030  0 13 01042   0623          BZA     R011                BRANCH IF IT IS A CPB                   00625
  01031  5 22 00127   C624          CAX     *FMGPGE,1           GET PAGE                                00626
  01032  0 54 00130   0625          LDA     FMGSDA              GET START DATA ADDRESS OF BLOCK         00627
  01033  1 47 00131   C626          XEC     GPGLPG,1            SET PAGE REGISTER                       00628
  01034   03600104    0627          CRR     RA,X1               MOVE START DATA ADDRESS OF BLOCK        00629
  01035  1 54 00001   0628          LDA     1,1                 GET SECOND WORD OF BUFFER               00630
  01036  0 030 7417   0629          ANL     07417               RESET MIDDLE BYTE                       00631
  01037  0 032 0020   C630          ORI     020                 SET IT = 1                              00632
  01040  1 55 00001   0631          STA     1,1                 RESTORE IT                              00633
  01041  0 661 0000   0632          LPD     0                    RESTORE PAGE                           00634
  01042  1 22 00001   C633  R011    CAX     1,1                  RESTART JOB                            00635
  01043  1 26 00710   0634          STX     FMGNFD,1                     REINITIALIZE                   00636
  01044  1 26 00443   0635          STX     FMGWCT,1                       COUNTERS                     00637
  01045  5 22 01025   C636          CAX     *FHPA32,1            GET USER'S WA ADD                      00638
  01046  0 11 00016   C637          BUN     A005                                                        00639


PAGE  025        6/13/75    TIME :  9:58 AM  F74    BOGAC2 MAG TAPE HANDLER

                      C639  *    F74X04                                                                00641
                      C640  *                                                                          00642
                      C641  *    THIS ENTRY LINE IS ENTERED UPON EXPIRATION OF 116 MS TIMER            00643
                      C642  *                                                                          00644
                      C643  F74X04  DSIMAC                                                             00645
  01047   03700001    ++1           DSI
  01050  0 44 00763   ++1           ACM     ESL003
  01051   03600401    0644          CRP     X1,RA                                                       00646
  01052  0 51 01052   C645          OPA     FHPJHT.M                                                    00647
  01053  0 55 00404   C646          STA     FHPA33               HITCH SPECIAL WA TO HITCHING POST      00648
  01054  3 26 00764   C647          STX     FMGXR3,3             SAVE XR3 FOR COMMON RETURN FROM SET-UP 00649
  01055  0 77 01055   C648          SMNN    FMGQUE              IS NORMAL QUEUE TO BE SCANNED?          00650
  01056  0 11 01065   C649          BUN     D005                YES                                     00651
  01057  2 22 00033   0650  D020    CAX     F0028,2               TEST MAINTENANCE QUEUE                00652
                      0651          PGLINK  F03,F03X01          UNLINK NEXT JOB                         00653
  01060  3 22 00000   ++1           CAX     0,3
** R  01061  4 62 01061   ++1   M       BSP     *(F03)                                                  **
  01062  0 15 01104   C652          BPA     D010                 BRANCH IF A JOB WAS FOUND              00654
  01063  0 77 01055   C653          SMNN    FMGQUE               SHOULD THE NORMAL QUEUE BE SCANNED?    00655
  01064  0 11 01073   C654          BUN     D015                NO, BRANCH TO TERMINATE                 00656
  01065  2 22 00032   C655  D005    CAX     F0027,2               YES, TEST NORMAL QUEUE                00657
                      C656          PGLINK  F03,F03X01          UNLINK NEXT JOB                         00658
  01066  3 22 00000   ++1           CAX     0,3
  01067  4 62 01061   ++1   M       BSP     *(F03)
  01070  0 15 01104   C657          BPA     D010                 BRANCH IF JOB WAS FOUND                00659
  01071  0 77 01063   0658          SMNN    FMGQUE               SHOULD MAINTENANCE QUEUE BE SCANNED    00660
  01072  0 11 01057   C659          BUN     D020                 YES                                    00661

  01073  0 54 01071   C661  D015    LDA     FMGQUE               REVERSE QUEUE INTEROGATION             00663
  01074  0 52 00536   0662          ERA     =-1                                                         00664
  01075  0 55 01073   C663          STA     FMGQUE                                                      00665

  01076  0 26 00013   C665          STX     FMGBUS,0             RESET HANDLER BUSY INDICATOR           00667
                      0666  D025    PGRTRN  R,F74X,FMGXR3,,E                                            00668
  01077  7 22 01054   ++1           CAX     *FMGXR3,3
                      ++1           ENIMAC
  01100  0 45 01050   ++2           SOM     ESL003
  01101  0 77 01100   ++2           SMNN    FSL003
  01102   C3700002    ++2           ENI
  01103  7 10 00461   ++1           RTN     *(F74X),3

  01104  0 54 01075   0668  D010    LDA     FMGQUE                REVERSE QUEUE INTERROGATION           00670
  01105  0 52 01074   C669          ERA     =-1                                                         00671
  01106  0 55 01104   0670          STA     FMGQUE                                                      00672
  01107   03600401    C671          CPF     X1,RA                 HITCH WA TO HITCHING POST             00673
  01110  0 51 01052   0672          OSA     FHPJHT.M                                                    00674
  01111  0 55 01045   C673          STA     FHPA32                                                      00675
  01112  0 11 00016   0674          BUN     A005                  BRANCH TO PROCESS REQUEST             00676


PAGE  026        6/13/75    TIME :  9:58 AM  F74    BOGAC2 MAG TAPE HANDLER

                      0676  *    F74X05                                                                00678
                      C677  *                                                                          00679
                      0678  *    THIS ENTRY LINE IS CALLED UPON RECOGNITION OF A TDB ERROR INTERRUPT   00680
                      C679  *                                                                          00681
                      C680  F74X05  DSIMAC              DISABLE INTERRUPTS                              00682
  01113   03700001    ++1           DSI
  01114  0 44 01101   ++1           ACM     ESL003
  01115  3 26 01077   C681          STX     FMGXR3,3            SAVE X3 FOR RETURN                      00683
  01116  3 23 00001   C682          CSX     1,3                                                         00684
  01117  0 C43 0061   C683          SRNE    SL432                TDE-A ERROR                            00685
  01120  3 22 00000   C684          CAX     0,3                  YES                                    00686
  01121  0 043 0C71   C685          SRNE.   SL442                TDE-B ERROR                            00687
  01122  3 22 00001   0686          CAX.    1,3                                                         00688
  01123  3 31 01175   C687          BNX     V040,3               NEITHER IS ERROR RETURN ICAP           00689
  01124  3 54 00765   C688  V005    LDA     FMGRSA,3            GET CHANNEL BUSY STATUS                 00690
  01125  0 043 0000   0689          SRNE    0                   IS THE CHANNEL BUSY?                    00691
  01126  0 11 01167   C690          BUN     V300                BRANCH TO CHECK IF ERROR IS FREQUENT    00692
  01127   03602004    C691          CRR     X3,X1                                                       00693
                      C692          IOARST  TMU                 RESET I/O AUDIT                         00694
                      ++1           NUMBER  TMU
  01130  1 20 00024   ++1   ?       ADX     20,1
  01131   03600001    ++1           CPP     ,RA
  01132  1 55 00440   ++1           STA     HELTMB,1

  01133  0 54 00376   C694  V010    LDA     FMGRTY              GET RETRY INDICATOR                     00696
  01134  0 73 00564   C695          SANG    =0                  IS THIS THE FIRST ERROR FOR THIS REQUEST? 00697
  01135  0 11 01202   C696          BUN     V020                 DOUBLE ERROR                           00698

  01136  0 44 01133   0698          AOM     FMGRTY               INDICATE THAT RETRY IS IN PROGRESS     00700
  01137  0 54 01027   C699          LDA     FMGRQT               GET REQUEST TYPE                       00701
  01140  0 C43 0001   C700          SPNE    1                    IS THIS A MAINTENANCE REQUEST?         00702
  01141  0 11 01153   C701          BUN     V015                 YES                                    00703

  01142  3 44 01013   C703          AOM     FMHRBA,3             NO, INCREMENT NON-MAINTENANCE ERROR BLOCK CT 00705
  01143  0 62 01413   C704          BSP     F74A04              UPDATE TDE AND MPA STATUS IN WA         00706
  01144  0 C45 0020   C705          SRNZ    020                 WAS EOT ENCOUNTERED?                    00707
  01145  0 11 01160   C706          BUN     V080                NO                                      00708
  01146  0 62 01516   C707  V030    BSP     F74A07              OUTPUT MAG TAPE EOT MESSAGE             00709
  01147  7 22 01147   C708          CAX     *ERG001,3           RESTORE UNIT IDENTITY                   00710
  01150  0 64 01105   C709          LDQ     =-1                 INDICATE THAT PA LOCALIZATION IS NOT TO BE 00711
                      C710  *                             SCHEDULED                                     00712
  01151  0 62 01367   C711  V035    BSP     F74A03              REQUEST CONFIG TO PLACE THE PA MOS      00713
  01152  0 11 01274   C712          BUN     V140                BRANCH                                  00714

  01153  0 62 01413   C714  V015    BSP     F74A04               UPDATE TDB AND MPA STATUS IN WA        00716
  01154  0 041 0020   C715          SRNT    020                  HAS EOT BEEN ENCOUNTERED?              00717
  01155  0 11 01222   C716          BUN     V230                 YES                                    00718
  01156  0 54 01156   C717          LDA     =040000015           NO, SET READY SWITCH FOR ADVANCE TAPE  00719
  01157  0 11 01161   C718          BUN     V085                                                        00720

  01160  0 54 01160   C720  V080    LDA     =040000014                                                  00722
  01161  0 55 01006   C721  V085    STA     FMGRDS               SAVE READY STATUS                      00723
  01162  3 47 00732   C722          XEC     FCL210,3             ISSUE ADVANCE TAPE COMMAND             00724
  01163   03602004    C723  V090    CRR     X3,X1                                                       00725
  01164  0 64 00614   C724          LDQ     =040000000          SET I/O AUDIT INDICATOR                 00726
  01165  0 62 01451   C725          BSP     F74A06              CALL CCX RECOVERY AND SET I/O AUDIT     00727
  01166  0 11 01173   C726          BUN     V039                CLEAR CCX                               00728
  01167  0 14 01257   C727  V300    BNA     V123                BRANCH IF 2ND UNEXPLAINABLE ERROR INTERRUPT 00729
  01170  0 032 4000   C728          ORI     04000               INDICATE FALSE ERROR INTERRUPT OCCURRED 00730
  01171  3 55 01124   C729          STA     FMGRSA,3            SAVE STATUS                             00731
  01172  3 47 00745   C730          XEC     FCL017,3            CLEAR CHANNEL                           00732
                      C731  V039    PGLINK  S31,S31X02          CLEAR CCX ERRORS                        00733
  01173  3 22 00002   ++1           CAX     2,3
  01174  4 62 01024   ++1   M       BSP     *(S31)
                      C732  V040    PGRTRN  R,F74X,FMGXR3,,E    RETURN TO CALLER                        00734
  01175  7 22 01115   ++1           CAX     *FMGXR3,3
                      ++1           ENIMAC
  01176  0 45 01114   ++2           SOM     ESL003
  01177  0 77 01176   ++2           SMNN    FSL003
  01200   03700002    ++2           ENI
  01201  7 10 01103   ++1           RTN     *(F74X),3
```

```
                                          F74     BOGAC2 MAG TAPE HANDLER
PAGE  027        6/13/75      TIME :  9:58 AM

                           C734  *        TWO ERRORS HAVE OCCURRED; USE REQUEST TYPE TO PERFORM TERMINATION     00736
                           C735  *        PROCESSING                                                            00737

     01202  0 54 01137     C737  V020     LDA     FMGRQT          GET REQUEST TYPE                              00739
     01203  0 043 0001     C738           SRNE    1               MAINTENANCE?                                  00740
     01204  0 11 01206     0739           BUN     V060            YES                                           00741
     01205  0 11 01231     C740           BUN     V100            NO                                            00742

                           C742  *        MAINTENANCE ERROR PROCESSING STARTS HERE                              00744

     01206  5 22 01111     0744  V060     CAX     *FHPA32,1       GET WA ADDRESS                                00746
     01207  1 54 01002     C745           LDA     FWAEIO,1        DID A CCX ERROR OCCUR?                        00747
     01210  0 040 2000     0746           SLNT    02000                                                         00748
     01211  0 11 01324     C747           BUN     V141            YES                                           00749
     01212  0 62 01413     0748           BSP     F74A04              UPDATE TDB AND MPA STATUS                 00750
     01213  0 C41 0020     C749           SRNT    020             WAS EOT ENCCUNTERED?                          00751
     01214  0 11 01222     0750           BUN     V230            YES                                           00752
                           C751           FLDSET  L,FWAEIO,1,9     INDICATE FAILURE TO ADVANCE TAPE FOR MAINT.  00753
     01215  1 54 01207     ++1            LDA     FWAEIO,1
     01216  0 50 01000     ++1   M6       ANA     FWAEIO.O
     01217  0 032 0110     ++1   M9       ORL     9*FWAEIO.P/010000
     01220  1 55 01215     ++1            STA     FWAEIO,1
     01221  0 11 01324     0752           BUN     V141            BRANCH TO SCHEDULE ERROR PROGRAM              00754

     01222  0 62 01516     0754  V230     BSP     F74A07          OUTPUT EOT MESSAGE                            00756
     01223  5 22 01206     C755           CAX     *FHPA32,1       GET USER WA                                   00757
                           C756           FLDSET  L,FWAEIO,1,11   INDICATE THAT EOT WAS ENCOUNTERED?            00758
     01224  1 54 01220     ++1            LDA     FWAEIO,1
     01225  0 50 01216     ++1   M6       ANA     FWAEIO.O
     01226  0 032 0130     ++1   M9       ORL     11*FWAEIO.P/010000
     01227  1 55 01224     ++1            STA     FWAEIO,1
     01230  0 11 01324     C757           BUN     V141            BRANCH TO SCHEDULE ERROR PROGRAM              00759
                           C758  *                                                                          00760
                           0759  *        PROCESSING STARTS HERE FOR NON-MAINTENANCE BLOCKS FOR WHICH TWO       00761
                           C760  *        FAULTS HAVE OCCURRED                                                  00762
                           C761  *                                                                          00763
     01231  5 22 01223     0762  V100     CAX     *FHPA32,1       RESTORE USER WA INDEX                         00764
     01232  1 54 01227     C763           LDA     FWAEIC,1        GET ERROR CONDITION                           00765
     01233  0 040 2000     0764           SLNT    02000           HAS CCX ERROR OCCURRED?                       00766
     01234  0 11 01334     C765           BUN     V200             YES, BRANCH TO PUT MPA MOS                   00767
     01235  0 54 01161     C766           LDA     FMGRDS           GET READY SWITCH STATUS                      00768
     01236  0 C43 0014     C767           SRNE    014            WAS JOB RETRY(1ST ADVANCE TAPE) IN PROGRESS?   00769
     01237  0 11 01246     C768           BUN     V120            YES, BRANCH TO PROCESS ERROR CONDITION        00770
     01240  0 043 0016     C769           SRNE    016             DID FAILURE OCCUR AFTER 2ND ADVANCE TAPE?     00771
     01241  0 11 01246     C770           BUN     V120            YES, BRANCH TO PROCESS ERROR CONDITION        00772
     01242  3 44 01142     C771           AOM     FMHRBA,3        INCREMENT ERROR BLOCK COUNT                   00773
     01243  0 62 01413     C772           BSP     F74A04          UPDATE TDB & MPA STATUS IN WA; CLEAR DEVICE   00774
     01244  0 54 01244     0773           LDA     =040000016         SET 2ND ADVANCE TAPE OPERATION IN PROGRESS 00775
     01245  0 11 01161     C774           BUN     V085                                                          00776

     01246  3 47 00734     C776  V120     XEC     FCL200,3        GET MPA STATUS                                00778
     01247  0 75 00735     C777           STC     FMGPRS           SAVE STATUS                                  00779
     01250   03602004      0778           CRR     X3,X1           SET UNIT IDENTITY IN X1                       00780
     01251   03600002      C779           CRP     ,RO             INDICATE I/O AUDIT SHOULD NOT BE SET          00781
     01252  0 62 01451     C780           BSP     F74A06          CHECK FOR CCX ERRORS                          00782
     01253  3 47 01172     C781  V122     XEC     FCL017,3        CLEAR UNIT                                    00783
     01254  0 C41 0020     C782           SRNT    020              HAS EOT BEEN ENCOUNTERED?                    00784
     01255  C 11 01146     0783           BUN     V030             YES                                          00785
     01256  0 14 01334     C784  V121     BNA     V200 BRANCH IF PA CAUSED FAULT                                00786

                           C786  *                                TDB CAUSED FAULT                              00788

     01257   03602010      C788  V123     CRR     X3,X2           PLACE UNIT ID IN X2 FOR CONFIG                00790
                           0789           CCNFIG  CONTPL,TDB,MOS  REQUEST TDB TO BE PUT MOS                     00791
                           ++1            CAACON  CONTPL,TDB,MOS,¬
     01260  1 22 00002     ++2            CAX     CCG10,1
                           ++2   C5       PGLINK  L01,L01X04
     01261  3 22 00006     ++3            CAX     6,3
** R 01262  4 62 01262     ++3   M        BSP     *(L01)                                                          **
     01263  0 043 0001     C790           SRNE    1               WAS REQUEST HONORED?                          00792
     01264  0 11 01274     0791           BUN     V140            NO, BRANCH TO EXIT ROUTINE                    00793

                                          F74     BOGAC2 MAG TAPE HANDLER
PAGE  028        6/13/75      TIME :  9:58 AM

                           C793  *                                SCHEDULE TDB LOCALIZATION                     00795

     01265   03600002      C795           CRR     ,RO                                                           00797
                           C796           DIARQT  MDTDB,JTLOC,SCISO                                             00798
     01266   03604001      ++1            CRR     PC,RA
     01267  0 01 000C5     ++1   A1       ADI     E4-A1
     01270  0 55 01270     ++1   A2       STA     ERG004
              00001200     ++1   JBT      EQU     JTLOC
     01271  0 54 01271     ++1   A4       LDA     =MDTDB++JBT++SCISO++¬++¬
                           ++1            PGLINK  L20,L20X01
     01272  3 22 00000     ++2            CAX     0,3
** R 01273  4 62 01273     ++2   M        BSP     *(L20)                                                          **

     01274   03601020      C798  V140     CRR     X2,X3           RESTORE UNIT IDENTITY                         00800
     01275  3 77 01171     C799  V144     SRNN    FMGBSA,3                                                      00801
     01276  0 11 01331     0800           BUN     V210                                                          00802
     01277  0 62 01544     CE01           BSP     F74A08          REQUEUE REQUEST                               00803
     01300  0 72 00570     C802           SANE    =1              WAS REQUEST ALLOWED?                          00804
     01301  0 11 01316     C803           BUN     V142            NO                                            00805
     01302  0 54 01202     C804  V145     LDA     FMGRQT                                                        00806
     01303  0 13 01314     C805           BZA     V146            BRANCH TO REQUEUE REQUEST                     00807
     01304  5 22 01031     C806           CAX     *FMGPGE,1       RESET REPEAT BLOCK CHARACTER                  00808
     01305  0 54 01032     C807           LDA     FMGSDA                                                        00809
     01306  1 47 01033     C808           XEC     GPGLPG,1                                                      00810
     01307   03600104      C809           CRP     RA,X1                                                         00811
     01310  1 54 00001     C810           LDA     1,1                                                           00812
     01311  0 030 7417     C811           ANL     07417                                                         00813
     01312  1 55 00001     C812           STA     1,1                                                           00814
     01313  0 661 0000     C813           LPD     0                                                             00815
     01314  0 54 01300     C814  V146     LDA     =1               INDICATE CRB BUSY BIT IS NOT TO BE RESET     00816
     01315  0 11 01327     C815           BUN     V143               BE RESET FOR THIS REQUEST                  00817
     01316  1 54 01232     C816  V142     LDA     FWAEIO,1        GET ERROR CONDITION                           00818
     01317  0 040 2000     C817           SLNT    02000           DID CCX ERROR CAUSE FAILURE?                  00819
     01320  0 11 01324     C818           BUN     V141            YES                                           00820
     01321  0 50 01225     C819           ANA     FWAEIO.O           INDICATE HARDWARE MALFUNCTION AS CAUSE     00821
     01322  0 032 003C     C820           ORL     3*FWAEIO.P/010000   OF ERROR - ERROR CODE=3                   00822
     01323  1 55 01316     C821           STA     FWAEIC,1                                                      00823

                           C823  V141     PGLINK  F38,F38X03      SCHEDULE ERROR PROGRAM                        00825
     01324  3 22 00004     ++1            CAX     4,3
     01325  4 62 00547     ++1   M        BSP     *(F38)
     01326  0 54 01302     C824           LDA     FMGRQT                                                        00826
     01327  0 62 00363     C825  V143     BSP     F74T01          GO TO TIMER                                   00827
     01330  0 11 01173     C826           BUN     V039            BRANCH TO EXIT                                00828

     01331   03600001      C828  V210     CRR     ,RA                                                           00830
     01332  3 55 01275     C829           STA     FMGBSA,3        CLEAR CHANNEL ERROR INDICATOR                 00831
     01333  0 11 01173     C830           BUN     V039            RETURN TO ICAP                                00832
     01334   03600002      C831  V200     CRF     ,RO             INDICATE THAT MPA LOC IS TO BE SCHEDULED IF   00833
                           C832  *                              MPA IS PUT MOS                                  00834
     01335  0 11 01151     C833           BUN     V035            REQUEST MPA TO BE PUT MOS                     00835

                                          F74     BOGAC2 MAG TAPE HANDLER
PAGE  C29        6/13/75      TIME :  9:58 AM

                           C835  *     F74A01                                                               00837
                           C836  *                                                                          00838
                           C837  *     THIS ROUTINE LOADS 4 DATA WORDS ONTO I/O CHANNEL                     00839
                           C838  *        AND INCREMENTS FMGWCT BY A VALUE OF 4                             00840
                           C839  *                                                                          00841
                           C840  *     RA AND XR1 ARE DESTROYED                                             00842
                           C841  *                                                                          00843
                           C842  F74A01   NPRNDS  0                                                             00844
                           ++1            TORP
     01336   00000000      ++1            NDS     0
                           ++1            ERCT
     01337  5 22 01304     0843           CAX     *FMGPGF,1       LOAD INDEX FOR LOAD DATA PAGE REGISTER        00845
     01340  0 54 01305     C844           LDA     FMGSDA          LOAD STARTING DATA ADDRESS                    00846
     01341  0 40 01044     0945           ADD     FMGWCT          ADD # OF WORDS ALREADY OUTPUT + 1             00847
     01342  1 47 01306     0846           XEC     GPGLPG,1        LOAD DATA PAGE REGISTER FOR OUTPUT            00848
     01343   03600104      CE47           CPR     RA,X1           COPY ADDRESS OF DATA                          00849
     01344  1 74 77777     C848           LDC     077777,1                                                      00850
     01345  1 74 0000C     C849           LDC     0,1                                                           00851
     01346  1 74 00001     C850           LDC     1,1             LOAD 4 DATA WORDS ONTO I/O CHANNEL            00852
     01347  1 74 00002     CE51           LDC     2,1                                                           00853
     01350  0 661 0000     C852           LPD     0               LOAD DATA PAGE REGISTER = PAGE 0              00854
     01351  0 54 01351     C853           LDA     =4                                                            00855
     01352  0 46 01341     C854           ADM     FMGWCT          INCREMENT # OF WORDS OUTPUT BY 4              00856
     01353  4 11 01336     C855           BUN     *F74A01         RETURN TO CALLER                              00857
```

```
                                    F74     BOGAC2 MAG TAPE HANDLER
PAGE  030       6/13/75    TIME :  9:58 AM

                     C857  *      THIS ROUTINE WILL SET THE PROPER CHANNEL BUSY INDICATOR AND
                     C858  *      TEST IF SCANNER INTERLOCKK IS REQUIRED. IF REQUIRED, FMGINT WILL
                     C859  *      BE SET = 040000000.
                     C860  *
                     C861  *            INPUTS:
                     C862  *                X2 = TDB NUMBER
                     C863  *                   2 FOR TDB-A
                     0864  *                   1 FOR TDB-B

                     C866  F74A02  NPRNDS  0
                     ++1           TOPF
  01354   00000000   ++1           NDS     0
                     ++1           FRCT
  01355  2 21 000C2  C867          SBX     2,2              NORMALIZE TDB VALUE
  01356  0 54 01314  C868          LDA     =1
  01357  2 55 01332  C869          STA     FMGBSA,2         SET CHANNEL BUSY INDICATOR
  01360  2 54 01360  C870          LDA     HST+12,2         IS SCANNER INTERLOCK REQUIRED(I.E., IS TDB
  01361  0 041 0100  C871          SRNT    0100               SERVICING ACTIVE PA'S)
  01362  0 11 01366  0872          RUN     A330             NO, THE SPA IS STANDBY - RE-URN TO CALLER
  01363  0 54 00373  C873          LDA     FMGINT           YES, BOTH PA'S ARE ACTIVE FOR THIS TDB, SET
  01364  0 032 4000  C874          ORL     04000              INTERLOCK FLAG FOR SCAN HANDLER TO ABORT
  01365  0 55 01363  C875          STA     FMGINT             PROCESSING BECAUSE MAG TAPE IS USING TDB
  01366  4 10 01354  C876  A330    RTN     *F74A02
```

```
                                    F74     BCGAC2 MAG TAPE HANDLER
PAGE  031       6/13/75    TIME :  9:58 AM

                     C878  *      THIS ROUTINE IS CALLED TO CONFIGURE AN MPA MOS AND TO SCHEDULE MPA
                     C879  *      LOCALIZATION IF REQUIRED.
                     C880  *
                     C881  *          INPUTS:
                     C882  *             X3 = MPA NUMBER
                     C883  *                = 0 MPA-A
                     C884  *                =1 MPA-B
                     C885  *
                     C886  *             RQ = MPA LOCALIZATION INDICATOR
                     C887  *                = 0 SCHEDULE LOC IF MPA HAS PUT MOS
                     C888  *                = -1 DON'T SCHEDULE LOC UNDER ANY CIRCUMSTANCES

                     C891  F74A03  NPRNDS  0
                     ++1           TORF
  01367   00000000   ++1           NDS     0
                     ++1           FRCT
  01370  2 22 00001  C892          CAX     1,2
  01371  3 32 01373  C893          RZX     B276,3
  01372  2 20 00001  C894          ADX     1,2
                     C895  B276    CONFIG  PA,TDB,MOS       PUT ACTIVE UNIT MOS
                     ++1           CAAPAA  PA,TDB,MOS
  01373  1 22 00065  ++2           CAX     CCK03,1
                     ++2   C5      PGLINK  L01,L01X04
  01374  3 22 00006  ++3           CAX     6,3
  01375  4 62 01262  ++3   M       BSP     *(L01)
  01376  2 21 00001  C896          SBX     1,2              MODIFY X2
  01377  0 72 01356  C897          SANE    =1               WAS REQUEST SUCCESSFUL
  01400  4 10 01367  C898          RTN     *F74A03          NO, RETURN TO CALLER
  01401   03600201   C899          CRR     RQ,RA            YES, CHECK IF LOC SHOULD BE SCHEDULED
  01402  0 14 01411  0900          BNA     B277             BRANCH TO RETURN TO CALLER IF RQ<0
                     0901          DIARQT  MDMTA,JTLOC,SCISO  SCHEDULE MPA LOCALIZATION
  01403   03604001   ++1           CRR     EC,RA
  01404  0 01 00005  ++1   A1      ADI     E4-A1
  01405  0 55 01270  ++1   A2      STA     ERG004
          00001200   ++1   JBT     EQU     JTLOC
  01406  0 54 01406  ++1   A4      LDA     =MDMTA++JBT++SCISO++¬++¬
                     ++1           PGLINK  L20,L20X01
  01407  3 22 00000  ++2           CAX     0,3
  01410  4 62 01273  ++2   M       BSP     *(L20)
  01411   03600001   C902  B277    CRR     ,RA              INDICATE SUCCESSFUL RETURN
  01412  4 10 01367  0903          RTN     *F74A03          RETURN TO CALLER
```

```
                                    F74     BOGAC2 MAG TAPE HANDLER
PAGE  032       6/13/75    TIME :  9:58 AM

                     0905  *      THIS ENTRY POINT PUTS TDB AND MPA STATUS IN WORK AREA AND THEN
                     C906  *      CLEARS THE APPROPRIATE CHANNEL.
                   A C907  *
                     C908  *            INPUTS:
                     C909  *                X3 = TDB NUMBER
                     C910  *                   = 0 TDB-A
                     C911  *                   = 1 TDB-B

                     C913  F74A04  NPPNDS  0
                     ++1           TOPF
  01413   00000000   ++1           NDS     0
                     ++1           FRCT
  01414  6 22 01231  0914          CAX     *FMPA32,2        GET USER WA BIAS
  01415   03602004   C915          CRR     X3,X1
  01416  2 54 01323  0916          LDA     FWAEIO,2         RECOVER ERROR STATUS WORD
  01417  0 040 200C  C917          SLNT    02000            WAS A CCX ERROR PREVIOUSLY ENCOUNTERED?
  01420  0 11 01432  C918          RUN     A340             YES
  01421  3 47 01421  0919          XEC     FCL000,3         GET TDB STATUS
  01422  2 75 00415  C920          STC     FWATDB,2         SAVE TDB STATUS IN WA
  01423   03600002   C921          CRR     ,RQ              INDICATE NOT TO SET I/O AUDIT
  01424  0 62 01451  0922          BSP     F74A06           BRANCH TO CHECK FOR CCX ERRORS
  01425  3 47 01246  C923          XEC     FCL200,3         GET MPA STATUS
  01426  6 22 01414  0924          CAX     *FMPA32,2        GET WA INDEX
  01427  2 75 00705  C925          STC     FWATMU,2         SAVE MPA STATUS IN WA
  01430   03602004   C926          CRR     X3,X1            MOVE UNIT ID TO X1
  01431  0 62 01451  C927          BSP     F74A06           BRANCH TO CHECK FOR CCX ERRORS
  01432  3 47 01253  C928  A340    XEC     FCL017,3         CLEAR CHANNEL
                     0929          PGLINK  S31,S31X02       RESET CCX ERROR
  01433  3 22 000C2  ++1           CAX     2,3
  01434  4 62 01174  ++1   M       BSP     *(S31)
  01435   03600420   0930          CRR     X1,X3            PUT UNIT ID INTO X3
  01436  5 22 01426  0931          CAX     *FMPA32,1        GET WA INDEX
  01437  1 54 01427  C932          LDA     FWATMU,1         PUT MPA STATUS INTO RA
  01440  4 10 01413  C933          RTN     *F74A04
```

```
                                    F74     BOGAC2 MAG TAPE HANDLER
PAGE  033       6/13/75    TIME :  9:58 AM

                     0935  *      THIS ENTRY POINT RESETS THE USER HITCHING POST, SETS THE EIO FIELD = 0
                     C936  *      AND SCHEDULES THE NEXT PROGRAM. ALL SUCCESSFUL HANDLER I/O USE THIS
                     C937  *      COMMON ROUTINE:
                     C938  *
                     C939  *            INPUTS:
                     C940  *
                     C941  *                X3 = UNIT ID

                     C943  F74A05  NPRNDS  0
                     ++1           TOPF
  01441   C0000000   ++1           NDS     0
                     ++1           FRCT
  01442  5 22 01436  C944          CAX     *FMPA32,1        GET USER WA
  01443  1 54 01416  0945          LDA     FWAEIO,1         INDICATE NO I/O ERRORS ENCOUNTERED
  01444  0 50 01321  C946          ANA     FWAEIO.0
  01445  1 55 01443  C947          STA     FWAEIO,1
                     0948          PGLINK  F38,F38X01       SCHEDULE NEXT PROGRAM
  01446  3 22 00000  ++1           CAX     0,3
  01447  4 62 01325  ++1   M       BSP     *(F38)
  01450  4 10 01441  C949          RTN     *F74A05
```

```
PAGE  034        6/13/75    TIME :  9:58 AM   F74     BOGAC2 MAG TAPE HANDLER

                            C951  *     THIS RCUTINE PROCESSES CCX RECOVERY REQUESTS AND SETS I/O AUDIT TIMER.     00953
                            C953  F74A06  NPRNDS  0                                                                00955
                            ++1           TORP
 01451     00000000         ++1           NDS     0
                            ++1           PRCT
 01452   2 22 02000         0954  C006    CAX     02000,2          ASSUME CONTROLLER-A                            00956
 01453   1 32 01455         C955          BZX     C007,1           BRANCH IF IT IS                                00957
 01454   2 22 03000         C956          CAX     03000,2          SET CONTROLLER-B                               00958
                            C957  C007    PGLINK  S31,S31X01       CALL CCX RECOVERY                              00959
 01455   3 22 00000         ++1           CAX     0,3
 01456   4 62 01434         ++1   M       BSP     *(S31)
 01457    03600420          C958          CRR     X1,X3            PLACE UNIT ID INTO X3                          00960
 01460   0 13 01507         C959          BZA     C010             BRANCH TO SET I/O AUDIT - EVERYTHING WAS OKAY  00961
 01461   0 55 01461         C960          STA     FMGXRQ           SAVE ERROR RETURN FRCM CCX RECOVERY            00962
                            C961  ***********************************************************************     00963
                            C962  *                CCX ERROR                                                   00964
                            C963  ***********************************************************************     00965
 01462   6 22 01442         C964          CAX     *FHPA32,2        GET WA ADDRESS                                 00966
 01463   2 54 01445         C965          LDA     FWAEIO,2         INDICATE CCX ERROR                             00967
 01464   0 50 01444         C966          ANA     FWAEIO,0                                                        00968
 01465   0 032 210C         C967          ORI     02000+8*FWAEIO.P/010000                                         00969
 01466   2 55 01463         C968          STA     FWAEIO,2                                                        00970
 01467    03600001          C969          CRR     ,RA              CLEAR TDB AND MPA STATUS WORDS                 00971
 01470   2 55 01422         C970          STA     FWATDB,2                                                        00972
 01471   2 55 01437         C971          STA     FWATMU,2                                                        00973
 01472   0 77 01461         C972          SMNN    FMGXRQ           DID CCX ERROR CODE SAY TO ABORT REQUEST?       00974
 01473   0 11 01503         C973          BUN     C011              YES                                           00975

 01474   0 54 01235         C975          LDA     FMGRDS            GFT READY STATUS                              00977
 01475   0 030 000C         C976          ANI     0                                                               00978
 01476   0 73 00664         0977          SANG    =013             CHECK FOR ADVANCE TAPE INSTRUCTION             00979
 01477   0 73 01477         C978          SANG    =016             RANGE = 014-016                                00980
 01500   0 11 01503         C979          BUN     C011             OUT OF RANGE                                   00981

 01501   3 47 01162         C981  C012    XEC     FCL210,3          RETRY ADVANCE TAPE COMMAND FOR CCX RECOVERY   00983
 01502   0 11 01452         C982          BUN     C006                                                            00984

                            0984  C011    PGLINK  S31,S31X02       CLEAR CCX ERRORS                               00986
 01503   3 22 00002         ++1           CAX     2,3
 01504   4 62 01456         ++1   M       BSP     *(S31)
 01505    03600420          0985          CRR     X1,X3             SET UNIT ID TO X3                             00987
 01506   0 11 01124         C986          BUN     V005              EFANCH TO ERROR RECOVERY                      00988

 01507    03600201          C988  C010    CRR     RO,RA                                                           00990
 01510   0 13 01514         0989          BZA     C014              BRANCH IF I/O TIMING SHOULD NO BE DONE        00991
 01511    C3600511          C990          CRR     RA++X1,RA++X2     SET                                           00992
 01512   2 20 00024         C991          ADX     20,2               I/O                                          00993
 01513   2 55 01132         C992          STA     HELUID,2            AUDIT                                       00994
 01514   0 54 01247         C993  C014    LDA     FMGERS            OBTAIN MTA STATUS                             00995
 01515   4 10 01451         C994          RTN     *F74A06                                                         00996


PAGE  035        6/13/75    TIME :  9:58 AM   F74     BOGAC2 MAG TAPE HANDLER

                            C996  *     THIS POUTINE IS CALLED WHEN END OF TAPE(EOT) IS DETECTED. A SPARE         00998
                            C997  *     WORKAREA IS RETRIEVED AND AN TTY MESSAGE INFORMING THE CRAFTSMAN          00999
                            C998  *     OF THE OCCURANCE WILL BE GENERATED.                                        01000

                            1000  F74A07  NPRNDS  0                                                                01002
                            ++1           TORP
 01516     00000000         ++1           NDS     0
                            ++1           PROT
 01517   3 26 01147         1001          STX     ERG001,3   SAVE UNIT ID                                         01003
                            1002          WASPAR  A,F0049          OBTAIN 26-WORD WORKAREA                         01004
 01520   2 22 00072         ++1           CAX     F0049,2
 01521    03610001          ++1   M2      CCF     ,RA
                            ++1   M3      PGLINK  F04,F04X01
 01522   3 22 00000         ++2           CAX     0,3
** R  01523   4 62 01523    ++2   M       BSP     *(F04)                                                                 **
 01524   0 14 01543         1003          BNA     A280         ERANCH IF NO WORKAREA AVAILABLE                    01005
 01525   7 22 01517         1004          CAX     *ERG001,3                                                       01006
 01526   3 32 01531         1005          BZX     A290,3                                                          01007
 01527   0 54 01527         1006          LDA     =072727222 INDICATE UNIT 'B' BUSY                               01008
 01530   0 11 01532         1007          BUN     A310                                                            01009
 01531   0 54 01531         1C08  A290    LDA     =072727221 INDICATE UNIT 'A' BUSY                               01010
 01532   1 55 01470         1009  A310    STA     FWAWC9,1                                                        01011
                            1010  *                         SCHEDULE TTY MESSAGE                               01012
                            1011  *     END OF TAPE FNCOUNTERED ON UNIT X                                          01013
                            1012  *                                                                            01014
                            1013          PREOUT  FU014,A                                                         01015
 01533   0 54 01477         ++1   A1      LDA     =FU014
 01534   1 55 01466         ++1           STA     FWAIDN,1
                            ++1   A4      ACCEPT  F07,F07X06,PF07A
                            ++2           SETNEP  F07,F07X06,PF07A,FWANPG
                            ++3           SETALL  F07,F07X06,PF07A,FWANPG
 01535   0 54 01535         ++4   M7      IDA     =6*FWAELN.P+PF07A*FWAPRI.P
** R  01536   0 01 01536    ++4   M9      ADI     (F07)                                                                  **
 01537   1 55 00411         ++4           STA     FWANPG,1
 01540   0 54 01540         ++2           LDA     =PF07A
                            ++2   M2      PGLINK  E01,E01X01
 01541   3 22 00000         ++3           CAX     0,3
 01542   4 62 00357         ++3   M       BSP     *(E01)
 01543   4 10 01516         1014  A280    RTN     *F74A07                                                         01016


PAGE  036        6/13/75    TIME :  9:58 AM   F74     BOGAC2 MAG TAPE HANDLER

                            1016  *     THIS POUTINE IS CALLED TO RECUEUE A NON-MAINTENANCE DATA BLOCK AT THE     01018
                            1017  *     FRONT OF THE NORMAL QUEUE. X1 MUST CONTAIN THE WA ADDRESS.                01019

                            1C19  F74A08  NPENDS  0                                                                01021
                            ++1           TORP
 01544     00000000         ++1           NDS     0
                            ++1           PRCT
 01545   5 22 01462         1020          CAX     *FHPA32,1        RESTORE WA ADDRESS                             01022
 01546   1 54 01534         1021          LDA     FWAW04,1         ONLY ALLOW THE REQUEST TO BE REQUEED IF THE    01023
 01547   0 50 01547         1022          ANA     =010000000       REQUEST WAS NOT PREVIOUSLY REASSIGNED OR IF    01024
 01550   0 51 00057         1023          OPA     FMGSUR           NO SPECIFIC UNIT WAS REQUESTED                 01025
 01551   0 73 01134         1024          SANG    =0               ARE ANY OF THE ABOVE CONDITIONS PRESENT?       01026
 01552   0 11 01564         1025          BUN     R015             YES, ABORT REQUEST                             01027
 01553   1 54 01546         1026          IDA     FWAW04,1         SET REASSIGNMENT FLAG                          01028
 01554   0 032 1000         1027          ORI     01000                                                           01029
 01555   0 030 5777         1028          ANI     05777            RESET CCX ERROR INDICATOR                      01030
 01556   1 55 01553         1029          STA     FWAW04,1                                                        01031
 01557   2 22 00032         1030          CAX     F0027,2          PUT REQUEST AT FRONT OF NORMAL QUEUE           01032
                            1031          PGLINK  F02,F02X03                                                      01033
 01560   3 22 00004         ++1           CAX     4,3
 01561   4 62 00077         ++1   M       BSP     *(F02)
 01562    03600001          1032          CRR     ,RA              INDICATE THAT REQUEST WAS ALLOWED              01034
 01563   4 10 01544         1C33          RTN     *F74A08          RETURN                                         01035
 01564   0 54 01377         1034  R015    LDA     =1               INDICATE THAT REQUEST WAS DENIED               01036
 01565   4 10 01544         1035          RTN     *F74A08          RETURN                                         01037


PAGE  037        6/13/75    TIME :  9:58 AM   F74     BOGAC2 MAG TAPE HANDLER

          LITERALS

 01551   C0000000
 01564   0C000001
 00334   0C000002
 01540   0C000003
 01351   0C000004
 00034   0C000010
 00671   00000012
 01476   00000013
 004C5   0C000014
 01533   00000016
 00030   0C000020
 00024   0C000140
 00020   0C000600
 00207   C0000700
 00470   00007777
 00264   0C020011
```

-continued

```
00051    00077777
01271    00201254
01406    00201276
0C757    0C300000
00407    CC400000
00040    01770000
00214    03C00000
01535    03600000
00144    03641077
01110    04000000
00354    07C00C00
01547    1C000000
01164    4CCC0000
00271    40000001
00274    40C00003
00277    40000004
00601    4C000005
00320    40000006
00324    4C000CC7
00620    40000010
00725    40000012
00727    40000013
01160    40000014
01156    40000015
01244    40C00016
01531    72727221
01527    72727222
01464    70077777
00663    77400000
00656    77700000
01150    77777777
```

```
PAGE  038      6/13/75     TIME :  9:58 AM F74     ROGAC2 MAG TAPE HANDLER
    COMMON REFERENCES

       COMMCN NAME =   RC7      SIZE =      1
00372    00000000

       COMMCN NAME =   CL3      SIZE =     48
01432    CC000000
00154    0C000004
00156    0C000002
00267    00000040
01501    0C000024
00617    C0000030
00306    CC000032
C0600    00000034
00462    0C000036
00316    00000012
00322    0C000014
00326    00000016
00447    CC000026
00573    00000022
00632    00000042
00722    00000052
00676    0C000050
00704    00000056
01425    0C000010
01421    00000006

       COMMON NAME =   DZ3      SIZE =     24
00370    CCCC0000
00371    00000013

       COMMON NAME =   EL4      SIZE =     50
01513    00000031

       COMMCN NAME =   HP3      SIZE =     37
01545    C0000040
01053    0C000041

       COMMCN NAME =   JP3      SIZE =    167
00532    00000101
00707    0C000103
01017    00000102

       COMMCN NAME =   MG3      SIZE =     28
01076    CC0C0000
01175    00000011
00152    CC000012
01326    0C000013
01550    00000014
00217    00000015
00666    00000017
00043    0C000016
00444    0C000020
01340    00000021
01337    C0000022
01136    00000032
01514    0C000027
01474    00000026
00645    C0000030
01365    CC000001
01357    0C000024
00375    00000025
01043    00000031
01352    C0000023
01106    00000010
01472    0C000033

       COMMON NAME =   MH3      SIZE =     10
00111    0C000000
00146    0C000004
00524    00000002
```

```
PAGE  039      6/13/75     TIME :  9:58 AM F74     ROGAC2 MAG TAPE HANDLER
01242    0C000006

       COMMCN NAME =   PG9      SIZE =      4
01342    CCCC0000

       COMMCN NAME =   PS2      SIZE =     15
00623    00000004

       COMMCN NAME =   RG2      SIZE =      4
01525    00000000
01405    CC000003

       COMMCN NAME =   SL2      SIZE =     19
01177    00000002

       COMMCN NAME =   ST4      SIZE =     37
00206    00000011
00213    0C000001
01360    CC000014

       COMMCN NAME =   WA1      SIZE =    500
00016    00000006
C0702    C00C0010
00665    C0000007
01556    00000004
00352    00000003
01537    00000001
01532    00000011
01471    00000012
```

```
PAGE  040       6/13/75     TIME :   9:58 AM    F74     BOGAC2 MAG TAPE HANDLER

     SUBROUTINES

     00001  F74X01
     00003  F74X02
     00005  F74X03
     00007  F74X04
     00011  F74X05
     01561  F02
     01201  F74X
     01542  F01
     00410  F74
     00417  E02
     01447  F38
     01504  S31
     01067  F03
     01375  LC1
     01410  I20
     01523  F04
     01536  F07
     01566   00005557      1036            END                                                    01038

       0 UNDEFINED SYMBOLS

                                                F74     BOGAC2 MAG TAPE HANDLER
PAGE  041       6/13/75     TIME :   9:58 AM
                                          REFERENTS TO DEFINED SYMBOLS
SYMBOL       VALUE        REFERENTS
 ¬           00000000     00210  LRA   00215  LRA    01271  LDA    01271  LDA    01406  LDA    01406  LDA

 A005        00000016     01046  BUN   01112  BUN
 A010        00000064     00063  BUN
 A050        00000067     00060  BZA   00064  BUN
 A055        00000075     00104  BUN
 A060        00000101     00071  BZA   00074  BZA
 A079        00000105     00103  BZA
 A080        00000141     00110  BUN   00203  BZA
 A081        00000126     00115  BZA
 A082        00000115     00125  BUN
 A110        00000156     00153  BZA   00257  BUN    00273  BUN    00276  BUN
 A120        00000157     00155  BUN   00317  BUN    00323  BUN    00327  BUN
 A130        00000154     00260  BUN   00301  BUN
 A140        00000151     00261  BUN
 A150        00000160     00270  BUN   00333  BUN
 A170        00000164     00345  BUN   00362  BUN
 A180        00000152     00266  BUN   00336  BUN
 A200        00000264     00242  BUN
 A280        00001543     01524  BNA
 A290        00001531     01526  BZX
 A310        00001532     01530  BUN
 A330        00001366     01362  BUN
 A340        00001432     01420  BUN
 A360        00000373     00365  BUN

 B020        00000450     00574  BUN
 B025        00000452     00466  BUN   00612  BUN    00616  BUN    00622  BUN
 B030        00000455     00431  BNX   00434  BZA    00530  BUN
 B040        00000451     00603  BUN   00733  BUN
 B100        00000462     00445  BUN
 B200        00000467     00442  BUN
 B239        00000522     00540  BUN
 B240        00000525     00751  BUN
 B250        00000526     00550  BUN
 B251        00000527     00571  BUN
 B260        00000531     00517  BUN
 B261        00000541     00535  BUN
 B262        00000546     00557  BUN   00567  BUN    00755  BUN    00761  BUN    01005  BUN    01026  BUN
 B270        00000551     00521  BUN
 B275        00000563     01016  BZA
 B276        00001373     01371  BZX
 B277        00001411     01402  BNA
 B320        00000474     00473  BUN
 B330        00000513     00474  BUN   00742  BUN    00744  BUN

 CCG10       00000002     01260  CAX
 CCK03       00000065     01373  CAX
 C006        00001452     01502  BUN
 C007        00001455     01453  BZX
 C010        00001507     01460  BZA
 C011        00001503     01473  BUN   01500  BUN
 C014        00001514     01510  BZA

 D005        00001065     01056  BUN
 D010        00001104     01062  BZA   01070  BPA
 D015        00001073     01064  BUN
 D020        00001057     01072  BUN
 D025        00001077     00767  BZA

 EPS013      00000004     00147  AOM   00160  STX    00233  AOM    00340  STX    00446  AOM    00451  STX
                          00472  AOM   00513  STX    00623  STX
 ERG001      00000000     01147  CAX   01517  STX    01525  CAX

                                                F74     BOGAC2 MAG TAPE HANDLER
PAGE  042       6/13/75     TIME :   9:58 AM
 ERG004      00000003     01270  STA   01405  STA
 ESL003      00000002     00165  SCM   00166  SMNN   00422  AOM    00456  SOM    00457  SMNN   00763  AOM
                          01050  ACM   01100  SCM    01101  SMNN   01114  AOM    01176  SOM    01177  SMNN
 E010        00000346     00200  BUN   00204  BUN    00225  BUN    00231  BUN

 FCLERR      00000052     00647  SSNT  00674  SSNT   00722  SSNT
 FCLPTH      00000056     00704  XEC
 FCLRDY      00000050     00651  SSNT  00676  SSNT
 FCL000      00000006     01421  XEC
 FCL001      00000042     00632  XEC
 FCL017      00000000     00150  XEC   00234  XEC    00745  XEC    01172  XEC    01253  XEC    01432  XEC
 FCL200      00000010     00712  XEC   00734  XEC    01246  XEC    01425  XEC
 FCL201      00000012     00316  XEC
 FCL202      00000014     00322  XEC
 FCL203      00000016     00326  XEC
 FCL207      00000022     00573  XEC
 FCL210      00000024     00302  XEC   00613  XEC    00732  XEC    01162  XEC    01501  XEC
 FCL211      00000026     00447  XEC
 FCL212      00000030     00304  XEC   00330  XEC    00604  XEC    00617  XEC
 FCL213      00000032     00306  XEC
 FCL214      00000034     00310  XEC   00600  XEC
 FCL215      00000002     00156  XEC
 FCL216      00000004     00154  XEC
 FCL217      00000036     00312  XEC
 FCL264      00000040     00267  XEC   00462  XEC
 FDZ         00000000     00370  ANA   00371  ANA
 FHPA32      00000040     00015  CAX   00402  STX    00541  CAX    00563  CAX    00624  CAX    00641  ADX
                          00654  CAX   00701  CAX    00752  CAX    00771  CAX    01025  CAX    01045  CAX
                          01111  STA   01206  CAX    01223  CAX    01231  CAX    01414  CAX    01426  CAX
                          01436  CAX   01442  CAX    01462  CAX    01545  CAX
 FHPA33      00000041     00403  CAX   00404  STX    01053  STA
 FHPJHT      00000000     01052  CRA   01110  ORA
 FJPC09      00000101     00515  STX   00532  CAX
 FJPC10      00000102     00772  STX   01017  LDA
 FJPC11      00000103     00673  STA   00707  LDA
 FMGESA      00000024     00374  STX   00432  LDA    00765  LDA    01124  LDA    01171  STA    01275  SMNN
                          01332  STA   01357  STA
 FMGBSB      00000025     00375  STX
 FMGBUS      00000000     00013  STA   01076  STX
 FMGERS      00000027     00114  STX   00122  ADM    00126  LDQ    00633  STC    00713  STC    00735  STC
                          01247  STC   01514  LDA
 FMGINT      00000001     00373  STX   01363  LDA    01365  STA
 FMGNDI      00000017     00042  STA   00235  CAX    00366  CAX    00666  LDA
 FMGNRD      00000031     00400  STX   00640  CAX    00643  AOM    00644  LDA    00657  ORA    00672  ADD
                          00703  ADX   00706  ACM    00710  SANE   01043  STX
```

-continued

```
FMGNTR    00000030    00237 STA     00575 LDA     00577 STA     00627 LDA     00631 STA     00645 SANG
FMGCEM    00000012    00022 STA     00152 LDA
FMGPGE    00000022    00056 STA     00127 CAX     01031 CAX     01304 CAX     01337 CAX
FMGPGT    00000016    00043 STO
FMGQUE    00000010    01055 SMNN    01063 SMNN    01071 SMNN    01073 LDA     01075 STA     01104 LDA
                      01106 STA
FMGRDS    00000026    00151 STX     00240 STX     00265 STA     00272 STA     00275 STA     00300 STA
                      00315 STA     00321 STA     00325 STA     00332 STA     00335 STA     00441 SMNN
                      00463 LDA     00465 STA     00467 LDA     00572 STX     00602 STA     00605 LDA
                      00611 STA     00615 STA     00621 STA     00730 STA     00747 LDA     01006 LDA
                      01161 STA     01235 LDA     01474 LDA
FMGRQT    00000013    00026 STA     00061 LDA     00105 LDA     00360 LDA     00522 LDA     00526 LDA
                      00533 LDA     00555 LDA     01003 LDA     01027 LDA     01137 LDA     01202 LDA
                      01302 LDA     01326 LDA
FMGRTY    00000032    00106 CBA     00376 STX     01133 LDA     01136 AOM
FMGSDA    00000021    00052 STA     00130 LDA     01032 LDA     01305 LDA     01340 LDA
FMGSUN    00000015    00036 STA     00171 LDA     00217 LDA
FMGSUR    00000014    00032 STA     00057 LDA     01550 ORA
FMGWCN    00000020    00046 STA     00236 LDA     00444 SANG
FMGWCT    00000023    00401 STX     00443 LDA     01044 STX     01341 ADD     01352 ADM
FMGXRO    00000033    01461 STA     01472 SMNN
FMGXR3    00000011    00014 STX     00164 CAX     00423 STX     00455 CAX     00764 STX     01054 STX
                      01077 CAX     01115 STX     01175 CAX
FMHELA    00000004    00142 LDA     00146 STA
FMHCRA    00000002    00111 LDA     00524 AOM
FMHRBA    00000006    00560 AOM     01013 AOM     01142 AOM     01242 AOM

                                    F74    BOGAC2 MAG TAPE HANDLER
PAGE  043      6/13/75    TIME :  9:58 AM

FQ027     00000032    00075 CAX     01065 CAX     01557 CAX
FQ028     00000033    01057 CAX
FQ049     00000072    01520 CAX
FQ014     00000016    01533 LDA
FWADSA    00000007    00047 LDQ     00662 LDA     00663 ANA     00664 ORA     00665 STA
FWAEIO    00000004    00346 LDA     00347 ANA     00350 ORL     00351 STA     00542 LDA     00543 ANA
                      00544 CPL     00545 STA     00551 LDA     00552 ANA     00553 ORL     00554 STA
                      00753 LDA     00756 ANA     00757 ORA     00760 STA     00773 LDA     00777 LDA
                      01000 ANA     01001 ORL     01002 STA     01207 LDA     01215 LDA     01216 ANA
                      01217 CPL     01220 STA     01224 LDA     01225 ANA     01226 ORL     01227 STA
                      01232 LDA     01316 LDA     01321 ANA     01322 ORL     01323 STA     01416 LDA
                      01443 LDA     01444 ANA     01445 STA     01463 LDA     01464 ANA     01465 ORL
                      01466 STA
FWAELN    00000001    00407 LDA     01535 LDA
FWAERP    00000003    00352 LDA
FWAIDN    00000004    01534 STA
FWAINT    00000010    00406 STA
FWALBN    00000006    00016 LDQ
FWAMDI    00000006    00040 ANA     00041 LRA
FWANPG    00000001    00353 STA     00411 STA     01537 STA
FWAOPM    00000006    00020 ANA     00021 LRA
FWAPRI    00000001    00354 ANA     00355 LRA     00407 LDA     01535 LDA
FWAROT    00000006    00024 ANA     00025 LRA
FWASDA    00000007    00051 ANA
FWASUN    00000006    00034 ANA     00035 LRA
FWASUR    00000006    00030 ANA     00031 LRA
FWATDB    00000011    01422 STC     01470 STA
FWATLR    00000011    00412 LDA     00413 ANA     00414 ORL     00415 STA
FWATMU    00000012    00625 LDA     00642 STA     00705 STC     01427 STC     01437 LDA     01471 STA
FWAWCN    00000010    00044 LDA     00045 ANA     00655 LDA     00656 ANA     00661 STA     00702 AOM
FWAW04    00000004    01546 LDA     01553 LDA     01556 STA
FWAW09    00000011    01532 STA
F010      00000171    00066 BUN
F020      00000175    00173 BZA
F030      00000201    00177 BUN
F74A01    00001336    00157 BSP     00450 BSP     01353 BUN
F74A02    00001354    00141 BSP     00232 BSP     01366 RTN
F74A03    00001367    00537 BSP     00562 BSP     01015 BSP     01151 BSP     01400 RTN     01412 RTN
F74A04    00001413    00341 BSP     00514 BSP     00731 BSP     00776 BSP     01143 BSP     01153 BSP
                      01212 BSP     01243 BSP     01440 RTN
F74A05    00001441    00342 BSP     00525 BSP     01450 RTN
F74A06    00001451    00163 BSP     00454 BSP     00636 BSP     00716 BSP     00740 BSP     01165 BSP
                      01252 BSP     01424 BSP     01431 BSP     01515 RTN
F74A07    00001516    00531 BSP     01146 BSP     01222 BSP     01543 RTN
F74A08    00001544    00565 BSP     01277 BSP     01563 RTN     01565 RTN
F74S01    00000205    00070 BSP     00073 BSP     00175 BSP     00211 BUN     00223 BSP
F74S02    00000212    00102 BSP     00202 BSP     00216 BUN     00227 BSP
F74T01    00000363    00344 BSP     00361 BSP     00420 BUN     00527 BSP     01327 BSP
F74X      00000000    00000 PROGCD
F74X01    00000012    00000 PROGCD
F74X02    00000421    00000 PROGCD
F74X03    00000762    00000 PROGCD
F74X04    00001047    00000 PROGCD
F74X05    00001113    00000 PROGCD

GPGLPG    00000000    00131 XEC     01033 XEC     01306 XEC     01342 XEC

HELTMB    00000031    00440 STA     01132 STA
HELUID    00000031    01513 STA
HST       00000000    01360 LDA
HSTAAD    00000001    00213 LDA     00214 ANA     00215 LRA
HSTAAJ    00000011    00206 LDA     00207 ANA     00210 LRA

JTLOC     00001200    01271 EQU     01406 EQU

MDMTA     00000076    01406 LDA

                                    F74    BOGAC2 MAG TAPE HANDLER
PAGE  044      6/13/75    TIME :  9:58 AM

MDTDB     00000054    01271 LDA
M010      00000217    00065 BUN
M020      00000223    00221 BZA
M040      00000242    00241 BUN
M050      00000267    00243 BUN
M060      00000271    00256 BUN
M080      00000274    00254 BUN
M090      00000277    00255 BUN
M100      00000302    00244 BUN
M110      00000304    00245 BUN
M120      00000306    00246 BUN
M130      00000310    00247 BUN
M140      00000312    00250 BUN
M150      00000314    00251 BUN
M160      00000320    00252 BUN
M170      00000324    00253 BUN
M200      00000572    00475 BUN
M220      00000575    00477 BUN
M230      00000600    00500 BUN
M240      00000632    00501 BUN     00503 BUN     00652 BUN
M250      00000627    00502 BUN
M260      00000604    00505 BUN
M270      00000330    00262 BUN
M275      00000334    00263 BUN
M280      00000613    00504 BUN
M290      00000617    00476 BUN
M300      00000623    00512 BUN
M320      00000647    00637 BZA     00653 BUN
M330      00000654    00646 BUN
M355      00000674    00700 BUN     00720 BUN
M360      00000725    00670 BNA
M370      00000727    00650 BUN     00675 BUN     00711 BUN     00723 BUN
M380      00000730    00726 BUN
M450      00000734    00506 BUN     00507 BUN     00511 BUN
M470      00000701    00677 BUN
M480      00001003    00775 BUN
M485      00001014    01010 BUN     01012 BUN
M500      00000337    00303 BUN     00305 BUN     00307 BUN     00311 BUN     00313 BUN
M501      00000343    00100 BUN
M610      00000722    00724 IBN

PC        00000100    01266 CRR     01403 CRR

PFC7A     00000003    01535 LDA     01540 LDA
```

-continued

```
RA      00000002    00017 CRR   00023 CRR   00027 CRR   00033 CRR   00037 CRR   00050 CRR
                    00053 CRR   00062 CRR   00116 CCR   00120 EXR   00124 CRR   00132 CRR
                    00136 CRR   00136 CRR   00437 CRR   00471 CRR   01022 CRR   01034 CRR
                    01051 CRR   01107 CRR   01131 CRR   01266 CRR   01307 CRR   01331 CRR
                    01343 CRR   01401 CRR   01403 CRR   01411 CRR   01467 CRR   01507 CRR
                    01511 CRR   01511 CRR   01521 CCR   01562 CRR

RQ      00000004    00017 CRR   00023 CRR   00027 CRR   00033 CRR   00037 CRR   00050 CRR
                    00053 CRR   00116 CCR   00120 EXR   00124 CRR   00136 CRR   00561 CRR
                    00635 CRR   00715 CRR   00737 CRR   01014 CRR   01251 CRR   01265 CRR
                    01334 CRR   01401 CRR   01423 CRR   01507 CRR
RO10    00001027    00510 BUN
RO11    00001042    01030 BZA
RO15    00001564    01552 BUN

SCISO   00200000    01271 LDA   01406 LDA
SL412   00000111    00425 SRNE
SL422   00000121    00427 SRNE
SL432   00000061    01117 SRNE
SL442   00000071    01121 SRNE
```

```
                                      F74     BOGAC2 MAG TAPE HANDLER
PAGE  C45      6/13/75     TIME :  9:58 AM
TBCSTB  00000000    00367 LDA   00372 STA

V005    00001124    01506 BUN
V015    00001153    01141 BUN
V020    00001202    01135 BUN
V030    00001146    01255 BUN
V035    00001151    01335 BUN
V039    00001173    01166 BUN   01330 BUN   01333 BUN
V040    00001175    01123 BNX
V060    00001206    01204 BUN
V080    00001160    01145 BUN
V085    00001161    01157 BUN   01245 BUN
V100    00001231    01265 BUN
V120    00001246    01237 BUN   01241 BUN
V122    00001253    00626 BUN
V123    00001257    01167 BNA
V140    00001274    01152 BUN   01264 BUN
V141    00001324    01211 BUN   01221 BUN   01230 BUN   01320 BUN
V142    00001316    01301 BUN
V143    00001327    01315 BUN
V146    00001314    01303 BZA
V200    00001334    01234 BUN   01256 BNA
V210    00001331    01276 BUN
V230    00001222    01155 BUN   01214 BUN
V300    00001167    01126 BUN

X1      00000010    00132 CRR   00161 CRR   00435 CRR   00452 CRR   00471 CRR   00634 CRR
                    00714 CRR   00736 CRR   00770 CRR   01034 CRR   01051 CRR   01107 CRR
                    01127 CRR   01163 CRR   01250 CRR   01307 CRR   01343 CRR   01415 CRR
                    01430 CRR   01435 CRR   01457 CRR   01505 CRR   01511 CRR

X2      00000020    00161 CRR   00337 CRR   00770 CRR   01022 CRR   01257 CRR   01274 CRR
                    01511 CRR
X3      00000040    00062 CRR   00113 CCR   00337 CRR   00435 CRR   00452 CRR   00634 CRR
                    00714 CRR   00736 CRR   00770 CRR   01127 CRR   01163 CRR   01250 CRR
                    01257 CRR   01274 CRR   01415 CRR   01430 CRR   01435 CRR   01457 CRR
                    01505 CRR
```

```
                                      F74     BOGAC2 MAG TAPE HANDLER
PAGE  046      6/13/75     TIME :  9:58 AM
```

UNREFERENCED SYMBCLS

| | | | | | | | | | |
|---|---|---|---|---|---|---|---|---|---|
| AACMM2 | 00C00000 | AACMM2 | 00000000 | AACPH1 | 00030772 | AACPH2 | 00000000 | AACPH5 | 00023472 |
| AACRUM | 00000000 | AAFASP | 00C00000 | AAECPR | 00000000 | AAEPDZ | 00043571 | AAPPHP | 00361117 |
| AAEFIB | 00043571 | AAEFJE | 00307267 | AAEFJP | 00011272 | AAEFMG | 00000000 | AAEFMH | 00000000 |
| AAEFHA | 00070772 | AAFGDT | 00312533 | AAELRA | 00023472 | AAETBF | 00000000 | AAETBL | 00071272 |
| AS4 | 00C0C007 | AUCHA | 00000122 | AUCNF | 00000120 | AUDVD | 00000117 | AUHPO | 00000112 |
| AUMAN | 00000113 | AUSRA | 00000121 | AUWAA | 00000110 | A190 | 00000147 | A300 | 00000233 |
| BC7 | 00000001 | BF7 | 00C00370 | BF9 | 00000057 | BN9 | 00000120 | BP9 | 00000240 |
| B120 | 00000463 | CC | 00000001 | CCF01 | 00000005 | CCB02 | 00000006 | CCB03 | 00000007 |
| CCB04 | 00000010 | CCB05 | 0C000011 | CCB10 | 00000012 | CCB11 | 00000000 | CCB12 | 00000013 |
| CCB13 | 00C00014 | CCB14 | 00000015 | CCB15 | 00000016 | CCC20 | 00000017 | CCC21 | 00000020 |
| CCC22 | 0CC00021 | CCC23 | 00000022 | CCC24 | 00000023 | CCC25 | C0000024 | CCC26 | 00000025 |
| CCC27 | 00000026 | CCD01 | 0C000027 | CCD02 | 00000030 | CCD03 | 00000031 | CCD04 | 00000032 |
| CCD05 | 00000033 | CCD06 | 00000034 | CCD07 | 00000035 | CCD08 | 00000036 | CCE05 | 00000037 |
| CCF01 | 000C0040 | CCF02 | 0C000041 | CCF03 | 00000042 | CCF04 | 00000043 | CCF05 | 00000044 |
| CCF06 | 000C0045 | CCF07 | 0C000046 | CCF08 | 00000047 | CCF09 | 00000071 | CCF10 | 00000072 |
| CCG01 | CCCC0001 | CCG02 | 0C000050 | CCG03 | 00000051 | CCG04 | 00000052 | CCG11 | 00000053 |
| CCG12 | 00000054 | CCG13 | 0C000055 | CCG20 | C0000003 | CCG21 | 00000056 | CCG22 | C0000057 |
| CCG23 | C00C0060 | CCG30 | 00000004 | CCG31 | 00000061 | CCG32 | 00000062 | CCG33 | 00000073 |
| CCG34 | 00000074 | CCG35 | 00000075 | CCG36 | 00000076 | CCG37 | 00000077 | CCG38 | 00000100 |
| CCG39 | 00000101 | CCG40 | 00000102 | CCK01 | 00000063 | CCK02 | 00000064 | CCK04 | 00000066 |
| CCK05 | 00000067 | CCK06 | 00000070 | CL2 | 00000035 | CL3 | 00000060 | CR | 00000000 |
| CPSTD | 00000000 | CT9 | 00000454 | C012 | 00001501 | DP3 | 00000036 | DR9 | 00000620 |
| DT9 | 000C005C | DZ3 | 00000030 | E | 00000462 | E | 00001202 | E | 00000171 |
| E | 00001104 | ECL | 00000000 | ECLG01 | 00000024 | ECLC02 | 00000025 | ECLC03 | 00000026 |
| ECLC04 | 00000027 | ECLC05 | 00000030 | ECLC06 | 00000031 | ECLC07 | 00000032 | ECLC08 | 00000033 |
| ECLT01 | 000C0014 | ECLT02 | 0C000015 | ECLT03 | 00000016 | ECLT04 | 00000017 | ECLT05 | 00000020 |
| ECLT06 | 00000021 | ECLT07 | 00000022 | ECLTC8 | 00000023 | ECL001 | 00000000 | FCL011 | 00000001 |
| ECL012 | 0CC00002 | ECL013 | 00000003 | ECL014 | 00000004 | ECL015 | 00000005 | ECL016 | 00000006 |
| ECL017 | 00000011 | ECL018 | 00000012 | ECL019 | 00000013 | ECL060 | 00000007 | ECL061 | 00000010 |
| EL4 | 00000062 | EM001 | 00000014 | FM002 | 0C000020 | EM003 | 00000027 | EM004 | 00000036 |
| EPL | 000C0000 | EPLBIN | 00000001 | EPLCAP | 00000000 | EPLDAF | 00000000 | EPLDCU | 00000000 |
| EPLDPG | 00000000 | EPLIDX | 00000000 | EPLIPG | 00000000 | EPLPGL | 00000001 | EPLPLI | 00000000 |
| EPLSEG | 0CC00000 | EPS | 00000000 | FPS000 | 00000000 | EPS001 | 00000001 | EPS011 | 00000002 |
| EPS012 | 00000003 | EPS014 | 00000005 | EPS015 | 00000006 | EPS016 | 00000007 | EPS017 | 00000010 |
| EPS018 | 00000015 | EPS019 | 00000016 | EPS041 | 00000011 | EPS050 | 00000012 | EPS051 | 00000013 |
| EPS131 | 00C00014 | EPG | 00000000 | FPG002 | 00000001 | FRG003 | 00000002 | ESL | 00000000 |
| ESL001 | 00000000 | ESL002 | 00000001 | ESL004 | 00000003 | ESL005 | 00000004 | ESL006 | 00000005 |
| ESL007 | 00000006 | ESL008 | 00000007 | FSL009 | 00000010 | ESL010 | 00000011 | ESL011 | 00000012 |
| ESL012 | 0C000013 | ESL013 | 00000014 | ESL014 | 00000015 | FSL015 | 00000016 | ESL016 | 00000017 |
| ESL017 | 00000020 | ESL018 | 00000021 | ESL019 | 00000022 | EST | 00000000 | ESTSST | 00000000 |
| EX | 00000002 | FAA00 | 00000000 | FAA01 | 00000001 | FAA02 | 00000002 | FAA03 | 00000003 |
| FAA04 | 00000004 | FAA05 | 0C000005 | FAA06 | 00000006 | FAA07 | 00000007 | FAA08 | 00000010 |
| FAA09 | 00000011 | FAA10 | 0C000012 | FAA11 | 00000013 | FB001 | 00000000 | FB002 | 00000002 |
| FB003 | 00000004 | FB004 | 00000006 | FB005 | 00000010 | FB006 | 00000012 | FB007 | 00000014 |
| FB008 | 00000016 | FB009 | 0C0C0020 | FB010 | 00000022 | FB011 | 00000024 | FB012 | 00000026 |
| FB013 | 0000003C | FB014 | 0C000032 | FB015 | 00000034 | FB016 | 00000036 | FB017 | 00000040 |
| FB018 | 00000042 | FB019 | 0C000044 | FB020 | 00000046 | FB021 | 00000050 | FB022 | 00000052 |
| FB023 | 00000054 | FB024 | 00000056 | FB025 | C0000060 | FB026 | 00000062 | FB027 | 00000064 |
| FB028 | 00000066 | FB029 | 00000070 | FB030 | 00000072 | FB031 | 00000074 | FB032 | 00000076 |
| FB033 | 00000100 | FB034 | 00000102 | FB035 | 00000104 | FB036 | 00000106 | FB037 | 00000110 |
| FB038 | 00000112 | FB039 | 00000114 | FB040 | 00000116 | FB041 | 00000120 | FB042 | 00000122 |
| FB043 | 00000124 | FB044 | 00000126 | FB045 | 00000130 | FB046 | 00000132 | FB047 | 00000134 |
| FB048 | 00000136 | FB049 | 00000140 | FB050 | 00000142 | FB051 | 00000144 | FB052 | 00000146 |
| FB053 | 00000150 | FB054 | 00000152 | FB055 | 00000154 | FB056 | 00000156 | FB057 | 00000160 |
| FB058 | 00000162 | FB059 | 00000164 | FB060 | 00000166 | FB061 | 00000170 | FB062 | 00000172 |
| FB063 | 00000174 | FB064 | 00000176 | FB065 | 00000200 | FB066 | 00000202 | FB067 | 00000204 |
| FB068 | 00000206 | FB069 | 00000210 | FB070 | 00000212 | FB071 | 00000214 | FB072 | 00000216 |
| FB073 | 00000220 | FB074 | 00000222 | FB075 | 00000224 | FCL | 00000000 | FCLRTC | 00000054 |
| FCL004 | 00000044 | FCL204 | 00000046 | FCL206 | 00000020 | FDP | 00000000 | FDPABT | 00000022 |
| FDPACM | 00000030 | FDPBSY | 00000000 | FDPNCS | 00000014 | FDPSPL | 00000006 | FDZZ00 | 00000000 |
| FDZZ01 | 00000001 | FDZZ02 | 0C000002 | FDZZ03 | 00000003 | FDZZ04 | 00000004 | FDZZ05 | 00000005 |
| FDZZ06 | 000C0006 | FDZZ07 | 00000007 | FDZZ08 | 00000010 | FDZZ09 | 00000011 | FDZZ10 | 00000012 |
| FDZZ11 | 00000013 | FDZZ12 | 00000014 | FDZZ13 | 00000015 | FDZZ14 | 00000016 | FDZZ15 | 00000017 |
| FDZZ16 | 0CCC0020 | FDZZ17 | 00000021 | FDZZ18 | 00000022 | FDZZ19 | 00000023 | FDZZ20 | 00000024 |
| FDZZ21 | 00000025 | FDZZ22 | 0C000026 | FDZZ23 | 00000027 | FHP | 00000000 | FHPA00 | 00000000 |
| FHPA01 | 00000001 | FHPA02 | 00C00002 | FHPA03 | C0000003 | FHPA04 | 00000004 | FHPA05 | 00000005 |
| FHPA06 | 0C000006 | FHPA07 | 00000007 | FHPA08 | 00000010 | FHPA09 | 00000011 | FHPA10 | 00000012 |
| FHPA11 | 00000013 | FHPA12 | 0C000014 | FHPA13 | 00000015 | FHPA14 | 00000016 | FHPA15 | 00000017 |
| FHPA16 | 000C0020 | FHPA17 | 00000021 | FHPA18 | 00000022 | FHPA19 | 00000023 | FHPA20 | 00000024 |
| FHPA21 | 00000025 | FHPA22 | 0C000026 | FHPA23 | 00000027 | FHPA24 | 00000030 | FHPA25 | 00000031 |

PAGE 047 6/13/75 TIME : 9:58 AM F74 BOGAC2 MAG TAPE HANDLER

| | | | | | | | | | |
|---|---|---|---|---|---|---|---|---|---|
| FHPA26 | 00000032 | FHPA27 | 00000033 | FHPA28 | 00000034 | FHPA29 | 00000035 | FHPA30 | 00000036 |
| FHPA31 | 00000037 | FHPA34 | 00000042 | FHPA35 | 00000043 | FHPA36 | 00000044 | FHPHP1 | 00000000 |
| FHPHP2 | 00000000 | FHPHP3 | 00000000 | FHPHP4 | 00000000 | FHPHP5 | 00000000 | FHPMDA | 00000000 |
| FHEMSK | 00000000 | FIB | 00000000 | FIBW01 | 00000000 | FIBW02 | 00000001 | FIBW03 | 00000002 |
| FIBW04 | 00000003 | FIBW05 | 00000004 | FIBW06 | 00000005 | FJE | 00000000 | FJERNN | 00000032 |
| FJE000 | 00000000 | FJE001 | 00000001 | FJE002 | 00000002 | FJE003 | 00000003 | FJE004 | 00000004 |
| FJE005 | 00000005 | FJE006 | 00000006 | FJE007 | 00000007 | FJE008 | 00000010 | FJE009 | 00000011 |
| FJE010 | 00000012 | FJE011 | 00000013 | FJE012 | 00000014 | FJE013 | 00000015 | FJE014 | 00000016 |
| FJE015 | 00000017 | FJE016 | 00000020 | FJE017 | 00000021 | FJE018 | 00000022 | FJE019 | 00000023 |
| FJE020 | 00000024 | FJE021 | 00000025 | FJE022 | 00000026 | FJE023 | 00000027 | FJE024 | 00000030 |
| FJE025 | 00000031 | FJE026 | 00000032 | FJE027 | 00000033 | FJE028 | 00000034 | FJE029 | 00000035 |
| FJP | 00000000 | FJPA01 | 00000000 | FJPA02 | 00000001 | FJPA03 | 00000002 | FJPA04 | 00000003 |
| FJPA05 | 00000004 | FJPA06 | 00000005 | FJPA07 | 00000006 | FJPA08 | 00000007 | FJPA09 | 00000010 |
| FJPA10 | 00000011 | FJPA11 | 00000012 | FJPA12 | 00000013 | FJPA13 | 00000014 | FJPA14 | 00000015 |
| FJPA15 | 00000016 | FJPA16 | 00000017 | FJPA17 | 00000020 | FJPA18 | 00000021 | FJPA19 | 00000022 |
| FJPA20 | 00000023 | FJPA21 | 00000024 | FJPA22 | 00000025 | FJPA23 | 00000026 | FJPA24 | 00000027 |
| FJPA25 | 00000030 | FJPA97 | 00000200 | FJPA98 | 00000210 | FJPA99 | 00000220 | FJPB01 | 00000031 |
| FJPB02 | 00000032 | FJPB03 | 00000033 | FJPB04 | 00000034 | FJPB05 | 00000035 | FJPB06 | 00000036 |
| FJPB07 | 00000037 | FJPB08 | 00000040 | FJPB09 | 00000041 | FJPB10 | 00000042 | FJPB11 | 00000043 |
| FJPB12 | 00000044 | FJPB13 | 00000045 | FJPB14 | 00000046 | FJPB15 | 00000047 | FJPB16 | 00000050 |
| FJPB17 | 00000051 | FJPB18 | 00000052 | FJPB19 | 00000053 | FJPB20 | 00000054 | FJPB21 | 00000055 |
| FJPB22 | 00000056 | FJPB23 | 00000057 | FJPB24 | 00000060 | FJPB25 | 00000061 | FJPB26 | 00000062 |
| FJPB27 | 00000063 | FJPB28 | 00000064 | FJPB29 | 00000065 | FJPB30 | 00000066 | FJPB31 | 00000067 |
| FJPB32 | 00000070 | FJPB97 | 00000201 | FJPB98 | 00000211 | FJPB99 | 00000221 | FJPC01 | 00000071 |
| FJPC02 | 00000072 | FJPC03 | 00000073 | FJPC04 | 00000074 | FJPC05 | 00000075 | FJPC06 | 00000076 |
| FJPC07 | 00000077 | FJPC08 | 00000100 | FJPC97 | 00000202 | FJPC98 | 00000212 | FJPC99 | 00000222 |
| FJPD01 | 00000104 | FJPD02 | 00000105 | FJPD03 | 00000106 | FJPD04 | 00000107 | FJPD05 | 00000110 |
| FJPD06 | 00000111 | FJPD07 | 00000112 | FJPD08 | 00000113 | FJPD09 | 00000114 | FJPD10 | 00000115 |
| FJPD11 | 00000116 | FJPD12 | 00000117 | FJPD13 | 00000120 | FJPD14 | 00000121 | FJPD15 | 00000122 |
| FJPD16 | 00000123 | FJPD17 | 00000124 | FJPD18 | 00000125 | FJPD19 | 00000126 | FJPD20 | 00000127 |
| FJPD97 | 00000203 | FJPD98 | 00000213 | FJPD99 | 00000223 | FJPE01 | 00000130 | FJPE02 | 00000131 |
| FJPE03 | 00000132 | FJPE04 | 00000133 | FJPE05 | 00000134 | FJPE06 | 00000135 | FJPE07 | 00000136 |
| FJPE08 | 00000137 | FJPE09 | 00000140 | FJPE97 | 00000204 | FJPE98 | 00000214 | FJPF99 | 00000224 |
| FJPF01 | 00000141 | FJPF02 | 00000142 | FJPF03 | 00000143 | FJPF04 | 00000144 | FJPF05 | 00000145 |
| FJPF06 | 00000146 | FJPF07 | 00000147 | FJPF08 | 00000150 | FJPF09 | 00000151 | FJPF10 | 00000152 |
| FJPF97 | 00000205 | FJPF98 | 00000215 | FJPF99 | 00000225 | FJPG01 | 00000153 | FJPG02 | 00000154 |
| FJPG03 | 00000155 | FJPG04 | 00000156 | FJPG05 | 00000157 | FJPG97 | 00000206 | FJPG98 | 00000216 |
| FJPG99 | 00000226 | FJPH01 | 00000160 | FJPH02 | 00000161 | FJPH03 | 00000162 | FJPH04 | 00000163 |
| FJPH05 | 00000164 | FJPH06 | 00000165 | FJPH07 | 00000166 | FJPH08 | 00000167 | FJPH09 | 00000170 |
| FJPH10 | 00000171 | FJPH97 | 00000207 | FJPH98 | 00000217 | FJPH99 | 00000227 | FJPK01 | 00000172 |
| FJPK02 | 00000173 | FJPK03 | 00000174 | FJPK04 | 00000175 | FJPK05 | 00000176 | FJPK06 | 00000177 |
| FJPM01 | 00000230 | FJPM02 | 00000231 | FJPM03 | 00000232 | FJPM04 | 00000233 | FJPM05 | 00000234 |
| FJPM06 | 00000235 | FJPM07 | 00000236 | FJPM08 | 00000237 | FJPM09 | 00000240 | FJPM10 | 00000241 |
| FJPM11 | 00000242 | FJPM12 | 00000243 | FJPM13 | 00000244 | FJPM14 | 00000245 | FJPM15 | 00000246 |
| FMG | 00000000 | FMGRG1 | 00000004 | FMGRG2 | 00000005 | FMGRG3 | 00000006 | FMGRG4 | 00000007 |
| FMGXR1 | 00000002 | FMGXR2 | 00000003 | FMH | 00000000 | FMHBLB | 00000005 | FMHCRB | 00000003 |
| FMHFCI | 00000000 | FMHRBB | 00000007 | FMHSBC | 00000010 | FMT | 00000000 | FMTMON | 00000000 |
| FQ001 | 00000000 | FQ002 | 00000001 | FQ003 | 00000002 | FQ004 | 00000003 | FQ005 | 00000004 |
| FQ006 | 00000005 | FQ007 | 00000006 | FQ008 | 00000007 | FQ009 | 00000010 | FQ010 | 00000011 |
| FQ011 | 00000012 | FQ012 | 00000013 | FQ013 | 00000014 | FQ014 | 00000015 | FQ015 | 00000016 |
| FQ016 | 00000017 | FQ017 | 00000020 | FQ018 | 00000021 | FQ019 | 00000022 | FQ020 | 00000023 |
| FQ021 | 00000024 | FQ022 | 00000025 | FQ023 | 00000026 | FQ024 | 00000027 | FQ025 | 00000030 |
| FQ026 | 00000031 | FQ029 | 00000034 | FQ030 | 00000035 | FQ031 | 00000036 | FQ032 | 00000037 |
| FQ033 | 00000040 | FQ034 | 00000041 | FQ035 | 00000042 | FQ036 | 00000043 | FQ037 | 00000044 |
| FQ038 | 00000045 | FQ039 | 00000046 | FQ040 | 00000047 | FQ041 | 00000050 | FQ042 | 00000051 |
| FQ043 | 00000064 | FQ044 | 00000065 | FQ045 | 00000066 | FQ046 | 00000067 | FQ047 | 00000070 |
| FQ048 | 00000071 | FQ050 | 00000073 | FQ051 | 00000074 | FQ052 | 00000075 | FQ053 | 00000073 |
| FQ054 | 00000074 | FQ055 | 00000052 | FQ056 | 00000053 | FRA | 00000000 | FRABK1 | 00000000 |
| FRABK2 | 00000100 | FRACCT | 00000200 | FRAPST | 00000000 | FRALST | 00000100 | FRC | 00000000 |
| FRCTIN | 00000043 | FRCTMC | 00000024 | FRCTMK | 00000050 | FRCTND | 00000055 | FRCUIN | 00000005 |
| FRCUMC | 00000000 | FRCUMK | 00000012 | FRCUND | 00000017 | FRCZTU | 00000031 | FRCZUN | 00000036 |
| FRS | 00000000 | FRSARG | 00000000 | FRSBK1 | 00000026 | FRSBK2 | 00000041 | FRSBK3 | 00000054 |
| FRSE01 | 00000067 | FRSE02 | 00000102 | FRSE03 | 00000115 | FRSE04 | 00000130 | FRSORG | 00000013 |
| FRSXR1 | 00000026 | FRSXR2 | 00000041 | FRSXR3 | 00000054 | FSS | 00000000 | FSSSLB | 00000000 |
| FSS001 | 00000000 | FSS002 | 00000001 | FSS003 | 00000002 | FSS004 | 00000003 | FSS005 | 00000004 |
| FSS006 | 00000005 | FSS007 | 00000006 | FSS008 | 00000007 | FSS009 | 00000010 | FSS010 | 00000011 |
| FSS011 | 00000012 | FSS012 | 00000013 | FSS013 | 00000014 | FSS014 | 00000015 | FSS015 | 00000016 |
| FSS016 | 00000017 | FSS017 | 00000020 | FSS018 | 00000021 | FSS019 | 00000022 | FSS020 | 00000023 |
| FSS021 | 00000024 | FSS022 | 00000025 | FSS023 | 00000026 | FSS024 | 00000027 | FSS025 | 00000030 |
| FSS026 | 00000031 | FSS027 | 00000032 | FSS028 | 00000033 | FSS029 | 00000034 | FSS030 | 00000035 |
| FSW | 00000000 | FSWWAS | 00000000 | FTE | 00000000 | FTEBK1 | 00000000 | FTEELN | 00000000 |
| FTENPG | 00000000 | FTEPRI | 00000000 | FTERGA | 00000000 | FTERGB | 00000000 | FTI | 00000000 |

PAGE 048 6/13/75 TIME : 9:58 AM F74 BOGAC2 MAG TAPE HANDLER

| | | | | | | | | | |
|---|---|---|---|---|---|---|---|---|---|
| FTIBK1 | 00000000 | FTIFLN | 00000000 | FTINEG | 00000000 | FTIPRI | 00000000 | FTIRGA | 00000000 |
| FTIRGB | 00000000 | FTM | 00000000 | FTMBK1 | 00000000 | FTMELN | 00000000 | FTMNPG | 00000000 |
| FTMPRI | 00000000 | FTMRGA | 00000000 | FTMRGB | 00000000 | FTT | 00000000 | FTTBK1 | 00000000 |
| FTTELN | 00000000 | FTTNPG | 00000000 | FTTPRI | 00000000 | FTTRGA | 00000000 | FTTRGB | 00000000 |
| FU000 | 00000000 | FU001 | 00000001 | FU002 | 00000002 | FU003 | 00000003 | FU004 | 00000004 |
| FU005 | 00000005 | FU006 | 00000006 | FU007 | 00000007 | FU008 | 00000010 | FU009 | 00000011 |
| FU010 | 00000012 | FU011 | 00000013 | FU012 | 00000014 | FU013 | 00000015 | FU015 | 00000017 |
| FU016 | 00000020 | FU017 | 00000021 | FU018 | 00000022 | FU019 | 00000023 | FU020 | 00000024 |
| FU021 | 00000025 | FU022 | 00000026 | FU023 | 00000027 | FU024 | 00000030 | FU025 | 00000031 |
| FU026 | 00000032 | FU027 | 00000033 | FU028 | 00000034 | FU029 | 00000035 | FU030 | 00000036 |
| FU031 | 00000037 | FU032 | 00000040 | FU033 | 00000041 | FU034 | 00000042 | FU035 | 00000043 |
| FU036 | 00000044 | FU037 | 00000045 | FU038 | 00000046 | FU039 | 00000047 | FU040 | 00000050 |
| FU041 | 00000051 | FU042 | 00000052 | FU043 | 00000053 | FU044 | 00000054 | FU045 | 00000055 |
| FU046 | 00000056 | FU047 | 00000057 | FU048 | 00000060 | FU049 | 00000061 | FWA | 00000000 |
| FWAAAS | 00000005 | FWAACM | 00000004 | FWAACT | 00000011 | FWAADG | 00000013 | FWAAD1 | 00000012 |
| FWAAD2 | 00000012 | FWAAD3 | 00000012 | FWAAD4 | 00000012 | FWAAD5 | 00000012 | FWAAD6 | 00000012 |
| FWAAII | 00000006 | FWAAIO | 00000006 | FWAAKO | 00000017 | FWABCD | 00000012 | FWABK1 | 00000000 |
| FWABK2 | 00000001 | FWABK3 | 00000002 | FWABK4 | 00000002 | FWABK5 | 00000003 | FWABK6 | 00000004 |
| FWABK7 | 00000005 | FWABK8 | 00000005 | FWABLK | 00000005 | FWABMM | 00000011 | FWABTF | 00000006 |
| FWABTP | 00000006 | FWABWC | 00000050 | FWABWO | 00000012 | FWABW1 | 00000013 | FWAB10 | 00000011 |
| FWAB11 | 00000021 | FWAB12 | 00000020 | FWACAR | 00000013 | FWACDR | 00000006 | FWACHT | 00000005 |
| FWACLR | 00000006 | FWACLO | 00000011 | FWACL1 | 00000011 | FWACL2 | 00000011 | FWACMO | 00000006 |
| FWACON | 00000010 | FWACPA | 00000005 | FWACEG | 00000007 | FWACPI | 00000006 | FWACRI | 00000006 |
| FWACRM | 00000006 | FWACTB | 00000013 | FWACWO | 00000014 | FWACW1 | 00000015 | FWADAD | 00000012 |
| FWADAR | 00000012 | FWADCT | 00000007 | FWADCP | 00000007 | FWADEI | 00000011 | FWADEL | 00000013 |
| FWADGT | 00000006 | FWADTR | 00000006 | FWADMC | 00000006 | FWADNO | 00000006 | FWADVI | 00000006 |
| FWADWC | 00000007 | FWADWD | 00000016 | FWAEPG | 00000001 | FWAESZ | 00000010 | FWAES1 | 00000020 |
| FWAES2 | 00000021 | FWAES3 | 00000022 | FWAETH | 00000006 | FWAETL | 00000007 | FWAEWO | 00000017 |
| FWAEW1 | 00000020 | FWAEW2 | 00000021 | FWAEW3 | 00000022 | FWAEW4 | 00000023 | FWAEW5 | 00000024 |
| FWAEW6 | 00000025 | FWAEW7 | 00000026 | FWAEW8 | 00000027 | FWAEW9 | 00000030 | FWAEXC | 00000010 |
| FWAFCA | 00000006 | FWAFEL | 00000003 | FWAFEP | 00000003 | FWAFID | 00000004 | FWAFLG | 00000011 |
| FWAFMT | 00000005 | FWAFPR | 00000003 | FWAHNR | 00000006 | FWAHPT | 00000006 | FWAINS | 00000011 |
| FWAINW | 00000011 | FWAINX | 00000011 | FWAICM | 00000006 | FWAIPC | 00000006 | FWALKC | 00000000 |
| FWAIMT | 00000011 | FWALPT | 00000006 | FWALSP | 00000016 | FWAMDA | 00000004 | FWAMD1 | 00000004 |
| FWAMD2 | 00000004 | FWAMD3 | 00000004 | FWAMD4 | 00000004 | FWAMD5 | 00000004 | FWAMMN | 00000006 |
| FWAMMP | 00000011 | FWAMNO | 00000005 | FWAMNP | 00000013 | FWAMNT | 00000013 | FWAMOD | 00000011 |
| FWAMPM | 00000011 | FWAMRN | 00000006 | FWAMSK | 00000014 | FWAMW1 | 00000015 | FWAMW2 | 00000017 |
| FWAMW3 | 00000021 | FWAMXC | 00000010 | FWANAM | 00000017 | FWANCN | 00000004 | FWANCS | 00000011 |
| FWANEL | 00000022 | FWANEP | 00000022 | FWANGT | 00000006 | FWANNP | 00000022 | FWANOE | 00000005 |
| FWANOP | 00000010 | FWANPA | 00000013 | FWACCP | 00000007 | FWAOPT | 00000006 | FWAPAN | 00000010 |
| FWAPGE | 00000013 | FWAPGT | 00000006 | FWAPKI | 00000014 | FWAPMI | 00000015 | FWAPNO | 00000023 |
| FWAPOS | 00000006 | FWAPPD | 00000023 | FWAPCT | 00000006 | FWAPRR | 00000023 | FWAPTD | 00000023 |
| FWAPTI | 00000006 | FWAPTL | 00000006 | FWAPTS | 00000006 | FWAPTT | 00000006 | FWAPT1 | 00000006 |
| FWAPT2 | 00000006 | FWAPT3 | 00000006 | FWARDA | 00000010 | FWAREA | 00000006 | FWARPL | 00000022 |
| FWARIN | 00000005 | FWARIO | 00000006 | FWARJI | 00000004 | FWARJN | 00000004 | FWARMK | 00000013 |
| FWARNE | 00000006 | FWARNR | 00000022 | FWARRT | 00000011 | FWARTC | 00000006 | FWARWI | 00000012 |
| FWAR1A | 00000006 | FWAR2A | 00000007 | FWAR4A | 00000010 | FWAR6A | 00000011 | FWAR6B | 00000012 |
| FWASAD | 00000017 | FWASA2 | 00000005 | FWASCI | 00000006 | FWASCR | 00000006 | FWASDC | 00000006 |
| FWASDR | 00000006 | FWASEC | 00000004 | FWASEG | 00000012 | FWASEL | 00000002 | FWASKI | 00000016 |
| FWASMI | 00000017 | FWASMP | 00000006 | FWASMR | 00000006 | FWASOM | 00000006 | FWASPG | 00000002 |
| FWASPI | 00000002 | FWASPL | 00000006 | FWASRN | 00000016 | FWASSR | 00000006 | FWASW1 | 00000014 |
| FWASW2 | 00000016 | FWASW3 | 00000020 | FWAS00 | 00000031 | FWAS01 | 00000032 | FWAS02 | 00000033 |
| FWAS03 | 00000034 | FWAS04 | 00000035 | FWAS05 | 00000036 | FWAS06 | 00000037 | FWAS07 | 00000040 |
| FWAS08 | 00000041 | FWAS09 | 00000042 | FWAS10 | 00000043 | FWAS11 | 00000044 | FWAS12 | 00000045 |
| FWAS13 | 00000046 | FWAS14 | 00000047 | FWAS15 | 00000050 | FWAS16 | 00000051 | FWAS17 | 00000052 |
| FWAS18 | 00000053 | FWAS19 | 00000054 | FWAS20 | 00000055 | FWAS21 | 00000056 | FWAS22 | 00000057 |
| FWAS23 | 00000060 | FWAS24 | 00000061 | FWATEL | 00000002 | FWATKI | 00000020 | FWATMI | 00000021 |
| FWATMS | 00000006 | FWATPF | 00000002 | FWATPP | 00000002 | FWATWC | 00000011 | FWATYP | 00000000 |
| FWAUSE | 00000002 | FWAUSR | 00000006 | FWAVSA | 00000010 | FWAVTS | 00000006 | FWAVWC | 00000010 |
| FWAWCT | 00000011 | FWAWC2 | 00000004 | FWAW00 | 00000000 | FWAW01 | 00000001 | FWAW02 | 00000002 |
| FWAW03 | 00000003 | FWAW05 | 00000005 | FWAW06 | 00000006 | FWAW07 | 00000007 | FWAW08 | 00000010 |
| FWAW10 | 00000012 | FWAW11 | 00000013 | FWAW12 | 00000014 | FWAW13 | 00000015 | FWAW14 | 00000016 |
| FWAW15 | 00000017 | FWAW16 | 00000020 | FWAW17 | 00000021 | FWAW18 | 00000022 | FWAW19 | 00000023 |
| FWAW20 | 00000024 | FWAW21 | 00000025 | FWAW22 | 00000026 | FWAW23 | 00000027 | FWAW24 | 00000030 |
| FWAW25 | 00000031 | FWAW26 | 00000032 | FWAW27 | 00000033 | FWAW28 | 00000034 | FWAW29 | 00000035 |
| FWAW30 | 00000036 | FWAW31 | 00000037 | FWAW32 | 00000040 | FWAW33 | 00000041 | FWAW34 | 00000042 |
| FWAW35 | 00000043 | FWAW36 | 00000044 | FWAW37 | 00000045 | FWAW38 | 00000046 | FWAW39 | 00000047 |
| FWAW40 | 00000050 | FWAW41 | 00000051 | FWAW42 | 00000052 | FWAW43 | 00000053 | FWAW44 | 00000054 |
| FWAW45 | 00000055 | FWAW46 | 00000056 | FWAW47 | 00000057 | FWAW48 | 00000060 | FWAW49 | 00000061 |
| FWAW50 | 00000062 | FWAW51 | 00000063 | FWAW52 | 00000064 | FWAW53 | 00000065 | FWAW54 | 00000066 |
| FWAW55 | 00000067 | FWAW56 | 00000070 | FWAW57 | 00000071 | FWAW58 | 00000072 | FWAW59 | 00000073 |
| FWAW60 | 00000074 | FWAW61 | 00000075 | FWB | 00000000 | FWBALT | 00000024 | FWBAOG | 00000024 |

PAGE 049 6/13/75 TIME : 9:58 AM F74 BCGAC2 MAG TAPE HANDLER

| | | | | | | | | | |
|---|---|---|---|---|---|---|---|---|---|
| FWBAFR | 00000024 | FWBCAB | 00000025 | FWBCCM | 00000025 | FWBCD1 | 00000031 | FWBCD2 | 00000030 |
| FWBCMD | 00000026 | FWBCRS | 00000024 | FWBCTL | 00000020 | FWBCTR | 00000024 | FWBCTT | 00000026 |
| FWBDST | 00000025 | FWBD10 | 00000030 | FWBD11 | 00000030 | FWBD12 | 00000030 | FWBD13 | 00000027 |
| FWBD14 | 00000027 | FWBD15 | 00000027 | FWBD16 | 00000027 | FWBD17 | 00000027 | FWBD18 | 00000027 |
| FWBEOH | 00000020 | FWBEOM | 00000024 | FWBECP | 00000024 | FWBEOS | 00000020 | FWBFTO | 00000026 |
| FWBIDC | 00000026 | FWBILS | 00000020 | FWBIPJ | 00000024 | FWBMDR | 00000025 | FWBMS1 | 00000020 |
| FWBMS2 | 00000020 | FWBMS3 | 00000020 | FWBN10 | 00000022 | FWBN14 | 00000031 | FWBPD1 | 00000021 |
| FWBPFF | 00000026 | FWBPR1 | 00000021 | FWBPR2 | 00000021 | FWBPR3 | 00000021 | FWBPR4 | 00000021 |
| FWBPR5 | 00000021 | FWBPR6 | 00000021 | FWBPTR | 00000025 | FWBPTT | 00000025 | FWBRSP | 00000024 |
| FWBR2A | 00000025 | FWBSAT | 00000024 | FWBSIM | 00000020 | FWBSDS | 00000025 | FWBSIN | 00000020 |
| FWBSKP | 00000020 | FWBSLS | 00000020 | FWBSRA | 00000024 | FWBTAS | 00000024 | FWBTRB | 00000024 |
| FWBTRC | 00000025 | FWBTRI | 00000025 | FWBTTJ | 00000025 | FWBTSN | 00000020 | FWBW00 | 00000020 |
| FWBW01 | 00000021 | FWBW02 | 00000022 | FWBW03 | 00000023 | FWBW04 | 00000024 | FWBW05 | 00000025 |
| FWBW06 | 00000026 | FWBW07 | 00000027 | FWBWC8 | 00000030 | FWBW09 | 00000031 | FWBXCB | 00000025 |
| FWBXD1 | 00000031 | FWBXD2 | 00000031 | FWBXD3 | 00000031 | FWBXD4 | 00000031 | FWBXD5 | 00000031 |
| FWBXD6 | 00000031 | FWBXD7 | 00000030 | FWBXD8 | 00000030 | FWBXD9 | 00000030 | FWBXFD | 00000024 |
| FWBXIN | 00000024 | FWBXN1 | 00000023 | FWBXN2 | 00000023 | FWBXN3 | 00000023 | FWBXN4 | 00000023 |
| FWBXN5 | 00000023 | FWBXN6 | 00000023 | FWBXN7 | 00000022 | FWBXN8 | 00000022 | FWBXN9 | 00000022 |
| FWBXP2 | 00000025 | FWBXTL | 00000026 | FWBXTO | 00000025 | FWBX1A | 00000024 | FWBX13 | 00000031 |
| FWBX2A | 00000025 | FWBX3A | 00000020 | FWBX4A | 00000026 | FWBX46 | 00000031 | FWBX5A | 00000021 |
| FWBX5B | 00000027 | FWBX6A | 00000030 | FWBX6B | 00000031 | FWBX7A | 00000022 | FWBX7B | 00000023 |
| FWBZOC | 00000026 | FWBZCO | 00000026 | FWC | 00000000 | FWCABG | 00000021 | FWCARR | 00000022 |
| FWCAUI | 00000021 | FWCAUN | 00000021 | FWCBKO | 00000020 | FWCBK1 | 00000021 | FWCBK2 | 00000021 |
| FWCBK3 | 00000022 | FWCBK4 | 00000023 | FWCBUN | 00000020 | FWCBUO | 00000021 | FWCCCG | 00000022 |
| FWCCCI | 00000020 | FWCCHP | 00000022 | FWCCSO | 00000020 | FWCCSP | 00000020 | FWCCST | 00000022 |
| FWCDGT | 00000020 | FWCHOP | 00000022 | FWCINO | 00000020 | FWCINT | 00000020 | FWCLAB | 00000023 |
| FWCLAI | 00000023 | FWCLAU | 00000023 | FWCLMX | 00000023 | FWCLPX | 00000023 | FWCMDT | 00000021 |
| FWCMID | 00000020 | FWCMTN | 00000020 | FWCMTX | 00000021 | FWCPLS | 00000022 | FWCRUO | 00000021 |
| FWCSAB | 00000021 | FWCSAI | 00000021 | FWCSAU | 00000021 | FWCSBS | 00000020 | FWCSEC | 00000020 |
| FWCSMX | 00000021 | FWCSQS | 00000022 | FWCSTN | 00000022 | FWCSTU | 00000022 | FWCSUT | 00000022 |
| FWCTCL | 00000020 | FWCTKC | 00000021 | FWCTXT | 00000022 | FWCW00 | 00000020 | FWCW01 | 00000021 |
| FWCW02 | 00000022 | FWCW03 | 00000023 | FWD | 00000000 | FWDABG | 00000015 | FWDARR | 00000016 |
| FWDAUI | 00000015 | FWDAUN | 00000015 | FWDBUN | 00000014 | FWDBUO | 00000015 | FWDCCG | 00000016 |
| FWDCCI | 00000014 | FWDCSO | 00000014 | FWDCSP | 00000014 | FWDCST | 00000014 | FWDDGO | 00000014 |
| FWDDGT | 00000014 | FWDHOR | 00000016 | FWDINO | 00000014 | FWDINT | 00000014 | FWDLAB | 00000017 |
| FWDIAI | 00000017 | FWDLAU | 00000017 | FWDLPX | 00000017 | FWDLPX | 00000014 | FWDLSD | 00000017 |
| FWDMDC | 00000015 | FWDMDT | 00000015 | FWDMID | 00000014 | FWDMTN | 00000014 | FWDMTX | 00000015 |
| FWDPLS | 00000016 | FWDPUO | 00000015 | FWDSAB | 00000015 | FWDSAI | 00000015 | FWDSAU | 00000015 |
| FWDSBS | 00000014 | FWDSEC | 00000014 | FWDSGI | 00000015 | FWDSGO | 00000016 | FWDSMX | 00000015 |
| FWDSQS | 00000016 | FWDSTN | 00000016 | FWDSTU | 00000016 | FWDSUT | 00000016 | FWDTCL | 00000014 |
| FWDTC1 | 00000015 | FWDTC2 | 00000015 | FWDTC3 | 00000015 | FWDTKC | 00000015 | FWDTXO | 00000014 |
| FWDTXT | 00000016 | FWDUIC | 00000014 | FWDW00 | 00000014 | FWDW01 | 00000015 | FWDW02 | 00000016 |
| FWDW03 | 00000017 | FWF | 00000000 | FWECUI | 00000012 | FWEDOC | 00000012 | FWEPOC | 00000012 |
| FW001 | 00000072 | FW002 | 00000073 | FW003 | 00000072 | FW004 | 00000072 | FW005 | 00000070 |
| FW006 | 00000075 | FW007 | 00000073 | FW008 | 00000073 | FW009 | 00000073 | FW010 | 00000071 |
| FW011 | 00000073 | FW012 | 00000073 | FW013 | 00000073 | FW014 | 00000073 | FW015 | 00000073 |
| FW016 | 00000074 | FW017 | 00000072 | FW018 | 00000071 | FW019 | 00000074 | FW020 | 00000073 |
| FW021 | 00000071 | FW022 | 00000072 | FW023 | 00000070 | FW024 | 00000072 | FW025 | 00000074 |
| FW026 | 00000075 | FW027 | 00000071 | FW028 | 00000073 | FW029 | 00000072 | FW030 | 00000072 |
| FW031 | 00000073 | FW032 | 00000073 | FW033 | 00000072 | FW034 | 00000073 | FW035 | 00000072 |
| FW036 | 00000072 | FW037 | 00000073 | FW038 | 00000074 | FW039 | 00000072 | FW040 | 00000066 |
| FW041 | 00000067 | FW042 | 00000074 | GBF | 00000000 | GBPERR | 00000001 | GBPLMT | 00000000 |
| GBFW00 | 00000002 | GBN | 00000000 | GDNEAD | 00000000 | GBNDAP | 00000000 | GBNBPG | 00000000 |
| GBNNEX | 00000050 | GBNPPH | 00000000 | GBNSO1 | 00000000 | GBP | 00000000 | GBPACT | 00000050 |
| GBPBAD | 00000000 | GBPBAP | 00000050 | GBPBPG | 00000000 | GBPBRP | 00000050 | GBPCDI | 00000050 |
| GBPCND | 00000050 | GBPDLT | 00000170 | GBPDFI | 00000000 | GBPGDT | 00000050 | GBPGPM | 00000000 |
| GBPENT | 00000120 | GBPREO | 00000120 | GCT | 00000000 | GCTADD | 00000000 | GCTAND | 00000264 |
| GCTCAD | 00000000 | GCTCDA | 00000360 | GCTCON | 00000170 | GCTCTG | 00000360 | GCTKAP | 00000000 |
| GCTKDS | 00000000 | GCTKPG | 00000000 | GCTMSK | 00000074 | GCTNEX | 00000264 | GCTOPC | 00000264 |
| GCTREL | 00000264 | GCTREO | 00000264 | GCTRJA | 00000000 | GCTRSI | 00000264 | GCTSGN | 00000000 |
| GCTSP4 | 00000264 | GCTS14 | 00000360 | GCTTAG | 00000000 | GDF | 00000055 | GDFCDA | 00000064 |
| GDFCDS | 00000056 | GDFDDS | 00000060 | GDFMLC | 00000063 | GDFPFM | 00000055 | GDFRSS | 00000061 |
| GDFSDA | 00000064 | GDFSDS | 00000057 | GDFTTY | 00000062 | GDFWAA | 00000066 | GDFWAB | 00000067 |
| GDFWCT | 00000065 | GDFWKT | 00000065 | GDM | 00000000 | GDMAD1 | 00000015 | GDMAD2 | 00000016 |
| GDMARA | 00000051 | GDMCOP | 00000000 | GDMDCP | 00000020 | GDMDCU | 00000017 | GDMDDT | 00000046 |
| GDMDMP | 00000006 | GDMDRM | 00000001 | GDMDTT | 00000047 | GDMEQL | 00000054 | GDMLN1 | 00000007 |
| GDMLN2 | 00000010 | GDMLN3 | 00000011 | GDMLN4 | 00000012 | GDMLN5 | 00000013 | GDMLN6 | 00000014 |
| GDMLOD | 00000053 | GDMOVR | 00000052 | GDMSAA | 00000037 | GDMRQO | 00000040 | GDMPRS | 00000005 |
| GDMRS1 | 00000044 | GDMPS2 | 00000045 | GDMR01 | 00000023 | GDMR02 | 00000024 | GDMR03 | 00000025 |
| GDMR04 | 00000026 | GDMR05 | 00000027 | GDMR06 | 00000030 | GDMR07 | 00000031 | GDMR08 | 00000032 |
| GDMR09 | 00000033 | GDMR10 | 00000034 | GDMR11 | 00000035 | GDMR12 | 00000036 | GDMSG1 | 00000021 |
| GDMSG2 | 00000022 | GDMSL1 | 00000002 | GDMSI2 | 00000003 | GDMSL3 | 00000004 | GDMWRK | 00000050 |

PAGE 050 6/13/75 TIME : 9:58 AM F74 BCGAC2 MAG TAPE HANDLER

| | | | | | | | | | |
|---|---|---|---|---|---|---|---|---|---|
| GDMXX1 | 00000041 | GDMXX2 | 00000042 | GDMXX3 | 00000043 | GDR | 00000000 | GDRADD | 00000144 |
| GDPCAD | 00000000 | GDPCAP | 00000000 | GDRCCP | 00000000 | GDRCPG | 00000000 | GDRDAD | 00000000 |
| GDRDCU | 00000000 | GDRDDA | 00000310 | GDRDRM | 00000000 | GDRDTG | 00000310 | GDRDTP | 00000144 |
| GDRIDX | 00000000 | GDPIND | 00000000 | GDRMNT | 00000000 | GDRNRQ | 00000144 | GDRRJA | 00000000 |
| GDPSEG | 00000000 | GDFSGN | 00000000 | GDRS16 | 00000310 | GDRS17 | 00000454 | GDRWCN | 00000454 |
| GDPWCT | 00000144 | GDT | 00000000 | GDTCNT | 00000000 | GDTLMT | 00000024 | GE000 | 00000021 |
| GE001 | 00000014 | GE002 | 00000310 | GE003 | 00000014 | GE004 | 00000015 | GE005 | 00000015 |
| GE006 | 00000011 | GE007 | 00000004 | GE008 | 00000003 | GE009 | 00000014 | GE010 | 00000010 |
| GE011 | 00000016 | GE012 | 00074000 | GE013 | 00177777 | GGB | 00000000 | GGBW00 | 00000000 |
| GIP | 00000000 | GIPPAA | 00000013 | GIPPAB | 00000014 | GIPPAC | 00000015 | GIPPAD | 00000016 |
| GIPPAE | 00000017 | GIPPAF | 00000020 | GIPPAG | 00000021 | GIPPAH | 00000022 | GIPPAI | 00000023 |
| GIPPAK | 00000024 | GIPPAP | 00000025 | GIPPAR | 00000026 | GIPPAS | 00000027 | GIPPAT | 00000030 |
| GIPPAU | 00000031 | GIPPAV | 00000032 | GIPPAW | 00000033 | GIPPBE | 00000034 | GIPPCP | 00000000 |
| GIPPPE | 00000001 | GIPPPF | 00000002 | GIPPPH | 00000003 | GIPPPI | 00000004 | GIPPPL | 00000005 |
| GIPPPN | 00000006 | GIPPPP | 00000007 | GIPPPU | 00000010 | GIPPPY | 00000011 | GIPPPZ | 00000012 |
| GJB | 00000000 | GJB001 | 00000000 | GJB002 | 00000001 | GJB003 | 00000002 | GJB004 | 00000003 |
| GJB005 | 00000004 | GJB006 | 00000005 | GJB007 | 00000006 | GJB008 | 00000007 | GJB009 | 00000010 |
| GJB010 | 00000011 | GJB011 | 00000012 | GJB012 | 00000013 | GJB013 | 00000014 | GJB014 | 00000015 |
| GJB015 | 00000016 | GJB016 | 00000017 | GJB017 | 00000020 | GJB018 | 00000021 | GJB019 | 00000022 |
| GJB020 | 00000023 | GJB021 | 00000024 | GJB022 | 00000025 | GJB023 | 00000026 | GJB024 | 00000027 |
| GJB025 | 00000030 | GJB026 | 00000031 | GJB027 | 00000032 | GJB028 | 00000033 | GJB029 | 00000034 |
| GJB030 | 00000035 | GJB031 | 00000036 | GJB032 | 00000037 | GJB033 | 00000040 | GJB034 | 00000041 |
| GJB035 | 00000042 | GJK | 00000000 | GJK001 | 00000000 | GJK002 | 00000001 | GJK003 | 00000002 |
| GJK004 | 00000003 | GJK005 | 00000004 | GJK006 | 00000005 | GJK007 | 00000006 | GJK008 | 00000007 |
| GJK009 | 00000010 | GJK010 | 00000011 | GJK011 | 00000012 | GJK012 | 00000013 | GJK013 | 00000014 |
| GJK014 | 00000015 | GJK015 | 00000016 | GJK016 | 00000017 | GJK017 | 00000020 | GJK018 | 00000021 |
| GJK019 | 00000022 | GJK020 | 00000023 | GJK021 | 00000024 | GJK022 | 00000025 | GJK023 | 00000026 |
| GJK024 | 00000027 | GJK025 | 00000030 | GJK026 | 00000031 | GJK027 | 00000032 | GJK028 | 00000033 |
| GJK029 | 00000034 | GJK030 | 00000035 | GJK031 | 00000036 | GJK032 | 00000037 | GJK033 | 00000040 |
| GJK034 | 00000041 | GJK035 | 00000042 | GJK036 | 00000043 | GJK037 | 00000044 | GJK038 | 00000045 |
| GJK039 | 00000046 | GJK040 | 00000047 | GLM | 00000000 | GLMGBF | 00000006 | GLMGBN | 00000012 |
| GLMGBP | 00000000 | GLMGCT | 00000001 | GLMGCR | 00000002 | GLMGDT | 00000003 | GLMGFB | 00000010 |
| GLMGGB | 00000011 | GLMGPH | 00000013 | GLMGEN | 00000004 | GLMGRO | 00000007 | GLMREQ | 00000005 |
| GMS | 00000000 | GMSFRS | 00000000 | GMSFSM | 00000071 | GMSNWD | 00000023 | GMSSMG | 00000046 |
| GMT | 00000120 | GMTW00 | 00000120 | GPG | 00000000 | GPH | 00000000 | GPHW00 | 00000000 |
| GPN | 00000000 | GPNPNO | 00000000 | GPNPRN | 00000000 | GPR | 00000036 | GPRADP | 00000036 |
| GPRARJ | 00000037 | GPRBOP | 00000040 | GPRCNC | 00000041 | GPRCON | 00000042 | GPRDAD | 00000043 |
| GPRDAM | 00000067 | GPRDCS | 00000044 | GPRDCU | 00000045 | GPRDLT | 00000046 | GPRDMS | 00000047 |
| GPRDMT | 00000050 | GPRDST | 00000053 | GPRKEY | 00000054 | GPRLRG | 00000070 | GPRMNA | 00000052 |
| GPRMNN | 00000051 | GPRMSK | 00000055 | GPRCCN | 00000056 | GPRPNO | 00000057 | GPRPRG | 00000060 |
| GPRREL | 00000061 | GPRPJS | 00000062 | GPRRSN | 00000063 | GPRSEG | 00000064 | GPRSGN | 00000065 |
| GPRSLA | 00000066 | GQP | 00000000 | GQRBIL | 00000024 | GQRBUL | 00000014 | GQRGBN | 00000006 |
| GQRGBP | 00000000 | GQPGCT | 00000001 | GQRGER | 00000002 | GQRGDT | 00000003 | GQRGPH | 00000005 |
| GQRGEN | 00000004 | GQRLBP | 00000007 | GQRLCT | 00000010 | GQRLDR | 00000011 | GQRLDT | 00000012 |
| GQRLPN | 00000013 | GQRPBN | 00000023 | GQRPCT | 00000015 | GQRPDR | 00000016 | GQRPDT | 00000017 |
| GQREPH | 00000022 | GQRPEN | 00000020 | GQRPRQ | 00000021 | GRQ | 00000000 | GRQPBP | 00000000 |
| GRQFEQ | 00000000 | GSM | 00000372 | GSMNWD | 00000372 | GSMSAD | 00000411 | GST | 00000430 |
| GSTW00 | 00000430 | GSV | 00000000 | GSVRAA | 00000000 | GSVRG1 | 00000005 | GSVRG2 | 00000006 |
| GSVRG3 | 00000007 | GSVRG4 | 00000010 | GSVRQQ | 00000001 | GSVXR1 | 00000002 | GSVXR2 | 00000003 |
| GSVXR3 | 00000004 | GSVX01 | 00000002 | GSVXC2 | 00000003 | GSVX03 | 00000004 | GSW | 00000000 |
| GSWPRK | 00000003 | GSWBRP | 00000030 | GSWBUF | 00000007 | GSWCOL | 00000005 | GSWCRD | 00000023 |
| GSWFND | 00000002 | GSWERR | 00000004 | GSWFMS | 00000015 | GSWINO | 00000001 | GSWLBF | 00000010 |
| GSWLCN | 00000021 | GSWLCT | 00000020 | GSWINO | 00000017 | GSWLOC | 00000011 | GSWLPR | 00000022 |
| GSWLRG | 00000031 | GSWMRP | 00000026 | GSWNPF | 00000027 | GSWPRC | 00000016 | GSWREN | 00000025 |
| GSWFEQ | 00000006 | GSWSAV | 00000024 | GSWSEQ | 00000012 | GSWTTY | 00000000 | GSWWAE | 00000014 |
| GSWWAS | 00000013 | GTB | 00000000 | GTRBAP | 00000000 | GTBRKP | 00000000 | GTBBPC | 00000003 |
| GTBBPD | 00000003 | GTBBPG | 00000000 | GTBDMD | 00000004 | GTBDMP | 00000004 | GTBPCT | 00000001 |
| GTBPDR | 00000002 | GTBPEQ | 00000005 | GTBS01 | 00000000 | GTBS02 | 00000001 | GTBS03 | 00000002 |
| G1D | 00000070 | G2B | 00000071 | G2D | 00000454 | G2E | 00000036 | HAS | 00000000 |
| HASBEN | 00000000 | HASBHP | 00000004 | HASCHT | 00000006 | HASMAX | 00000003 | HASMGN | 00000002 |
| HASPTR | 00000001 | HASWAP | 00000005 | HED | 00000000 | HEDCCR | 00000022 | HEDCRO | 00000013 |
| HEDCP1 | 00000023 | HEDCCU | 00000004 | HEDDC1 | 00000005 | HEDDC2 | 00000006 | HEDDC3 | 00000007 |
| HEDDC4 | 00000010 | HEDDC5 | 00000011 | HEDIOS | 00000000 | HEDI1S | 00000001 | HEDI2S | 00000002 |
| HEDI3S | 00000003 | HEDLPO | 00000012 | HEDMCC | 00000030 | HEDTMK | 00000014 | HEDTMU | 00000024 |
| HEDTM1 | 00000015 | HEDTM2 | 00000016 | HEDTM3 | 00000017 | HEDTM4 | 00000020 | HEDTM5 | 00000021 |
| HEDTSU | 00000026 | HEDTS1 | 00000027 | HEDTU1 | 00000025 | HEL | 00000000 | HELABT | 00000000 |
| HELFLD | 00000000 | HELFTM | 00000031 | HELIND | 00000000 | HELMTB | 00000031 | HELSTM | 00000031 |
| HELTTB | 00000031 | HMN | 00000000 | HMNMFI | 00000000 | HMNRRB | 00000000 | HMNRRI | 00000000 |
| HMNSP1 | 00000000 | HMNSP2 | 00000000 | HE3 | 00000045 | HSTAAA | 00000000 | HSTAAB | 00000001 |
| HSTAAC | 00000001 | HSTAAF | 00000002 | HSTAAP | 00000004 | HSTAAG | 00000011 | HSTAAH | 00000011 |
| HSTAAK | 00000017 | HSTAAL | 00000027 | HSTAAM | 00000037 | HSTAAN | 00000041 | HSTABA | 00000000 |
| HSTABB | 00000001 | HSTABC | 00000001 | HSTABD | 00000001 | HSTABE | 00000002 | HSTABF | 00000004 |

PAGE 051 6/13/75 TIME : 9:58 AM F74 BOGAC2 MAG TAPE HANDLER

| | | | | | | | | | |
|---|---|---|---|---|---|---|---|---|---|
| HSTABG | 00000011 | HSTABH | 00000011 | HSTABJ | 00000011 | HSTABK | 00000017 | HSTACA | 00000000 |
| HSTACB | 00000001 | HSTACC | 00000001 | HSTACD | 00000001 | HSTACE | 00000002 | HSTACF | 00000004 |
| HSTACG | 00000011 | HSTACH | 00000011 | HSTACJ | 00000011 | HSTADA | 00000000 | HSTADB | 00000001 |
| HSTADF | 00000002 | HSTADP | 00000004 | HSTAFJ | 00000011 | HSTAEA | 00000000 | HSTAEB | 00000001 |
| HSTAEE | 00000002 | HSTAEF | 00000004 | HSTAFA | 00000000 | HSTAFB | 00000001 | HSTAFE | 00000002 |
| HSTAFF | 00000004 | HSTAGA | 00000000 | HSTAHA | 00000000 | HSTAHE | 00000002 | HSTA00 | 00000000 |
| HSTA01 | 00000001 | HSTA02 | 00000002 | HSTA03 | 00000003 | HSTA04 | 00000004 | HSTA05 | 00000005 |
| HSTA06 | 00000006 | HSTA07 | 00000007 | HSTA08 | 00000010 | HSTA09 | 00000011 | HSTA10 | 00000012 |
| HSTA11 | 00000013 | HSTA12 | 00000014 | HSTA13 | 00000015 | HSTA14 | 00000016 | HSTA15 | 00000017 |
| HSTA16 | 00000020 | HSTA17 | 00000021 | HSTA18 | 00000022 | HSTA19 | 00000023 | HSTA20 | 00000024 |
| HSTA21 | 00000025 | HSTA22 | 00000026 | HSTA23 | 00000027 | HSTA24 | 00000030 | HSTA25 | 00000031 |
| HSTA26 | 00000032 | HSTA27 | 00000033 | HSTA28 | 00000034 | HSTA29 | 00000035 | HSTA30 | 00000036 |
| HSTA31 | 00000037 | HSTA32 | 00000040 | HSTA33 | 00000041 | HSTA34 | 00000042 | HSTA35 | 00000043 |
| HSTA36 | 00000044 | HSTBAA | 00000000 | HSTBAB | 00000001 | HSTBAC | 00000001 | HSTBAD | 00000003 |
| HSTBAE | 00000002 | HSTBAF | 00000004 | HSTBAG | 00000012 | HSTBAH | 00000012 | HSTBAJ | 00000011 |
| HSTBAM | 00000037 | HSTBAN | 00000041 | HSTBBD | 00000003 | HSTBBG | 00000012 | HSTBBH | 00000012 |
| HSTBCD | 00000003 | HSTBCG | 00000012 | HSTBCH | 00000012 | HSTCAA | 00000000 | HSTCAB | 00000001 |
| HSTCAC | 00000001 | HSTCAD | 00000005 | HSTCAE | 00000002 | HSTCAF | 00000004 | HSTCAJ | 00000011 |
| HSTCAM | 00000037 | HSTCAN | 00000041 | HSTCBD | 00000005 | HSTCCD | 00000005 | HSTCSA | 00000004 |
| HSTDAA | 00000000 | HSTDAB | 00000001 | HSTDAD | 00000007 | HSTDAE | 00000002 | HSTDAF | 00000004 |
| HSTDAN | 00000041 | HSTDBD | 00000007 | HSTDCC | 00000001 | HSTDCD | 00000007 | HSTEAA | 00000000 |
| HSTEAD | 00000006 | HSTEAN | 00000041 | HSTEBD | 00000006 | HSTECD | 00000006 | HSTFAA | 00000000 |
| HSTFAE | 00000002 | HSTGAE | 00000002 | HSTMST | 00000001 | HSTMS1 | 00000001 | HSTMS2 | 00000001 |
| HSTPAA | 00000006 | HSTPAB | 00000006 | HSTPBA | 00000006 | HSTPBB | 00000006 | HSTPBC | 00000006 |
| HSTPCA | 00000006 | HSTPCB | 00000006 | HSTPCD | 00000006 | HSTPCR | 00000006 | HSTPLP | 00000006 |
| HSTRAJ | 00000012 | HSTRAP | 00000000 | HSTRBJ | 00000012 | HSTRBP | 00000000 | HSTRCJ | 00000012 |
| HSTRCP | 00000000 | HSTRDJ | 00000012 | HSTRM1 | 00000003 | HSTRM2 | 00000004 | HSTSAJ | 00000012 |
| HSTSMI | 00000000 | HSTTAA | 00000011 | HSTTAB | 00000011 | HSTTAJ | 00000012 | HSTTBB | 00000011 |
| HSTTTY | 00000000 | I | 00000001 | IB3 | 00000006 | JB9 | 00000043 | JE3 | 00000036 |
| JN3 | 00000062 | JP3 | 00000247 | JTCAS | 00002000 | JTISO | 00001000 | JTRPV | 00001400 |
| JTRUT | 00001600 | JTSP1 | 00000600 | JTSP2 | 00000400 | JTSP3 | 00000200 | LALCG | 00000000 |
| LBSCG | 00000141 | LBS01 | 00000141 | LBS02 | 00000143 | LBS03 | 00000145 | LBS04 | 00000147 |
| LBS05 | 00000151 | LBS06 | 00000153 | LBS07 | 00000155 | LBS08 | 00000157 | LBS09 | 00000161 |
| LBS10 | 00000163 | LBS11 | 00000171 | LBS12 | 00000173 | LBS13 | 00000175 | LBS14 | 00000177 |
| LBS15 | 00000201 | LBS16 | 00000203 | LBS17 | 00000205 | LBS18 | 00000207 | LBS19 | 00000211 |
| LBS20 | 00000213 | LCACG | 00000140 | LCALR | 00000040 | LCA01 | 00000140 | LCA02 | 00000142 |
| LCA03 | 00000144 | LCA04 | 00000146 | LCA05 | 00000150 | LCA06 | 00000152 | LCA07 | 00000154 |
| LCA08 | 00000156 | LCA09 | 00000160 | LCA10 | 00000162 | LCA11 | 00000170 | LCA12 | 00000172 |
| LCA13 | 00000174 | LCA14 | 00000176 | LCA15 | 00000200 | LCA16 | 00000202 | LCA17 | 00000204 |
| LCA18 | 00000206 | LCA19 | 00000210 | LCA20 | 00000212 | LCCRA | 00000102 | LCCRB | 00000103 |
| LCCXA | 00000064 | LCCXB | 00000065 | LCDBA | 00000076 | LCDBB | 00000077 | LCNAL | 00000037 |
| LCMDB | 00000074 | LDCU1 | 00000066 | LDCU2 | 00000067 | LDCU3 | 00000070 | LDCU4 | 00000071 |
| LDCU5 | 00000072 | LDCU6 | 00000073 | LECPD | 00000006 | LIPPD | 00000004 | LMCCG | 00000021 |
| LMCM1 | 00000021 | LMCM2 | 00000022 | LMCM3 | 00000023 | LMCM4 | 00000024 | LMCM5 | 00000025 |
| LMCM6 | 00000026 | LMCM7 | 00000027 | LMCM8 | 00000030 | LMTM1 | 00000031 | LMTM2 | 00000032 |
| LMTM3 | 00000033 | LMTM4 | 00000034 | LMTM5 | 00000035 | LMTM6 | 00000036 | LMTPA | 00000104 |
| LMTPB | 00000105 | LM9 | 00000014 | LCLCG | 00000060 | LPDCG | 00000002 | LPSCG | 00000045 |
| LPSFD | 00000002 | LPSTD | 00000100 | LPS01 | 00000045 | LPS02 | 00000046 | LPS03 | 00000047 |
| LPS04 | 00000050 | LPS05 | 00000051 | LPS06 | 00000052 | LPS07 | 00000053 | LPTIG | 00000110 |
| LPTI1 | 00000110 | LPTI2 | 00000111 | LPTI3 | 00000112 | LPTI4 | 00000113 | LPTI5 | 00000114 |
| LPTI6 | 00000115 | LPTI7 | 00000116 | LPTIE | 00000117 | LQN | 00000000 | LQNRAP | 00000000 |
| LQNXR2 | 00000000 | LRA | 00000273 | LRAACI | 00000273 | LRAEND | 00000470 | LRAQUE | 00000273 |
| LRATYP | 00000273 | LRAWAA | 00000273 | LREVA | 00000054 | LREVF | 00000055 | LRTIP | 00000056 |
| LRVCG | 00000054 | LRXTP | 00000041 | LSDPD | 00000003 | LSFCA | 00000057 | LSMJA | 00000000 |
| LSMNA | 00000001 | LTDBA | 00000100 | LTDBE | 00000101 | LTMPD | 00000005 | LTSPA | 00000106 |
| LTSPB | 00000107 | LTY | 00000045 | LTYHCO | 00000045 | LWACG | 00000007 | LWA01 | 00000007 |
| LWA02 | 00000010 | LWA03 | 00000011 | LWA04 | 00000012 | LWA05 | 00000013 | LWA06 | 00000014 |
| LWA07 | 00000015 | LWA08 | 00000016 | LWA09 | 00000017 | LWA10 | 00000020 | L1CLA | 00000060 |
| L1CLB | 00000061 | L12PPI | 00000000 | L2CLA | 00000062 | L2CLB | 00000063 | L2H | 00000470 |
| MAXJN | 00000107 | MAXJT | 00002000 | MAXRC | 00000010 | MAXSC | 01000000 | MAXUT | 00000107 |
| MDCCR | 00000006 | MDCCX | 00000004 | MDCDE | 00000046 | MDCMC | 00000003 | MDCRA | 00000105 |
| MDCTP | 00000002 | MDCTT | 00000074 | MDDMS | 00000010 | MDLPA | 00000103 | MDMDA | 00000070 |
| MDMDB | 00000052 | MDMPA | 00000102 | MDMRK | 00000030 | MDPBA | 00000064 | MDPCG | 00000000 |
| MDPMA | 00000066 | MDPTA | 00000100 | MDPRS | 00000016 | MDRST | 00000020 | MDSPA | 00000072 |
| MDSPD | 00000027 | MG3 | 00000034 | MH3 | 00000012 | MINJT | 00000200 | MINSC | 00200000 |
| MN4 | 00000177 | MT3 | 00000016 | M030 | 00000235 | M225 | 00000602 | O | 00000000 |
| PC01A | 00000003 | PC02A | 00000003 | PC03A | 00000003 | PC05A | 00000004 | PC08A | 00000003 |
| PC14A | 00000003 | PC15A | 00000004 | PC15B | 00000004 | PC15C | 00000004 | PC15D | 00000004 |
| PC15E | 00000004 | PC15F | 00000004 | PC15G | 00000004 | PC15H | 00000004 | PC16A | 00000004 |
| PC16B | 00000004 | PC24A | 00000004 | PC25B | 00000004 | PC25C | 00000004 | PC26A | 00000003 |
| PC26B | 00000002 | PC27A | 00000004 | PC30A | 00000003 | PC30B | 00000003 | PC31A | 00000002 |
| PC31B | 00000002 | PC31C | 00000002 | PC31D | 00000002 | PC31E | 00000002 | PC31F | 00000002 |

PAGE 052 6/13/75 TIME : 9:58 AM F74 BOGAC2 MAG TAPE HANDLER

| | | | | | | | | | |
|---|---|---|---|---|---|---|---|---|---|
| PC31G | 00000002 | PC31H | 00000002 | PC31I | 00000002 | PC31J | 00000002 | PC31K | 00000002 |
| PC31L | 00000002 | PC31M | 00000002 | PC31N | 00000002 | PC31O | 00000002 | PC31P | 00000002 |
| PC31Q | 00000002 | PC31R | 00000002 | PC31S | 00000002 | PC31T | 00000002 | PC31U | 00000002 |
| PC31V | 00000002 | PC31W | 00000002 | PC31X | 00000002 | PC31Y | 00000002 | PC31Z | 00000002 |
| PC310 | 00000002 | PC311 | 00000002 | PC312 | 00000002 | PC313 | 00000002 | PC314 | 00000002 |
| PC315 | 00000002 | PC316 | 00000002 | PC317 | 00000002 | PC318 | 00000002 | PC319 | 00000002 |
| PC32A | 00000002 | PE08A | 00000001 | PE08B | 00000003 | PE08C | 00000003 | PE08D | 00000003 |
| PE09A | 00000001 | PF06A | 00000001 | PF06B | 00000001 | PF06C | 00000001 | PF06D | 00000001 |
| PF06E | 00000001 | PF10A | 00000003 | PF10B | 00000003 | PF24A | 00000003 | PF24B | 00000003 |
| PF28A | 00000001 | PF42A | 00000005 | PF61A | 00000002 | PF61B | 00000005 | PF61C | 00000005 |
| PF61D | 00000005 | PF62A | 00000005 | PF75A | 00000002 | PF75B | 00000005 | PF75C | 00000002 |
| PF76A | 00000001 | PF77A | 00000000 | PF79A | 00000000 | PG14A | 00000005 | PG20A | 00000003 |
| PG20D | 00000003 | PG20E | 00000003 | PG21A | 00000003 | PG22A | 00000003 | PG23A | 00000003 |
| PG24A | 00000003 | PG26A | 00000003 | PG26D | 00000003 | PG27A | 00000003 | PG27D | 00000003 |
| PG80A | 00000001 | PG81A | 00000001 | PG88A | 00000003 | PG88B | 00000003 | PG9 | 00000004 |
| PG90A | 00000003 | PG90B | 00000003 | PG90C | 00000003 | PG90D | 00000003 | PG90E | 00000003 |
| PG90F | 00000003 | PG90G | 00000003 | PG90H | 00000003 | PG93A | 00000003 | PG93B | 00000003 |
| PG93C | 00000003 | PG93D | 00000003 | PG93E | 00000007 | PH12A | 00000004 | PH12B | 00000004 |
| PH12C | 00000004 | PH12D | 00000004 | PH9 | 00000240 | PJ00A | 00000001 | PJ01A | 00000001 |
| PJ02A | 00000001 | PJ03A | 00000001 | PJ07A | 00000001 | PJ10A | 00000001 | PJ25A | 00000001 |
| PJ26A | 00000006 | PJ27A | 00000006 | PJ28A | 00000001 | PJ28B | 00000006 | PJ36A | 00000006 |
| PJ37A | 00000001 | PJ38A | 00000006 | PJ39A | 00000003 | PJ50A | 00000003 | PJ52A | 00000003 |
| PK00A | 00000001 | PK00B | 00000001 | PK00C | 00000001 | PK00D | 00000002 | PK01A | 00000003 |
| PK01B | 00000001 | PK01C | 00000003 | PK02A | 00000001 | PK02B | 00000001 | PK04A | 00000003 |
| PK06A | 00000001 | PK10A | 00000001 | PK10B | 00000001 | PK21A | 00000001 | PK21B | 00000001 |
| PK21C | 00000001 | PK21D | 00000001 | PK22A | 00000001 | PK22B | 00000001 | PK22C | 00000001 |
| PK22D | 00000001 | PK24A | 00000001 | PK24B | 00000001 | PK24C | 00000001 | PK24D | 00000001 |
| PK24E | 00000001 | PK40A | 00000001 | PK40B | 00000001 | PK40C | 00000001 | PK41A | 00000001 |
| PK42A | 00000002 | PK50A | 00000001 | PK50B | 00000003 | PK50C | 00000003 | PK52A | 00000001 |
| PK60A | 00000001 | PL18A | 00000002 | PL19A | 00000006 | PL2 | 00000002 | PL28A | 00000001 |
| PL32A | 00000001 | PL32B | 00000001 | PL32C | 00000001 | PL32D | 00000001 | PL32E | 00000005 |
| PL53A | 00000001 | PL59A | 00000001 | PM01A | 00000003 | PM02A | 00000003 | PM08A | 00000003 |
| PM11A | 00000003 | PM16A | 00000003 | PM17A | 00000003 | PM18A | 00000003 | PM19A | 00000003 |
| PM25A | 00000003 | PM26A | 00000003 | PN02A | 00000002 | PN05A | 00000003 | PN05B | 00000003 |
| PN05C | 00000003 | PN10A | 00000003 | PN10B | 00000003 | PN10C | 00000003 | PN10D | 00000003 |
| PN10E | 00000003 | PN10F | 00000003 | PN10G | 00000003 | PN9 | 00000050 | PP02A | 00000001 |
| PP05A | 00000001 | PP05B | 00000001 | PP05C | 00000001 | PP05D | 00000001 | PP05E | 00000001 |
| PP05F | 00000001 | PP05G | 00000001 | PP05H | 00000001 | PS10A | 00000001 | PS10B | 00000001 |
| PS12A | 00000001 | PS2 | 00000017 | PS26A | 00000001 | PS26B | 00000002 | PS26C | 00000003 |
| PS26D | 00000004 | PS26E | 00000005 | PS26F | 00000006 | PS26G | 00000007 | PT03A | 00000003 |
| PT03B | 00000003 | PT03C | 00000003 | PT04A | 00000003 | PT04B | 00000003 | PT04C | 00000003 |
| PT04D | 00000003 | PT04E | 00000003 | PT04F | 00000003 | PT05A | 00000003 | PT05B | 00000003 |
| PT06A | 00000003 | PT07A | 00000003 | PT07B | 00000003 | PT07C | 00000003 | PT07D | 00000003 |
| PT08A | 00000003 | PT09A | 00000003 | PT09B | 00000003 | PT09C | 00000003 | PT09D | 00000003 |
| PT10A | 00000003 | PT10B | 00000003 | PT10C | 00000003 | PT11A | 00000003 | PT11B | 00000003 |
| PT12A | 00000001 | PT12B | 00000003 | PT13A | 00000002 | PT13B | 00000003 | PT13C | 00000003 |
| PT13D | 00000003 | PT13E | 00000003 | PT13F | 00000003 | PT16A | 00000003 | PV17A | 00000003 |
| PV20A | 00000005 | PV20B | 00000003 | PV21A | 00000005 | PV21B | 00000003 | PV22A | 00000005 |
| PV22B | 00000003 | PV23A | 00000005 | PV23B | 00000003 | PV24A | 00000003 | PV27A | 00000007 |
| PV28A | 00000006 | PV28B | 00000006 | PV29A | 00000007 | PV29B | 00000007 | PV30A | 00000007 |
| PV31A | 00000007 | PV35A | 00000007 | PV41A | 00000007 | PV45A | 00000007 | PV52A | 00000007 |
| PV57A | 00000007 | PV59A | 00000007 | PV74A | 00000003 | PV75A | 00000003 | PV77A | 00000003 |
| PV78A | 00000003 | PV79A | 00000003 | PV80A | 00000003 | PV81A | 00000003 | PV84A | 00000003 |
| PV85A | 00000003 | PV96A | 00000003 | PV96C | 00000003 | PV97A | 00000003 | PV99A | 00000003 |
| PV99B | 00000003 | PW01A | 00000006 | PW02A | 00000006 | PW03A | 00000007 | PW04A | 00000003 |
| PW05A | 00000006 | PW06A | 00000006 | QR9 | 00000026 | RA3 | 00000300 | RC3 | 00000062 |
| RD | 00000001 | RDUMP | 40000000 | RG2 | 00000004 | RPRPQ | 10000000 | RPRPT | 04000000 |
| RPRVR | 14000000 | RQ9 | 00000050 | RS3 | 00000143 | SCSCS | 01000000 | SCTRS. | 00600000 |
| SCTTY | 00400000 | SLMAX | 00000176 | SL001 | 00000264 | SL031 | 00000166 | SL032 | 00000001 |
| SL033 | 00000002 | SL034 | 00000003 | SL035 | 00000004 | SL036 | 00000005 | SL071 | 00000016 |
| SL072 | 00000017 | SL073 | 00000020 | SL074 | 00000021 | SL075 | 00000022 | SL076 | 00000023 |
| SL131 | 00000006 | SL132 | 00000007 | SL133 | 00000010 | SL134 | 00000011 | SL135 | 00000012 |
| SL136 | 00000013 | SL137 | 00000014 | SL138 | 00000015 | SL141 | 00000100 | SL142 | 00000101 |
| SL143 | 00000102 | SL144 | 00000103 | SL145 | 00000104 | SL146 | 00000105 | SL147 | 00000106 |
| SL148 | 00000107 | SL181 | 00000024 | SL182 | 00000025 | SL183 | 00000026 | SL184 | 00000027 |
| SL185 | 00000052 | SL186 | 00000053 | SL187 | 00000054 | SL188 | 00000055 | SL191 | 00000130 |
| SL192 | 00000131 | SL193 | 00000132 | SL194 | 00000133 | SL195 | 00000134 | SL196 | 00000135 |
| SL197 | 00000136 | SL198 | 00000137 | SL2 | 00000023 | SL291 | 00000032 | SL292 | 00000033 |
| SL293 | 00000034 | SL294 | 00000035 | SL295 | 00000036 | SL296 | 00000037 | SL297 | 00000040 |
| SL298 | 00000041 | SL371 | 00000042 | SL372 | 00000043 | SL373 | 00000044 | SL374 | 00000045 |
| SL375 | 00000046 | SL376 | 00000047 | SL377 | 00000050 | SL378 | 00000051 | SL411 | 00000110 |
| SL413 | 00000112 | SL414 | 00000113 | SL415 | 00000114 | SL416 | 00000115 | SL417 | 00000116 |

F74 BOGAC2 MAG TAPE HANDLER

PAGE 053 6/13/75 TIME : 9:58 AM

| | | | | | | | | | |
|---|---|---|---|---|---|---|---|---|---|
| SL418 | 00000117 | SL421 | 00000120 | SL423 | 00000122 | SL424 | 00000123 | SL425 | 00000124 |
| SL426 | 00000125 | SL427 | 00000126 | SL428 | 00000127 | SL431 | 00000060 | SL433 | 00000062 |
| SL434 | 00000063 | SL435 | 00000064 | SL436 | 00000065 | SL437 | 00000066 | SL438 | 00000067 |
| SL441 | 00000070 | SL443 | 00000072 | SL444 | 00000073 | SL445 | 00000074 | SL446 | 00000075 |
| SL447 | 00000076 | SL448 | 00000077 | SL592 | 00000030 | SL596 | 00000031 | SL671 | 00000156 |
| SL672 | 00000157 | SL673 | 00000160 | SL674 | 00000161 | SL675 | 00000162 | SL676 | 00000163 |
| SL677 | 00000164 | SL678 | 00000165 | SL681 | 00000056 | SL682 | 00000057 | SL800 | 00000140 |
| SL801 | 00000141 | SL802 | 00000142 | SL803 | 00000143 | SL804 | 00000144 | SL805 | 00000145 |
| SL806 | 00000146 | SL807 | 00000147 | SL808 | 00000150 | SL809 | 00000151 | SL810 | 00000152 |
| SL811 | 00000153 | SL812 | 00000154 | SL813 | 00000155 | SL890 | 00000170 | SL893 | 00000171 |
| SL894 | 00000172 | SL895 | 00000173 | SL896 | 00000174 | SL897 | 00000175 | SL898 | 00000176 |
| SL899 | 00000264 | SPATS | 00000106 | SPITP | 00000106 | SPLMP | 00000057 | SPPBP | 00000023 |
| SPRCR | 00000026 | SPSCR | 00000025 | SPSSA | 00000022 | SPTRM | 00000071 | SPTRS | 00000104 |
| SPVMS | 00000024 | SPWAA | 00000053 | SS3 | 00000036 | ST2 | 00000001 | ST4 | 00000045 |
| SV9 | 00000011 | SW3 | 00000012 | SW9 | 00000032 | TBC | 00000000 | TBCACT | 00000000 |
| TBCFIP | 00000000 | TBCFI1 | 00000000 | TBCFI2 | 00000000 | TBCREI | 00000000 | TBCRE1 | 00000000 |
| TBCRE2 | 00000000 | TECWCR | 00000000 | TBF | 00000000 | TBFBI1 | 00000000 | TBFBI2 | 00000000 |
| TBFBI3 | 00000000 | TBFBLK | 00000001 | TBFBS1 | 00000000 | TBFBS2 | 00000000 | TBFBS3 | 00000000 |
| TBFBS4 | 00000001 | TBFBUF | 00000002 | TBFREL | 00000001 | TB9 | 00000006 | TE3 | 00000020 |
| TIMERC | 00002006 | TI3 | 00000020 | TKCHG | 00000056 | TMT15 | 00007020 | TM3 | 00000020 |
| TRPOT | 00000137 | TT3 | 00000020 | TYCCR | 00000007 | TYCCX | 00000002 | TYCDB | 00000010 |
| TYCTP | 00000001 | TYDMS | 00000004 | TYMAX | 00000012 | TYMDB | 00000011 | TYMRK | 00000005 |
| TYMUX | 02623571 | TYONK | 00000005 | TYPCG | 00000000 | TYRES | 61717136 | TYRRS | 00000003 |
| TYRTN | 15267413 | TYTDB | 00000012 | TYTMK | 00000006 | V010 | 00001133 | V090 | 00001163 |
| V121 | 00001256 | V144 | 00001275 | V145 | 00001302 | WAN00 | 00000007 | WAN66 | 00000014 |
| WAN67 | 00000031 | WAN70 | 00000003 | WAN71 | 00000004 | WAN72 | 00000014 | WAN73 | 00000027 |
| WAN74 | 00000015 | WAN75 | 00000004 | WAN76 | 00000000 | WAN77 | 00000000 | WA1 | 00000764 |
| ZMC | 00000001 | ZMCRO | 00000000 | | | | | | |

What is claimed is:

1. In a communication switching system having a central processor with a main memory therefor and having a peripheral adapter unit for transferring information to and from an input/output peripheral device, a device buffer for transferring information between the peripheral adapter and the main memory, a maintenance arrangement comprising:

- a plurality of input/output device error detecting units for sensing malfunctions occurring in the input/output peripheral device;
- a plurality of adapter bi-stable devices associated with peripheral adapter for generating input/output error signals in response to said peripheral device error detecting units sensing malfunctions;
- a plurality of device buffer error detecting units for sensing malfunctions occurring in the device buffer;
- a plurality of buffer bi-stable devices associated with the device buffer for generating device buffer error signals in response to said device buffer error detecting units sensing malfunctions occurring in the device buffer;
- an error bi-stable device responsive to said adapter bi-stable device and to said buffer bi-stable devices generating their error signals for requesting the services of the central processor for maintenance purposes; and
- control means responsive to said error bi-stable device for monitoring said buffer bi-stable devices to determine whether the malfunction occurred in the device buffer and for monitoring subsequently said adapter bi-stable devices if the malfunction did not occur in the device buffer to determine the source of the malfunction.

2. A maintenance arrangement according to claim 1, further including buffer gating means for controlling the outputs of said buffer bi-stable devices for determining their status.

3. A maintenance arrangement according to claim 2, wherein said control means activates said buffer gates in response to said error signal.

4. A maintenance arrangement according to claim 3, further including adapter gating means for controlling the outputs of said adapter bi-stable devices for determining their status.

5. A maintenance arrangement according to claim 4, wherein said control means activates said adapter gates after determining that none of said buffer bi-stable devices have been activated by their sensing units.

6. A maintenance arrangement according to claim 5, further including adapter error means for activating said buffer error device in response to any one of said adapter bi-stable devices indicating the occurrence of a malfunction.

7. A maintenance arrangement according to claim 6, further including OR gating means for activating said error bi-stable device in response to said adapter error means or to any one of said buffer bi-stable devices indicating a malfunction.

8. A maintenance arrangement according to claim 7, wherein each one of said bi-stable devices is a latch.

* * * * *